US012811121B2

(12) United States Patent
Badu-Tawiah et al.

(10) Patent No.: US 12,811,121 B2
(45) Date of Patent: Nov. 24, 2026

(54) METHOD AND APPARATUS FOR MASS SPECTROMETRY

(71) Applicant: Ohio State Innovation Foundation, Columbus, OH (US)

(72) Inventors: Abraham Badu-Tawiah, Columbus, OH (US); Dmytro Kulyk, Columbus, OH (US); Kavyasree Chintalapudi, Columbus, OH (US); Enoch Amoah, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 714 days.

(21) Appl. No.: 18/035,668

(22) PCT Filed: Nov. 5, 2021

(86) PCT No.: PCT/US2021/058303
§ 371 (c)(1),
(2) Date: May 5, 2023

(87) PCT Pub. No.: WO2022/099046
PCT Pub. Date: May 12, 2022

(65) Prior Publication Data

US 2023/0395364 A1 Dec. 7, 2023

Related U.S. Application Data

(60) Provisional application No. 63/116,973, filed on Nov. 23, 2020, provisional application No. 63/110,199, filed on Nov. 5, 2020.

(51) Int. Cl.
*H01J 49/04* (2006.01)
*H01J 49/16* (2006.01)

(52) U.S. Cl.
CPC ........ *H01J 49/0409* (2013.01); *H01J 49/165* (2013.01); *H01J 49/168* (2013.01)

(58) Field of Classification Search
CPC .... H01J 49/0409; H01J 49/165; H01J 49/168; H01J 49/0095
(Continued)

(56) References Cited

U.S. PATENT DOCUMENTS 3,224,497 A 12/1965 Blomgren, Sr. et al.
3,938,345 A 2/1976 Yamaga et al.
(Continued)

FOREIGN PATENT DOCUMENTS

GB 2406703 4/2005
JP 2008053020 3/2008
(Continued)

OTHER PUBLICATIONS

International Preliminary Report on Patentability dated May 19, 2023, issued for Application No. PCT/US2021/058303.
(Continued)

*Primary Examiner* — Michael Maskell
(74) *Attorney, Agent, or Firm* — Meunier Carlin & Curfman LLC

(57) ABSTRACT

Disclosed herein are apparatuses comprising a panoptic ion sources capable of ionizing organic compounds. Also disclosed are methods for analyzing complex organic compounds using the disclosed herein apparatuses. The methods and systems are suitable for high throughput screening of samples, including biofluids. The methods and systems are suitable for the rapid evaluation of chemical reactions, permitting the discovery of novel organic reaction pathways.

18 Claims, 29 Drawing Sheets

(58) Field of Classification Search
USPC .......................................... 250/281, 282, 288
See application file for complete search history.

(56) References Cited

U.S. PATENT DOCUMENTS

| | | | | |
|---|---|---|---|---|
| 2005/0056776 | A1 | 3/2005 | Willooughby et al. | |
| 2007/0084999 | A1 | 4/2007 | Miller et al. | |
| 2008/0054176 | A1 | 3/2008 | Hiraoka | |
| 2010/0171033 | A1* | 7/2010 | Jolliffe | H01J 49/10 250/288 |
| 2014/0001352 | A1 | 1/2014 | Franzke et al. | |
| 2016/0161379 | A1 | 6/2016 | Hendrikse et al. | |
| 2016/0329198 | A1* | 11/2016 | Badu-Tawiah | H01J 49/045 |
| 2016/0329203 | A1 | 11/2016 | Fujita | |

FOREIGN PATENT DOCUMENTS

| | | |
|---|---|---|
| WO | 2020223341 | 11/2020 |
| WO | 2020223341 A1 | 11/2020 |

OTHER PUBLICATIONS

International Search Report dated Feb. 1, 2022, issued for Application No. PCT/US2021/058303.

International Search Report and Written Opinion, issued by the International Searching Authority (ISA/US) in PCT Application No. PCT/US2020/030458 on Oct. 1, 2020. 17 pages.

European Search Report issued for Application No. 20799126.6, dated May 3, 2023.

Badu-Tawiah, A. K.; Cyriac, J.; Cooks, R. G. Reactions of Organic Ions at Ambient Surfaces in a Solvent-Free Environment. J. Am. Soc. Mass Spectrom. 2012, 23, 842-849.

Badu-Tawiah, A. K.; Li, A.; Jjunju, F. P. M.; Cooks, R. G. Peptide Cross-Linking at Ambient Surfaces by Reactions of Nanosprayed Molecular Cations. Angew. Chem. Int. Ed. 2012, 51, 9417-9421.

Badu-Tawiah, A. K.; Wu, C.; Cooks, R. G. Ambient Ion Soft Landing. Anal. Chem. 2011, 83, 2648-2654.

Banerjee, S.; Zare, R. N. Syntheses of Isoquinoline and Substituted Quinolines in Charged Microdroplets. Angew. Chem. Int. Ed. 2015, 54, 14795-14799.

Berggren, W. T.; Westphall, M. S.; Smith, L. M. Anal. Chem. 2002, 74, 3443-3448.

Borsche, W.; Feise, M. Ueber Tetra- und Hexahydrocarbazolverbindungen und eineneue Carbazolsynthese. Ann. Chem. 1908, 359, 49-80.

Bushey, J. M.; Kaplan, D. A.; Danell, R. M.; Glish, G. L. Instrum. Sci. Technol. 2009, 37, 257-273.

Cabrera-Pardo, J. R.; Chai, D. I.; Liu, S.; Mrksich, M.; Kozmin, S. A. Label-Assisted Mass Spectrometry for the Acceleration of Reaction Discovery and Optimization. Nat. Chem. 2013, 5, 423-427.

Cernak, T. Synthesis in the Chemical Space Age. Chem. 2016, 1, 6-9.

Chaturvedi, P. R.; Decker, C. J.; Odinecs, A. Prediction of Pharmacokinetic Properties using Experimental Approaches During Early Drug Discovery. Curr. Opin. Chem. Biol. 2001, 5, 452-463.

Chen, F.; Gülbakan, B.; Weidmann, S.; Fagerer, S. R.; Ibáñez, A. J.; Zenobi, R. Mass. Spec. Rev. 2016, 35, 48-70.

Chen, F.; Lin, L.; Zhang, J.; He, Z.; Uchiyama, K.; Lin, J.-M. Anal. Chem. 2016, 88, 4354-4360.

Chen, S.; Wan, Q.; Badu-Tawiah, A. K. Picomole-Scale Real-Time Photoreaction Screening: Discovery of the Visible-Light-Promoted Dehydrogenation of Tetrahydroquinolines under Ambient Conditions. Angew. Chem. Int. Ed. 2016, 128, 9491-9495.

Damon, D. E.; Davis, K. M .; Moreira, C. R.; Capone, P.; Cruttenden, R.; Badu-Tawiah, A. K. Anal. Chem. 2016, 88, 1878-1884.

Datan, A.; Kulkarni, A.; Török, B. Environmentally Benign Synthesis of Heterocyclic Compounds by Combined Microwave-Assisted Heterogeneous Catalytic Approaches. Green Chem 2012, 14, 17-37.

Deng, J.; Yang, Y.; Xu, M.; Wang, X.; Lin, L.; Yao, Z.-P.; Luan, T. Anal. Chem. 2015 87, 9923-9930.

Ding, X.; Duan, Y. Plasma-Based Ambient Mass Spectrometry Techniques: The Current Status and Future Prospective. Mass. Spec. Rev. 2015, 34, 449-473.

Drechsel, E. J. Prakt. Chem. 1858, 38, 69.

Ebeling, D. D.; Westphall, M. S.; Scalf, M.; Smith, L. M. Anal. Chem. 2000, 72, 5158-5161.

El-Faramawy, A.; Siu, K. W. M.; Thomson, B. A. J. Am. Soc. Mass Spectrom. 2005, 16, 1702-1707.

Foreman, D. J.; McLuckey, S. A. Recent Developments in Gas-Phase Ion/Ion Reactions for Analytical Mass Spectrometry. Anal. Chem. 2020, 92, 252-266.

Fornelli, L.; Durbin, K. R.; Fellers, R. T.; Early, B. P.; Greer, J. B.; LeDuc, R. D.; Compton, P. D.; Kelleher, N. L. Advancing Top-Down Analysis of the Human Proteome Using a Benchtop Quadrupole-Orbitrap Mass Spectrometer. Proteome Res. 2017, 16, 609-618.

Girod, M.; Moyano, E.; Campbell, D. I.; Cooks, R. G. Accelerated Bimolecular Reactions in Microdroplets Studied by Desorption Electrospray Ionization Mass Spectrometry. Chem. Sci. 2011, 2, 501-510.

Gong, X.; Xiong, X.; Zhao, Y.; Ye, S.; Fang, X. Anal. Chem. 2017, 89, 7009-7016.

Goodwin, D. C.; Aust, S. D.; Grover, T. A. Free Radicals Produced During the Oxidation of Hydrazines by Hypochlorous Acid. Chem. Res. Toxicol. 1996, 9, 1333-1339.

Huang, G., Li, G., & Cooks, R. G. (2011). Induced Nanoelectrospray Ionization for Matrix-Tolerant and High-Throughput Mass Spectrometry. Angewandte Chemie International Edition, 50(42), 9907-9910. doi:10.1002/anie.201103687.

Huang, G.; Chen, H.; Zhang, X.; Cooks, R. G.; Z. Ouyang. Anal. Chem. 2007, 79, 8327-8332.

Hughes, J.; Rees, S.; Kalindjian, S.; Philpott, K. Principles of Early Drug Discovery. Br. J. Pharmacol. 2011, 162, 1239-1249.

Inglese, J.; Johnson, R.L.; Simeonov, A.; Xia, M.; Zheng, W.; Austin, C.P.; Auld, D.S. High-throughput screening assays for the identification of chemical probes. Nat. Chem. Biol. 2007, 3(8), 466-479.

Jayaraj, S.; Badu-Tawiah, A. K. Real-time Photoreaction Screening Allows the Discovery of N-Substituted Auxiliaries as Mediators for Aerobic Dehydrogenation of Tetrahydroisoquinolines: A Theory-Guided Catalytic Design. Sci. Rep. 2019, 9, 11280.

Jeffries-El, M.; Sauvé, G.; McCullough, R. D. Facile Synthesis of End- Functionalized Regioregular Poly(3-alkylthiophene)s via Modified Grignard Metathesis Reaction. Macromolecules 2005, 38, 10346-10352.

Jin, C.; Viidanoja, J.; Li, M.; Zhang, Y.; Ikonen, E.; Root, A.; Romanczyk, M.; Manheim, J.; Dziekonski, E.; Kenttämaa, H. I. Comparison of Atmospheric Pressure Chemical Ionization and Field Ionization Mass Spectrometry for the Analysis of Large Saturated Hydrocarbons. Anal. Chem. 2016, 88, 10592-10598.

Kalyanaraman, B.; Sinha, B. K. Free Radical-Mediated Activation of Hydrazine Derivatives. Environ. Health Perspect. 1985, 64, 179-184.

Katritzky, A. R. Conversions of Primary Amino Groups into other Functionality Mediated by Pyrylium Cations. Tetrahedron 1979, 36, 679-699.

Katritzky, A. R.; Marson, C. M. Pyrylium Mediated Transformations of Primary Amino Groups into Other Functional Groups. Angew. Chem. Int. Ed. 1984, 23, 420-429.

Katritzky, A. R.; Mokrosz, J. L.; De Rose, M. J. Pyrylium-Mediated ransformations of Natural Products. Part 2. Reaction of 4-(4-methoxy-3-sulphophenyl)-2,6-bis-(4-sulphophenyl)pyrylium Perchlorate with Primary Amines. Chem. Soc. Perkin Trans. II. 1984, 5, 849-855.

Kelly, R. T.; Page, J. S.; Marginean, I.; Tang, K.; Smith, R. D. Angew. Chem. Int. Ed. 2009, 48, 6832-6835.

Kortshagen, U.R.; Sankaran, R. M.; Pereira, R. N.; Girshick, S. L.; Wu, J. J.; Aydil, E. S. Nonthermal Plasma Synthesis of Nanocrystals: Fundamental Principles, Materials, and Applications. Chem. Rev. 2016, 116, 11061-11127.

Kulyk, D. S.; Miller, C. F.; Badu-Tawiah, A. K. Reactive Charged Droplets for Reduction of Matrix Effects in Electrospray Ionization Mass Spectrometry. Anal. Chem. 2015, 87, 10988-10994.

(56) References Cited

OTHER PUBLICATIONS

Kulyk, D. S.; Sahraeian, T.; Wan, Q.; Badu-Tawiah, A. K. Reactive Olfaction Ambient Mass Spectrometry. Anal. Chem. 2019, 91, 6790-6799.

Kulyk, D. S.; Swiner, D. J .; Sahraeian, T .; Badu-Tawiah, A. K. Direct Mass Spectrometry Analysis of Complex Mixtures by Nanoelectrospray with Simultaneous Atmospheric Pressure Chemical Ionization and Electrophoretic Separation Capabilities. Anal. Chem. 2019, 91, 11562-11568.

Lee, J. K.; Samanta, D.; Nam, H. G.; Zare, R. N. Spontaneous Formation of Gold Nanostructures in Aqueous Microdroplets. Nat. Commun. 2018, 9, 1562.

Li, A.; Zi, Y.; Guo, H.; Wang, Z. L.; Fernandez, F. M. Nat. Nanotechnol. 2017, 12, 481-487.

Liang, Xiaorong, Yu Xia, and Scott A. McLuckey. "Alternately pulsed nanoelectrospray ionization/atmospheric pressure chemical ionization for ion/ion reactions in an electrodynamic ion trap." Analytical chemistry 78.9 (2006): 3208-3212.

Lipinski, C. A.; Lombardo, F.; Dominy, B. W.; Feeney, P. J. Experimental and Computational Approaches to Estimate Solubility and Permeability in Drug Discovery and Development Settings. Adv. Drug Delivery Rev. 2012, 64, 4-17.

Loren, B. P.; Ewan, H. S.; Avramova, L.; Ferreira, C. R.; Sobreira, T. J. P.; Yammine, K.; Liao, H.; Cooks, R. G. & Thompson, D. H. High Throughput Experimentation Using DESI-MS to Guide Continuous-Flow Synthesis. Sci. Rep. 2019, 9, 14745.

Marshall, D. L.; Pham, H. T.; Bhujel, M.; Chin, J. S. R.; Yew, J. Y.; Mori, K.; Mitchell, T. W.; Blanksby, S. J. Sequential Collision- and Ozone-Induced Dissociation Enables Assignment of Relative Acyl Chain Position in Triacylglycerols. Anal. Chem. 2016, 88, 2685-2692.

McEwen, Charles N., Richard G. Mckay, and Barbara S. Larsen. "Analysis of solids, liquids, and biological tissues using solids probe introduction at atmospheric pressure on commercial LC/MS instruments." Analytical Chemistry 77.23 (2005): 7826-7831.

Miller, C. F.; Kulyk, D. S.; Kim, J. W.; Badu-Tawiah, A. K. Reactive Charged Droplets for Reduction of Matrix Effects in Electrospray Ionization Mass Spectrometry. Analyst. 2017, 142, 2152-160.

Montgomery, J. High-Throughput Discovery of New Chemical Reactions. Science 2011, 333, 1387-1388.

Navia, M. A.; Chaturvedi, P. R. Design Principles for Orally Bioavailable Drugs. Drug Discov. Today 1996, 1, 179-189.

Papanastasiou, M.; McMahon, A. W.; Allen, N. S.; Johnson, B. W.; Keck-Antoine, K.; Santos, L.; Neumann, M. G. Atmospheric Pressure Photoionization Mass Spectrometry as a Tool for the Investigation of the Hydrolysis Reaction Mechanisms of Phosphite Antioxidants. Int. J. Mass Spectrom. 2008, 275, 45-54.

Park, J.; Piehowski, P. D.; Wilkins, C.; Zhou, M.; Mendoza, J.; Fujimoto, G. M.; Gibbons, B. C.; Shaw, J. B.; Shen, Y.; Shukla, A. K.; Moore, R. J.; Liu, T.; Petyuk, V. A.; Tolić, N.; Paa-Tolić, L.; Smith, R. D.; Payne, S. H.; Kim, S. Informed- Proteomics: Open-Source Software Package for Top-Down Proteomics. Nat. Methods 2017, 14, 909-914.

Picotti, P.; Aebersold, R. Selected Reaction Monitoring-Based Proteomics: Workflows, Potential, Pitfalls and Future Directions. Nat. Methods 2012, 9, 555-556.

Poad, B. L.; Pham, H. T.; Thomas, M. C.; Nealon, J. R.; Campbell, J. L.; Mitchell, T. W.; Blanksby, S. J. Ozone-Induced Dissociation on a Modified Tandem Linear Ion-Trap: Observations of Different Reactivity for Isomeric Lipids. J. Am. Soc. Mass Spectrom. 2010, 21, 1989-1999.

Qiao, Liang, et al. "Electrostatic-spray ionization mass spectrometry." Analytical chemistry 84.17 (2012): 7422-7430.

Rahman, Md Matiur, and Konstantin Chingin. "Stable and reproducible nano-electrospray ionization of aqueous solutions and untreated biological samples using ion current limitation combined with polarity reversing." Analytical Methods 11.2 (2019): 205-212.

Ren, Y.; McLuckey, M. N.; Liu, J.; Ouyang, Z. Angew. Chem. Int. Ed. 2014, 53, 14124-14127.

Sahraeian, T.; Kulyk, D. S.; Badu-Tawiah, A. K. Droplet Imbibition Enables Nonequilibrium Interfacial Reactions in Charged Microdroplets. Langmuir 2019, 35, 14451-14457.

Salvatore, R. N.; Yoon, C. H.; Jung, K. W. Synthesis of Secondary Amines. Tetrahedron 2001, 57, 7785-7811.

Sarver, S. A.; Chetwani, N.; Dovichi, N. J.; Go, D. B.; Gartner, C. A. J. Am. Soc. Mass. Spectrom. 2014, 25, 524-529.

Satyanarayana, V. S. V.; Sivakumar, A. Ultrasound-Assisted Synthesis of 2,5-dimethyl-N-substituted Pyrroles Catalyzed by Uranyl Nitrate Hexahydrate. Ultrason. Sonochem. 2011, 18, 917-922.

Sekimoto, Kanako, and Mitsuo Takayama. "Negative ion formation and evolution in atmospheric pressure corona discharges between point-to-plane electrodes with arbitrary needle angle." *The European Physical Journal D* 60.3 (2010): 589-599.

Sekimoto, K.; Takayama, M. Fundamental Processes of Corona Discharge. J. Inst. Electrostat. Jpn. 2009, 33, 38-42.

Sheng, H.; Tang, W.; Yerabolu, R.; Max, J.; Kotha, R. R.; Riedeman, J. S.; Nash, J. J.; Zhang, M.; Kenttämaa, H. I. Identification of N-Oxide and Sulfoxide Functionalities in Protonated Drug Metabolites by Using Ion-molecule Reactions in a Linear Quadrupole Ion Trap Mass Spectrometer. J. Org. Chem. 2016, 81, 575-586.

Smoluch, M.; Mielczarek, P.; Silberring, J. Plasma-Based Ambient Ionization Mass Spectrometry in Bioanalytical Sciences. Mass. Spec. Rev. 2016, 35, 22-34.

Software for estimating vapor pressures (EPI Suite—Estimation Program Interface v4.11) was provided by United States Environmental Protection Agency. https://www.epa.gov/tsca-screening-tools/download-epi-suitetm-estimation-program-interface-v411. Accessed Feb. 5, 2020.

Sun, S.; Kennedy, R. T. Droplet Electrospray Ionization Mass Spectrometry for High Throughput Screening for Enzyme Inhibitors. Anal. Chem. 2014, 86, 9309-9314.

Susa, Anna C., Zijie Xia, and Evan R. Williams. "Small emitter tips for native mass spectrometry of proteins and protein complexes from nonvolatile buffers that mimic the intracellular environment." Analytical chemistry 89.5 (2017): 3116-3122.

Susa, Anna C., Zijie Xia, and Evan R. Williams. "Native mass spectrometry from common buffers with salts that mimic the extracellular environment." Angewandte Chemie International Edition 56.27 (2017): 7912-7915.

Szwarc, M. The Dissociation Energy of the N—N Bond in Hydrazine. Proc. Roy. Soc. A 1949, 198, 267-284.

Veisi, H.; Azadbakht, R.; Ezadifar, M.; Hemmati, S. An Efficient and Green Procedure for Synthesis of Pyrrole Derivatives by Paal-Knorr Condensation Using Sodium Dodecyl Sulfate in Aqueous Micellar. J. Heterocycl. Chem. 2013, 50, E241-E246.

Wang, A.; Qin, M.; Guan, J.; Wang, L.; Guo, H.; Li, X.; Wang, Y.; Prins, R.; Hu, Y. The Synthesis of Metal Phosphides: Reduction of Oxide Precursors in a Hydrogen Plasma. Angew. Chem. Int. Ed. 2008, 47, 6052-6054.

Wang, B.; Gu, Y.; Luo, C.; Yang, T.; Yang, L.; Suo, J. Pyrrole Synthesis in Ionic Liquids by Paal-Knorr Condensation under Mild Conditions. Tetrahedron Lett. 2004, 45, 3417-3419.

Wei, Z.; Han, S.; Gong, X.; Zhao, Y.; Yang, C.; Zhang, S.; Zhang, X. Angew. Chem. Int. Ed. 2013, 52, 11025-11028.

Wleklinski, M.; Loren, B. P.; Ferreira, C. R.; Jaman, Z.; Avramova, L.; Sobreira, T. J. P.; Thompson, D. H.; Cooks, R. G. High Throughput Reaction Screening using Desorption Electrospray Ionization Mass Spectrometry. Chem. Sci. 2018, 9, 1647-1653.

Xie, Y.; He, L. F.; Lin, S.-C.; Su, H.-F.; Xie, S.-Y.; Huang, R.-B.; Zheng, L.-S. Desorption Electrospray Ionization Mass Spectrometry for Monitoring the Kinetics of Baeyer-Villiger Solid-State Organic Reactions. J. Am. Soc. Mass Spectrom. 2011, 20, 2087-2092.

Yan, X.; Augusti, R.; Li, X.; Cooks, R. G. Chemical Reactivity Assessment Using Reactive Paper Spray Ionization Mass Spectrometry: The Katritzky Reaction. ChemPlusChem. 2013, 78, 1142-1148.

Yi, Y.; Zhou, J.; Guo, H.; Zhao, J.; Su, J.; Wang, L.; Wang, X.; Gong, W. Safe Direct Synthesis of High Purity H2O2 through a H2/O2 Plasma Reaction. Angew. Chem. Int. Ed. 2013, 52, 8446-8449.

(56) References Cited

OTHER PUBLICATIONS

Zhang, W.; Huang, G. M. Fast Screening of Analytes for Chemical Reactions by Reactive Low-Temperature Plasma Ionization Mass Spectrometry. Rapid Commun. Mass Spectrom. 2015, 29, 1947-1953.

Zhang, Zezhen, et al. "Electro-kinetic assisted electrospray ionization for enhanced complex sample analysis." Talanta 164 (2017): 45-51.

Zhang, Zezhen, et al. "Electrophoretic desalting to improve performance in electrospray ionization mass spectrometry." Analytical chemistry 90.6 (2018): 3856-3862.

Zhao, F.; Matt, S. M.; Bu, J.; Rehrauer, O. G.; Ben-Amotz, D.; McLuckey, S. A. J. Am. Soc. Mass Spectrom. 2017, 28, 2001-2010.

Zhao, Y.; Riley, N. M.; Sun, L.; Hebert, A. S.; Yan, X.; Westphall, M. S.; Rush, M. J. P.; Zhu, G.; Champion, M. M.; Medie, F. M.; DiGiuseppe Champion, P. A.; Coon, J. J .; Dovichi, N. J. Coupling Capillary Zone Electrophoresis with Electron Transfer Dissociation and Activated Ion Electron Transfer Dissociation for Top-Down Proteomics. Anal. Chem. 2015, 87, 5422-5429.

International Search Report and Written Opinion, dated Feb. 1, 2022, received in connection with corresponding International Patent Application No. PCT/US2021/058303.

* cited by examiner

EtAc / HUMAN BLOOD

*MW* 130

1

*MW* 194

2

*MW* 272

3

*MW* 303

4

*MW* 397

5

THE NON-CONTACT RULE
NON-INERT ELECTRODES AND ISOMER DIFFERENTIATION

HYDRAZINE ($-NHNH_2$)

PRIMARY AMINE ($-NH_2$)

METHOD AND APPARATUS FOR MASS SPECTROMETRY

CROSS-REFERENCE TO RELATED APPLICATION

This application is a U.S. National Stage application filed under 35 U.S.C. § 371 of PCT/US2021/058303 filed Nov. 5, 2021, which claims the benefit of U.S. Provisional Application Nos. 63/110,119, filed Nov. 5, 2020, and 63/116,973, filed Nov. 23, 2020, the contents of each are hereby incorporated in their entirety.

STATEMENT OF GOVERNMENT SUPPORT

This invention was made with government support under Grant No. 1900271, awarded by the National Science Foundation and Grant No. DE-SC0016044 awarded by the Department of Energy. The government has certain rights in the invention.

FIELD OF THE INVENTION

The invention is directed to apparatuses and systems for ionizing and analyzing various organic compounds and methods for doing the same.

BACKGROUND

The advent of ambient mass spectrometry (MS) enabled a rapid analysis of complex mixtures without pre-treatment. This capability was made possible through various desorption processes that selectively transfer the analyte of interest (not the whole multiphase sample) to the mass spectrometer. This feature of ambient ionization is attractive because experiments are performed outside of the vacuum environment of the mass spectrometer, which allows direct access to the sample during analysis. Aside from quantitation and high throughput requirements, another important merit in the biomedical field is the analysis of microsamples (<50 μL) with minimal dilution.

Many studies have investigated various aspects of the nano-electrospray ionization (nESI) setup, including (i) the mode by which the analyte solution is electrically charged (i.e., contact versus non-contact), (ii) the source/nature of the electrical energy (e.g., piezoelectric discharge, triboelectric nano-generator, pulsed direct current (DC)/alternating current (AC) voltage and square-wave potential), (iii) flow-rate manipulation to control ion suppression and sample consumption (e.g., via the use of smaller tip on-demand pulsed charges), (iv) reduction of electrical current (via the use of high input ohmic resistance) to avoid destructive corona discharge phenomenon when electrospraying under high voltage conditions and (v) the use of other operational tricks like step voltage and polarity reverse applications. None of these methods are completely adequate, especially for simultaneous generation of different ion types.

There remains a need for an integrated, robust, and versatile nESI system that can quantitatively and rapidly ionize polar and non-polar organic compounds, isomeric compounds, and large bio-molecules in various matrices. Also, there is still a need for an integrated, robust, and versatile nESI system that can be used with any sample media, such as solid, liquid and gaseous samples.

SUMMARY

The present invention is directed to an apparatus comprising: a) one or more sampling vessels having an inlet and an outlet, wherein the one or more sampling vessels is configured to receive a predetermined volume of an analyte sample and to form a headspace within the one or more sampling vessels; wherein the inlet and the outlet are in fluid communication with the headspace; and wherein the outlet is configured to allow fluid communication between the one or more sampling vessels and an analyzer; b) one or more electrospray ionization (ESI) electrodes disposed within the one or more sampling vessels such that it is in electrical communication with at least the headspace of the one or more sampling vessel; c) a corona electrode disposed outside of the one or more sampling vessels and configured under effective conditions to form a corona discharge, wherein the corona discharge is formed adjacent to the outlet of the one or more sampling vessels; wherein each of the one or more sampling vessels comprises one of the one or more ESI electrodes; wherein the one or more ESI electrodes and the corona electrode are in electrical communication with at least one high voltage source; and wherein the device is an ion source adapted for mass spectrometry.

Also disclosed herein is an apparatus comprising: a) one or more sampling vessels having an inlet and an outlet, wherein the one or more sampling vessels is configured to receive a predetermined volume of an analyte sample and to form a headspace within the one or more sampling vessels; wherein the inlet and the outlet are in fluid communication with the headspace; and wherein the outlet is configured to allow fluid communication between the one or more sampling vessels and an analyzer; b) one or more of non-inert electrospray ionization (ESI) electrodes disposed within the one or more sampling vessels such that it is in electrical communication with at least the headspace and with at least a portion of the analyte sample when present; wherein the one or more non-inert ESI electrodes are configured to catalyze a reaction within the analyte sample; c) corona electrode disposed outside of the one or more sampling vessels and configured under effective conditions to form a corona discharge, wherein the corona discharge is formed adjacent to the outlet of the one or more sampling vessels; wherein each of the one or more sampling vessels comprises one of the one or more ESI electrodes; wherein the one or more ESI electrodes and the corona electrode are in electrical communication with at least one high voltage source; and wherein the device is an ion source adapted for mass spectrometry.

Still further disclosed herein is a mass-spectrometer comprising any of the disclosed herein apparatuses, wherein the at least one high voltage source is not in electrical communication with the mass-spectrometer, and wherein the mass-spectrometer is configured to detect both positive and negative ions in a positive mode or a negative mode of operation, respectively.

In still further aspects, disclosed herein is a method for detecting at least one organic compound comprising a) providing an apparatus comprising: i) one or more sampling vessels having an inlet and an outlet, wherein the one or more sampling vessels comprises a predetermined volume of an analyte sample and a headspace; wherein the inlet and the outlet are in fluid communication with the headspace; and wherein the outlet is configured to allow fluid communication between the one or more sampling vessels and an analyzer; ii) one or more electrospray ionization (ESI) electrodes disposed within the one or more sampling vessels such that each of the one or more sampling vessels comprises one of the one or more ESI electrodes, and wherein the one or more ESI electrodes are in electrical communication with at least the headspace; iii) a corona electrode disposed outside of the one or more sampling vessels; b) supplying a direct current (DC) voltage to i) the one or more ESI electrodes to generate a plurality of charged droplets; or to the one or more ESI electrode to generate the plurality of charged droplets and to the corona electrode to the corona discharge; and c) passing the plurality of charged droplets through the outlet of the one or more sampling vessels to an analyzer.

Also disclosed herein is a method of measuring positive and negative ions in an analyte solution comprising: a) providing any of the disclosed herein apparatuses; b) generating positive and negative ions comprising at least one compound of an analyte sample provided within the one or more sampling vessels and/or comprising at least one compound of a supplementary analyte sample if it is optionally provided adjacent to the corona electrode; c) detecting positive and negative ions in a positive mode of a mass-spectrometer; and/or d) detecting positive and negative ions in a negative mode of a mass-spectrometer.

Additional aspects of the disclosure will be set forth, in part, in the detailed description, figures, and claims which follow, and in part will be derived from the detailed description or can be learned by practice of the invention. It is to be understood that both the foregoing general description and the following detailed description are exemplary and explanatory only and are not restrictive of the invention as disclosed.

BRIEF DESCRIPTION OF THE FIGURES

(FIG. 10A) Optical image showing the size of nESI tips measured by microscope and (FIG. 10B) microscope stage micrometer calibration slide with 10 micron line resolution. The nESI tip size was determined to be approximately 5 μm.

FIG. 12A shows a schematic of an ionic source in one aspect. Each spectrum shows a different analysis time domain, from 0-0.16 min (FIG. 12B), to 0.16-0.22 min (FIG. 12C), to 0.22-2.5 min (FIG. 12D). Note: no acid was added to the solution.

FIGS. 13A-13C show selected mass spectra at different time domains, namely 0-0.35 min, 0.35-1.3 min and 1.3-5 min, respectively.

FIG. 16C=compound key.

FIG. 17B depicts results for a small molecule compound; FIG. 17C depicts results for ubiquitin; FIG. 17D depicts results for cytochrome C.

DETAILED DESCRIPTION

Figure 1:
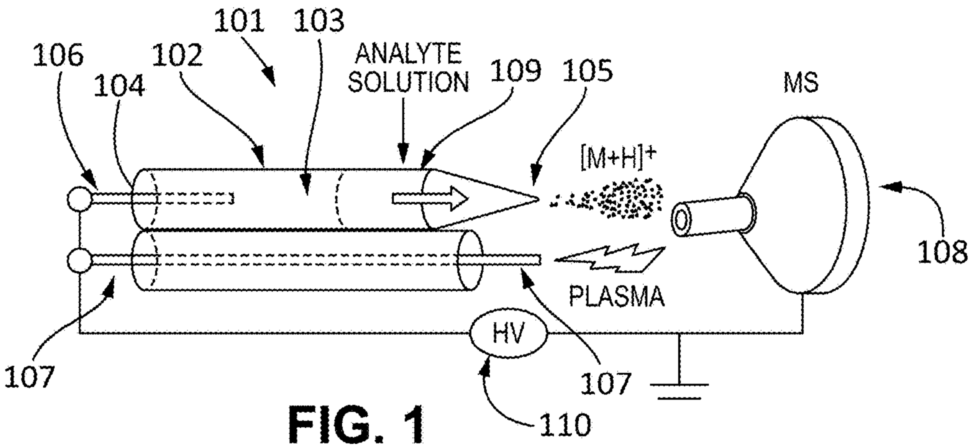
FIG. 1 depicts an ionization chamber with a separate ESI electrode and a corona electrode in one aspect.

The present invention can be understood more readily by reference to the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

DEFINITIONS

As used herein, the singular forms "a," "an" and "the" include plural referents unless the context clearly dictates otherwise. Thus, for example, reference to an "electrode" includes aspects having two or more such electrodes unless the context clearly indicates otherwise.

It is appreciated that certain features of the disclosure, which are, for clarity, described in the context of separate aspects, can also be provided in combination in a single aspect. Conversely, various features of the disclosure, which are, for brevity, described in the context of a single aspect, can also be provided separately or in any suitable subcombination.

As used herein, the terms "optional" or "optionally" mean that the subsequently described event or circumstance may or may not occur and that the description includes instances where said event or circumstance occurs and instances where it does not.

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims, which follow, reference will be made to a number of terms that shall be defined herein.

For the terms "for example" and "such as," and grammatical equivalences thereof, the phrase "and without limitation" is understood to follow unless explicitly stated otherwise.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value and/or to "about" another particular value. When such a range is expressed, another aspect includes from the one particular value and/or to the other particular value.

Similarly, when values are expressed as approximations, by use of the antecedent "about," it will be understood that the particular value forms another aspect. It will be further understood that the endpoints of each of the ranges are significant both in relation to the other endpoint and independently of the other endpoint. Unless stated otherwise, the term "about" means within 5% (e.g., within 2% or 1%) of the particular value modified by the term "about."

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range.

As used herein, the term "composition" is intended to encompass a product comprising the specified ingredients in the specified amounts, as well as any product which results, directly or indirectly, from a combination of the specified ingredients in the specified amounts.

A weight percent (wt. %) of a component, unless specifically stated to the contrary, is based on the total weight of the formulation or composition in which the component is included.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein, the term "and/or" includes any and all combinations of one or more of the associated listed items.

It will be understood that, although the terms "first," "second," etc., may be used herein to describe various elements, components, regions, layers and/or sections. These elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein interpreted accordingly.

As used herein, the term "substantially" means that the subsequently described event or circumstance completely occurs or that the subsequently described event or circumstance generally, typically, or approximately occurs.

Still further, the term "substantially" can in some aspects refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, component, composition, or other condition for which substantially is used to characterize or otherwise quantify an amount.

In other aspects, as used herein, the term "substantially free," when used in the context of a composition or component of a composition that is substantially absent, is intended to indicate that the recited component is not intentionally batched and added to the composition, but can be present as an impurity along with other components being added to the composition. In such aspects, the term "substantially free" is intended to refer to trace amounts that can be present in the batched components, for example, it can be present in an amount that is less than about 1% by weight, e.g., less than about 0.5% by weight, less than about 0.1% by weight, less than about 0.05% by weight, or less than about 0.01% by weight of the stated material, based on the total weight of the composition.

As used herein, the term "substantially," in, for example, the context "substantially identical" or "substantially similar" refers to a method or an apparatus, or a component that is at least about 90%, at least about 91%, at least about 92%, at least about 93%, at least about 94%, at least about 95%, at least about 96%, at least about 97%, at least about 98%, at least about 99%, or about 100% by similar to the method, system, or the component it is compared to.

Exemplary systems and methods are also disclosed in the International Patent Application No. PCT/US2020/30458 and provisional application No. 63/110,199, the contents of which are incorporated herein in their all entirety.

While aspects of the present invention can be described and claimed in a particular statutory class, such as the system statutory class, this is for convenience only, and one of ordinary skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

The present invention may be understood more readily by reference to the following detailed description of various aspects of the invention and the examples included therein and to the Figures and their previous and following description.

The present invention may be understood more readily by reference to the following detailed description of various aspects of the invention and the examples included therein and to the Figures and their previous and following description.

APPARATUS

In some aspects disclosed herein, an apparatus that can be used as an ion source. In certain aspects, the disclosed herein ion source is a panoptic ionic source.

It is understood that the disclosed herein apparatuses can operate through a non-contact charging mechanism initiated by electrostatic induction. In yet other aspects, the disclosed apparatuses can charge analytes through contact charging mechanism. Yet in other aspects, the disclosed apparatuses can charge analytes through hybrid mechanisms comprising a non-contact and contact mechanisms. In yet other embodiments, the disclosed apparatuses can charge analytes via 1) electrospray ionization-based and/or 2) atmospheric pressure chemical ionization-base mechanisms. In such exemplary and unlimiting aspects, polar, non-polar, small organic and large biomolecular compounds can be analyzed from the disclosed source.

In still further aspects, the disclosed herein apparatus comprises: a) one or more sampling vessels having an inlet and an outlet, wherein the one or more sampling vessels is configured to receive a predetermined volume of an analyte sample and to form a headspace within the one or more sampling vessels; wherein the inlet and the outlet are in fluid communication with the headspace; and wherein the outlet is configured to allow fluid communication between the one or more sampling vessels and an analyzer; b) one or more electrospray ionization (ESI) electrodes disposed within the one or more sampling vessels such that it is in electrical communication with at least the headspace of the one or more sampling vessel; c) a corona electrode disposed outside of the one or more sampling vessels and configured under effective conditions to form a corona discharge, wherein the corona discharge is formed adjacent to the outlet of the one or more sampling vessels; wherein each of the one or more sampling vessels comprises one of the one or more ESI electrodes; wherein the one or more ESI electrodes and the corona electrode are in electrical communication with at least one high voltage source; and wherein the device is an ion source adapted for mass spectrometry.

Apparatuses, as disclosed in various aspects herein, are shown in the enclosed drawings (for example, various apparatuses are shown in FIGS. 1-2, 12A, 17A, 18A, 19, and 20).

An exemplary apparatus is depicted in FIG. 1. The apparatus (101) is provided that includes at least one sampling vessel (102) that is configured to receive a predetermined volume of an analyte sample (109) and to define a headspace (103). The exemplary sampling vessel (102) has an inlet (104) and an outlet (105), the inlet and outlet each in fluid communication with the headspace (103). The exemplary apparatus further comprises at least one ESI electrode (106) that is disposed within the sampling vessel such that it is in electrical communication with the at least the headspace of the sampling vessel. The exemplary apparatus further comprises a corona electrode (107) that is disposed outside of the sampling vessel (102). As it can be further seen, the ESI electrode and the corona electrode can be in electrical communication with at least one high voltage source (110). In this exemplary aspect, the apparatus is configured to be in electrical communication with an analyzer (108) through the at least one high voltage source (110)

In still further aspects, the inlet of the sampling vessel is configured to receive one or more analyte samples or any other reagents or modifiers if desired. The outlet of the sampling vessel is configured to permit fluid communication between the headspace, the analyte sample, and the analyzer (108).

It is understood that in some aspects, the inlet of the one or more sampling vessels has a diameter larger than the diameter of the outlet. In still further aspects, at least a portion of the one or more sampling vessels is tapered to a tip to form the outlet. In yet further aspects, the sampling vessel can have a capillary tip. In certain aspects, the sampling vessels can be made from any suitable materials, for example, and without limitations, it can be made from a suitable non-conductive material, e.g., glass, plastic, poly (tetrafluoroethylene), fiberglass, rubber, ceramic and the like. In yet further aspects, the sampling vessels can be made of glass, including borosilicates and quartz.

Also disclosed herein are aspects where the corona electrode can be positioned as it without any enclosing. While in other aspects, the corona electrode can be positioned within a vessel. In such exemplary aspects, where the corona electrode is positioned within the vessel, the vessel can be made of any suitable material, for example, any suitable non-conductive material. For example and without limitations, the material used for the vessel containing the corona electrode can comprise any glass, including, for example, and without limitation, borosilicates and quartz.

The total thickness of the non-conductive material can be from 0.05-1.0 mm, from 0.05-0.75 mm, from 0.05-0.5 mm, from 0.1-0.5 mm, from 0.1-0.4 mm, or from 0.2-0.5 mm. For embodiments in which the electrode is a wire, glass rods having inner diameters ranging from 0.2-2.0 mm, from 0.2-1.5 mm, from 0.5-1.5 mm, or from 1.0-1.5 mm can serve as the insulator.

Figure 19:
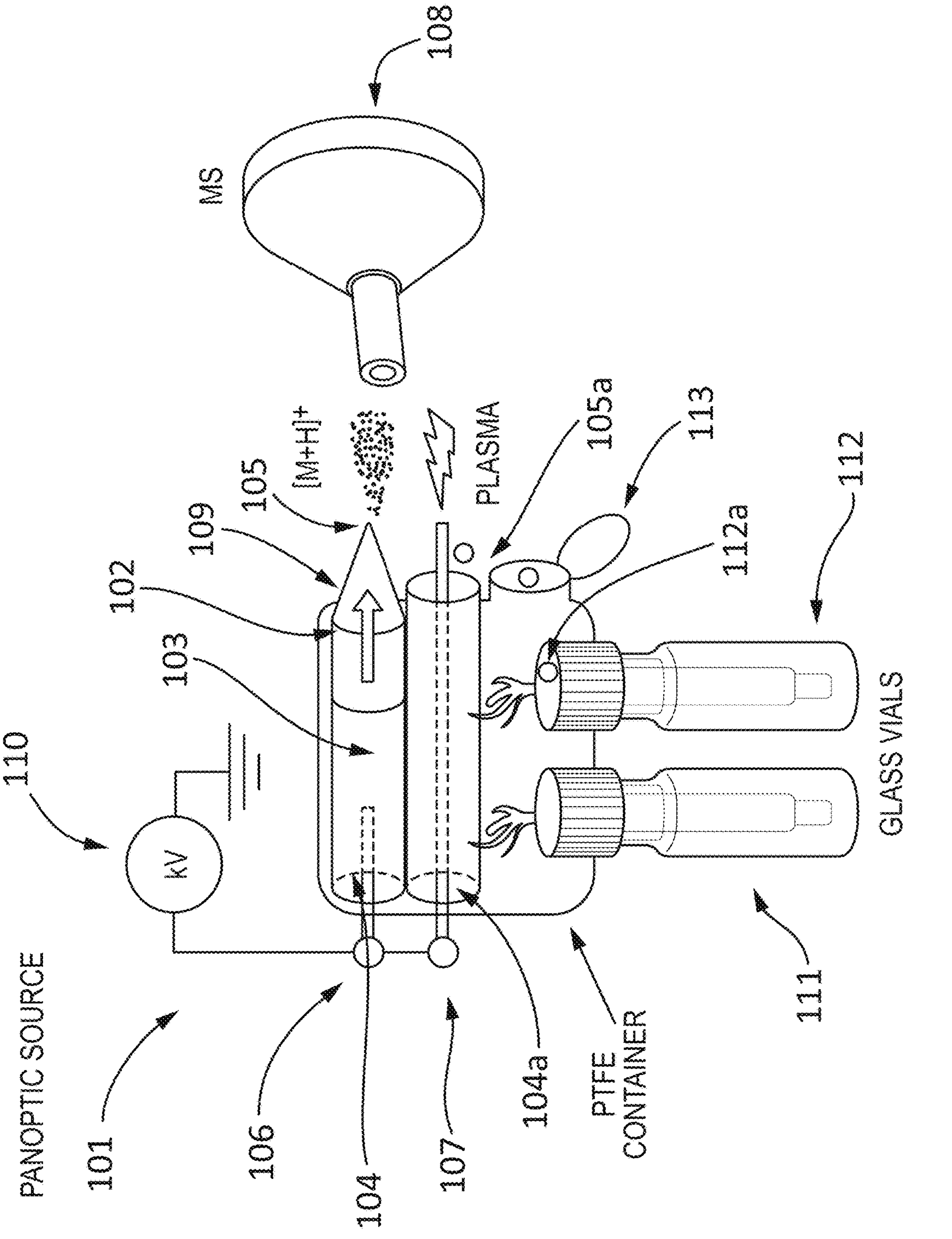
FIG. 19 depicts a schematic of an exemplary ion source in one aspect.
Figure 20:
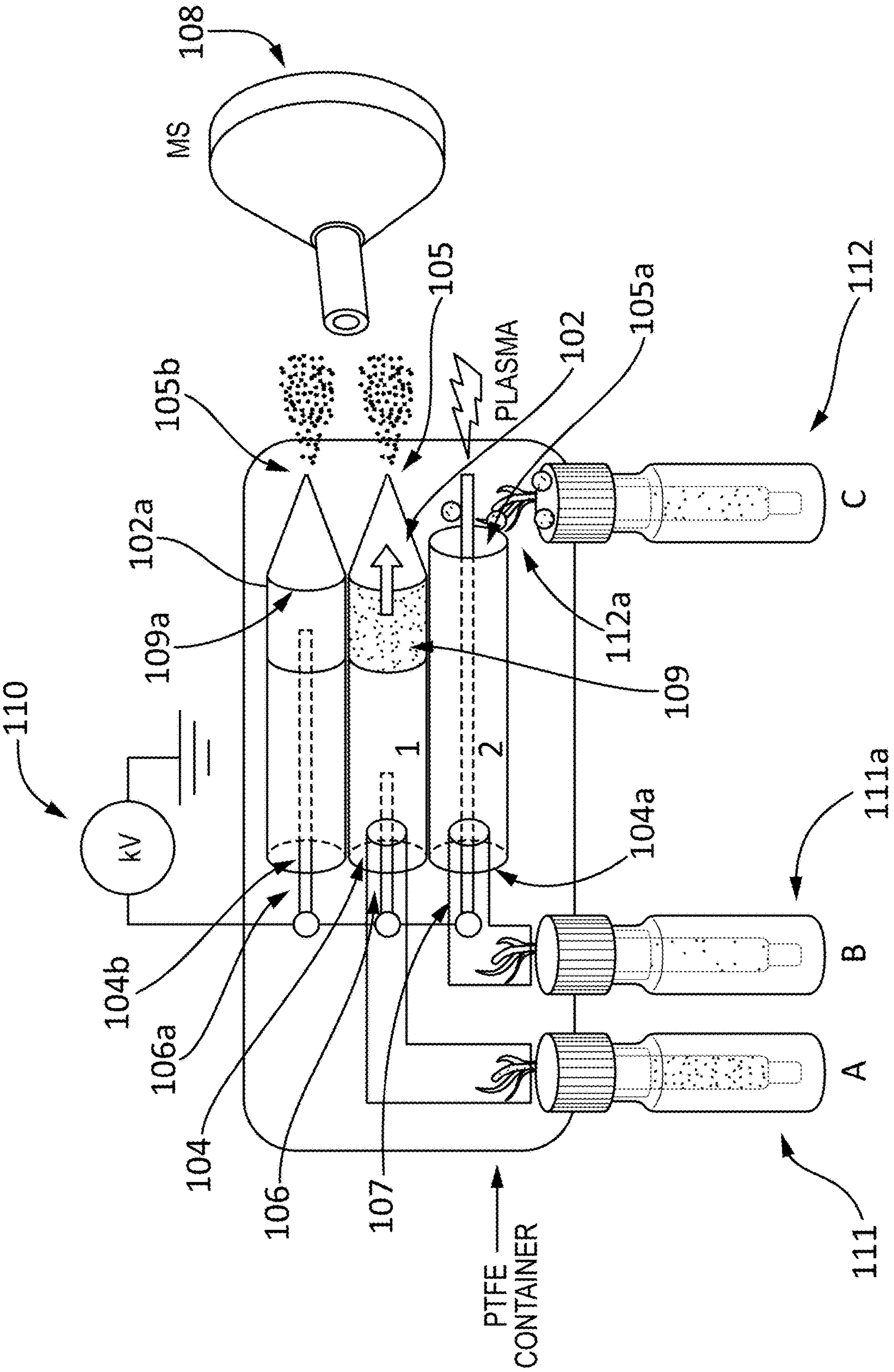
FIG. 20 depicts a schematic of an exemplary ion source in one aspect.

In still further aspects, the inlet of the one or more sampling vessels is configured to be in fluid communication with at least one composition comprising one or more of a reagent, an analyte, a modifier, or a combination thereof. FIG. 19 and FIG. 20 show exemplary apparatuses wherein the inlet of the one or more sampling vessels configured to be in fluid communication with additional reagents and analytes.

For example and as seen in FIG. 19, apparatus 101 can comprise one sampling vessel 102 having an inlet 104 and an outlet 105. The sampling vessel comprises an analyte sample 109 and a headspace 103. The apparatus further comprises an ESI electrode 106 that is in electrical and fluid communication with the headspace 103. The apparatus 101 further comprises a corona electrode 107 that can be positioned within a vessel having an inlet 104*a* and an outlet 105*a*.

In certain aspects, the inlet 104 of the sampling vessel can be in fluid communication with at least one composition 111 and/or 112. In certain aspects, the at least one composition is volatile. In yet further aspects, the composition can be a reagent, an analyte, or modifier, or any combination thereof. It is understood that in the aspects wherein the at least one composition is a reagent, this reagent can react with the analyte sample present in the sampling vessel to produce the desired product that needs to be analyzed. In yet other aspects, the at least one composition can comprise a modifier. In such aspects, the modifier can be any composition that can modify the analyte sample, for example. In some aspects, the modifier can comprise, for example, and without limitation, a pH modifier. In such exemplary aspects, the modifier can comprise an acid or a base and adjust the pH of the analyte sample if desired by allowing small amounts of the modifier to reach the analyte sample.

In certain aspects, the at least one composition can also comprise an analyte that is the same or different than the analyte sample present in the sampling vessel. In such aspects, the analyte present in the at least one composition can be allowed to reach the analyte sample in the sampling vessel, if needed. In such exemplary aspects, a mixture of the two analyte samples can be determined by the analyzer.

In still further aspects, the at least one composition is in fluid communication with at least the headspace of the one or more sampling vessels. In still further aspects, the at least one composition is in electrical communication with the one or more ESI electrodes.

It is understood that the at least one composition is disposed in a container that is configured to be removably coupled with the inlet of the one or more sampling vessels. In such exemplary aspects, these compositions can be provided in separate vials and vaporized to allow vapors to reach the inlet of the sampling vessel, for example. In still further aspects, the apparatus can comprise at last one valve that is configured to control a flow of the at least one composition through the inlet of the one or more sampling vessels.

In such exemplary and unlimiting aspects, the at least one composition is positioned at about 5 mm to about 10 mm, including exemplary values of about 5.5 mm, about 6 mm, about 6.5 mm, about 7 mm, about 7.5 mm, about 8 mm, about 8.5 mm, about 9 mm, and about 9.5 mm, from the one or more ESI electrodes and/or the corona electrode.

As disclosed above, the ESI electrode and the corona electrode disclosed herein are in electrical communication with the high voltage source 110. In some aspects, the high voltage 110 is also in electrical communication with the analyzer 108, as shown in FIG. 1. However, also disclosed are aspects where the high voltage 110 is separate from the analyzer and is not in electrical communication with the analyzer, as shown in FIGS. 19 and 20. It is understood that in such exemplary aspects, it is possible to apply the same or different voltage to the one or more ESI electrodes and/or corona electrodes if desired.

In still further aspects, and as shown in FIG. 19 more than one composition can be present, for example, additional compositions 111 and 112.

In yet other aspects, the corona electrode can also be in electrical communication with one or more supplementary analyte samples that are the same or different from the analyte sample and are configured to be at least partially vaporized and ionized by the corona discharge.

In some aspects, at least one of one or more supplementary analyte samples comprise at least one volatile compound. Yet, in other aspects, at least one of one or more supplementary analyte samples comprise at least one solid compound.

In still further aspects, the least one of one or more supplementary analyte samples comprising at least one solid compound can be positioned from the corona electrode at an effective distance that allows to at least partially vaporize and ionize the at least one solid compound with the corona discharge. This exemplary aspect is also shown in FIGS. 19 and 20. For example, as shown in FIG. 19, the vial 112 can comprise a solid analyte **112*a*. The analyte 112*a* can be disposed into proximity of the corona electrode 107 through exemplary valve 113** and be vaporized and ionized with the corona discharge.

In still further aspects, any distance that is effective to vaporize and ionize the analyte can be applied. In certain aspects, the effective distance can be from about 3 mm to about 6 mm, including exemplary values of about 3.5 mm, about 4.5 mm, about 5 mm, and about 5.5 mm from the corona electrode.

In aspects where the corona electrode is positioned within the vessel, the vessel can have an inlet **104*a* and 105*a* (FIG. 19**). In such aspects, the inlet of the vessel is configured to be in fluid communication with at least one of the one or more supplementary analyte samples.

In yet further aspects, the at least one of the one or more supplementary analyte samples is disposed in a container that is configured to be removably coupled with the inlet of the vessel. In still further aspects, a flow of the at least one of the one or more supplementary analyte samples to the inlet of the vessel can also be controlled with a valve (113, FIG. 19).

Also disclosed are aspects where two or more supplementary analyte samples are present. In such exemplary aspects, one supplementary analyte can comprise a liquid or a fluid sample, while a second can comprise a solid sample.

In still further aspects, the one or more ESI electrodes can comprise any known in the art conductive material. In some aspects, the comprises the one or more ESI electrodes comprises an inert conductive material. Yet, in other aspects, it can comprise a non-inert conductive material. In yet further aspects, the one or more electrodes can comprise Ag, Au, Pt, Pd, Ir, Rh, Ru, Ti, or any alloys thereof.

In some aspects, the one or more ESI electrodes is a wire, a plate, or has an irregular shape.

In certain aspects, the one or more ESI electrodes can be in fluid communication with the headspace only of the sampling vessel. In such aspects, the ESI electrodes are not in contact with the analyte sample. For instance, the ESI electrode can be spaced from the analyte sample at a distance that is from 0 to about 10 cm, including exemplary values of about 0.1 cm, about 0.5 cm, about 1 cm, about 1.5 cm, about 2 cm, about 2.5 cm, about 3 cm, about 3.5 cm, about 4 cm, about 4.5 cm, about 5 cm, about 5.5 cm, about 6 cm, about 6.5 cm, about 7 cm, about 7.5 cm, about 8 cm, about 8.5 cm, about 9 cm, and about 9.5 cm. It is also understood that the ESI electrode can be positioned at any distance having a value between any two foregoing values.

In still further aspects, however, the ESI electrode can be in direct contact with the analyte sample. It is also understood that disclosed herein are aspects where the ESI electrode can be removably situated within the sampling vessel depending on the desired application. In such aspects, the apparatus can be in communication with a control unit that would allow movement of the electrode from the analyte sample to the headspace and in the opposite direction as desired. The same control system can also determine the desired distance of the electrode from the analyte sample in aspects where the ESI electrode is not in contact with the analyte sample.

In certain aspects, the ESI electrode can be inert. In such exemplary and unlimiting aspects, the ESI electrode can comprise Ag, Au, or Pt, or alloys thereof. While, in other aspects, the ESI electrode can comprise non-inert materials. In such exemplary and unlimiting aspects, the ESI electrode can comprise Ti, Ru, Rh, or alloys thereof and is configured to catalyze one or more reactions within the analyte sample. When the non-inert electrodes are present, the aspects described herein comprise ESI electrode that can be positioned within the analyte sample when present in the one or more sampling vessels. Yet, in still further aspects, such non-inert ESI electrodes are also in electrical communication with the analyte sample when present in the one or more sampling vessels.

In some aspects, when small-molecule organic compounds are analyzed, for example, that the ESI electrode does not contact the analyte composition. Yet, when analysis of biopolymer organic compounds is needed, the ESI electrode can be configured to contact the analyte composition. Small molecules include non-polymeric compounds having a molecular weight less than or equal to about 1,500 Da. Biopolymers include peptides, proteins, nucleic acids, and polysaccharides, may be ionized by contacting the sample with the outer surface of the insulator.

In certain aspects and as disclosed herein, the corona electrode can comprise any known in the art conductive materials. In some aspects, the corona electrode comprises Ag, Au, Pt, Pd, Ir, Rh, Ru, Ti, or any alloys thereof. It is further understood that the corona electrode also can have any desired shape that would allow forming a corona discharge. In certain aspects, the corona electrode can comprise a wire, a plate, or have an irregular shape.

An additional exemplary and unlimiting aspect of the apparatus is shown in FIG. 20. As shown in FIG. 20, the apparatus can comprise at least two sampling vessels and at least two ESI electrodes, wherein a first ESI electrode is disposed within a first sampling vessel and a second ESI electrode is disposed within a second sampling vessel. In such aspects, the first ESI electrode is the same or different from the second ESI electrode.

Figure 18A:
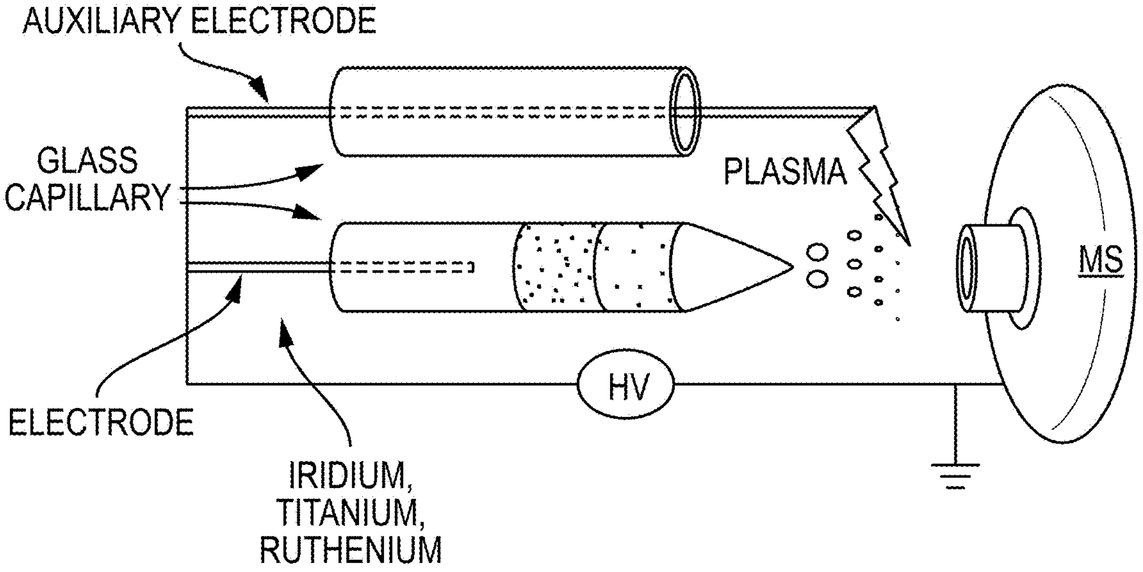
FIG. 18A depicts a schematic of an exemplary ion source in one aspect and the use of this ion source in isomer differentiation.
Figure 18B:
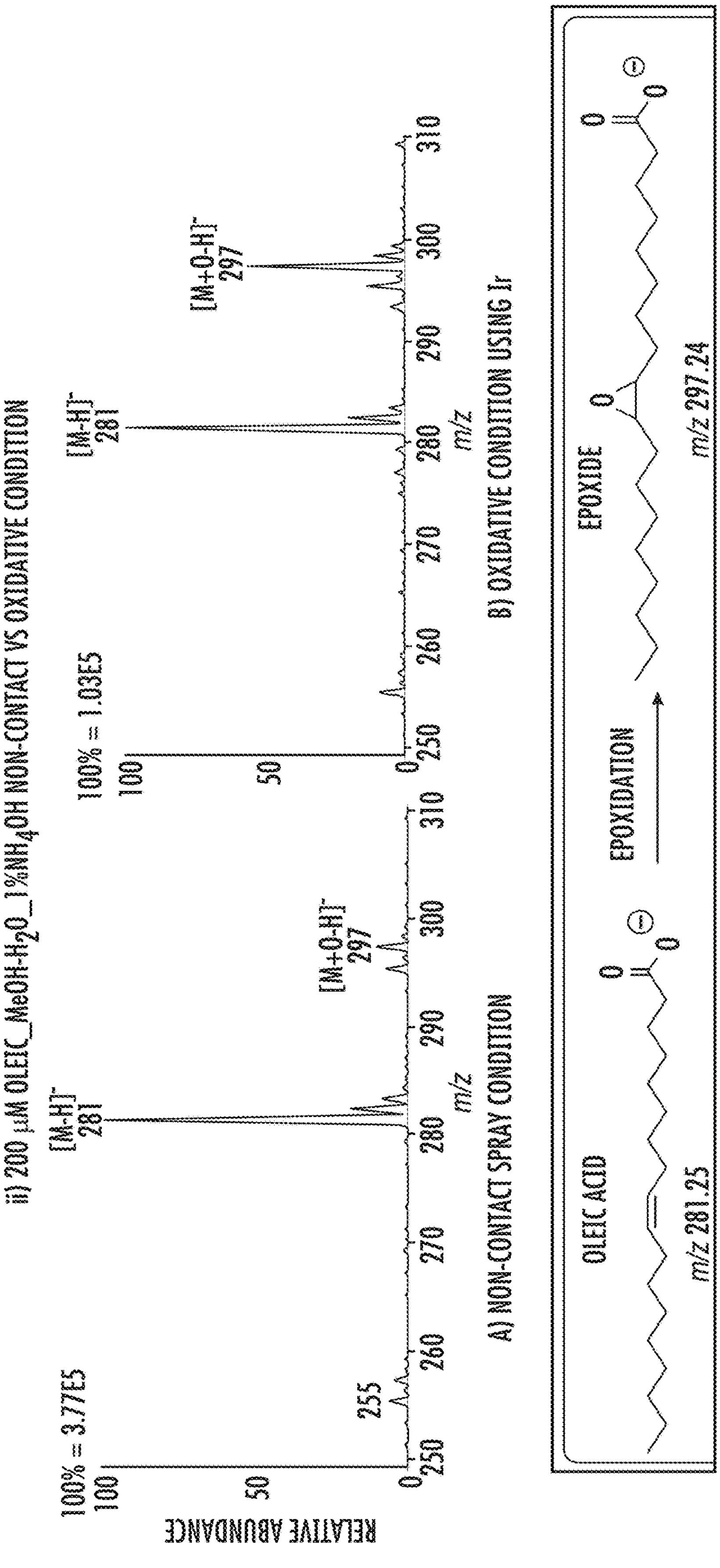
FIG. 18B depicts the analysis of oxidzed and unoxidized oleic acid.
Figure 18C:
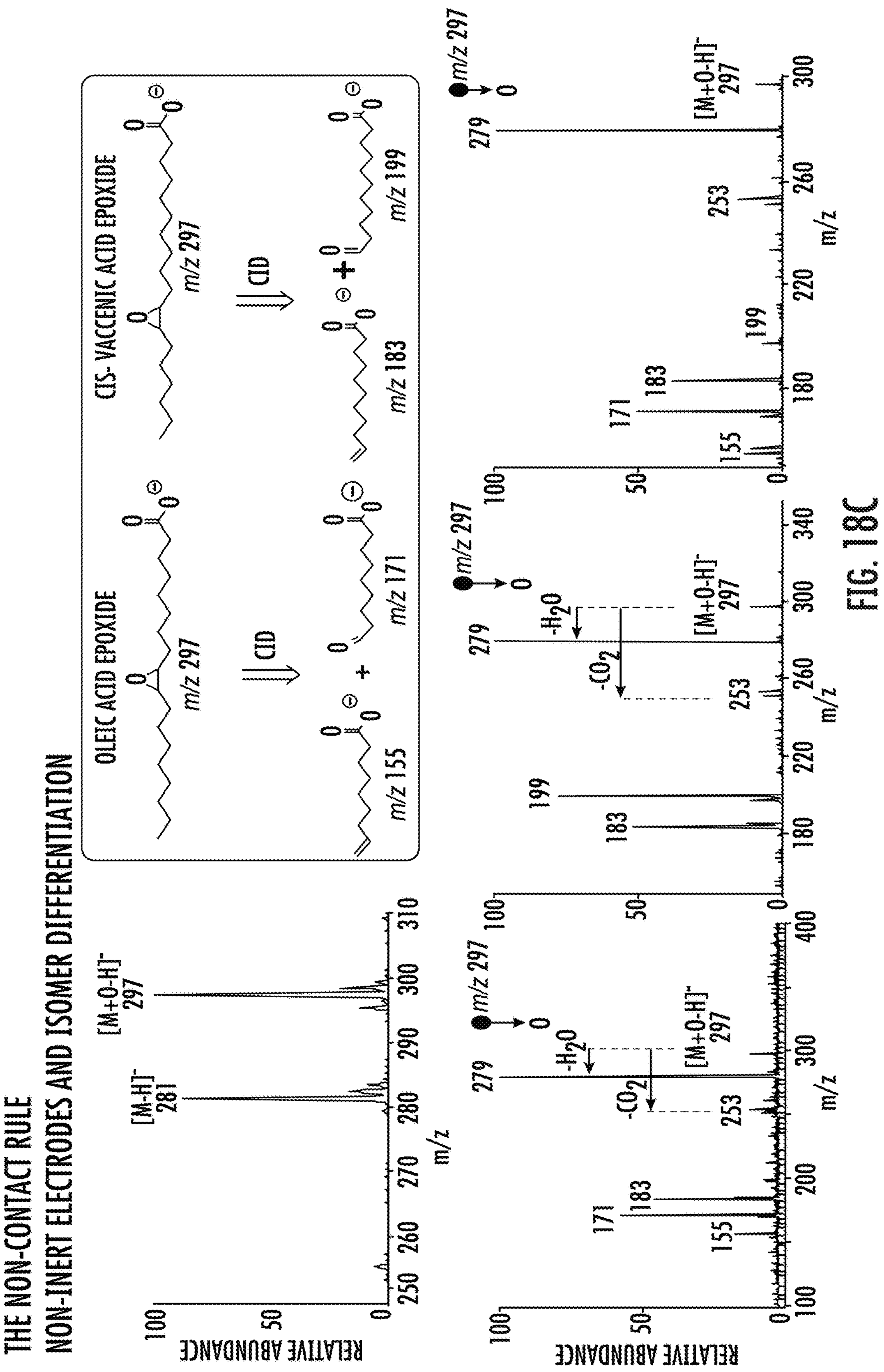
FIG. 18C depicts further analysis of fragmentation products from oleic acid epoxide.

In such exemplary aspects, the apparatus can comprise two sampling vessels 102 and 102*a*. For example, the sampling vessel 102 can comprise an ESI electrode 106 that is not in contact with the analyte sample 109. While the sampling vessel 102*a* comprises an ESI electrode 106*a* that is in contact with the analyte sample 109*a*. In such exemplary aspect, the ESI electrode 106 can be inert and can comprise, for example, and without limitation, Ag, Pt, or Au, or alloys thereof; yet, the ESI electrode 106*a* can be non-inert and comprise Ir, Pd, Rh, or Ti, or alloys thereof, and be configured to catalyze the analyte sample 106*a* to obtain the desired product. It is understood that the use of the non-inert ESI electrodes can allow determination of the compounds that otherwise would hard to determine. For example, and without limitation, having a mixture of various isomers can be difficult to analyze and differentiate, as different isomers, while having a different molecular structure, have the same molecular weight. In such exemplary aspects, the non-inert electrodes can be used to catalyze the isomers to produce products that are configured to fraction differently and to provide a mixture of ions having a different molecular weight. Some exemplary spectra are shown in FIGS. 18B and 18C.

The apparatus, as shown in FIG. 20 further comprises a corona electrode 107. The corona electrode can comprise any material as disclosed above.

As further shown in FIG. 20, the apparatus can also be in fluid communication with the at least one composition 111 that can behave as a modifier of the analyte sample 109. In some aspects, it can also behave as a reagent configured to react with the analyte sample 109. Still, further, the apparatus can also be in fluid communication with the one or more supplemental analyte samples 111*a* and 112, as disclosed above. In such aspects, the one or more supplemental analyte samples 111*a* and 112 can be in fluid communication with the inlet 104*a* and outlet 105*a* of the vessel housing the corona electrode, respectively. For example, and without limitation, at least one composition 111 can comprise volatile modifying reagents such as acids and bases to allow small volumes of samples (~$10^{-12}$ L) present at the tip of the sampling vessel to be modified. Yet, in other aspects, a headspace vapor of volatile material can be absorbed into the small solvent present at the glass tip and subsequently analyzed via electrospray.

In still further aspects, and as disclosed above, the apparatus as shown in FIG. 20 can also be in fluid communication with one or more supplementary analyte samples, such as depicted, for example, vials 111*a* and 112. In such exemplary and unlimiting aspects, the supplementary analyte sample 111*a* can comprise volatile liquids (e.g., perfumes) and/or solid (e.g., naphthalene) samples. While in other aspects, the supplementary analyte sample 112 can comprise low volatile solids like Vitamin D2 and Hydrocortisone or aqueous-based sample and complex mixtures such as urine and serum.

The corona electrode can be spaced apart from the outlet by a distance of between about 0.1 mm to about 20 mm, including exemplary values of about 0.5 mm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, and about 9.5 mm, about 10 mm, about 10.5 mm, about 11 mm, about 11.5 mm, about 12 mm, about 12.5 mm, about 13 mm, about 13.5 mm, about 14 mm, about 14.5 mm, about 15 mm, about 15.5 mm, about 16 mm, about 16.5 mm, about 17 mm, about 17.5 mm, about 18 mm, about 18.5 mm, about 19 mm and about 19.5 mm.

In yet further aspects, the one or more ESI electrodes are disposed at about 1 to about 10 mm from the corona electrode, including exemplary values of about 1.5 mm, about 2 mm, about 2.5 mm about 3 mm, about 3.5 mm about 4 mm, about 4.5 mm, about 5 mm, about 5.5 mm about 6 mm, about 6.5 mm about 7 mm, about 7.5 mm, about 8 mm, about 8.5 mm about 9 mm, and about 9.5 mm.

In still further aspects, the at least one high voltage source is configured to supply a positive and/or negative voltage to the one or more ESI electrodes and/or corona electrode. In some aspects, the high voltage can supply positive voltage to the one or more ESI electrodes and/or corona electrode. Yet, in other aspects, the high voltage can supply negative voltage to the one or more ESI electrodes and/or corona electrode. As disclosed in detail above, in some aspects, the high voltage source is in electrical communication with the analyzer. In such aspects, the voltage output will be defined by the analyzer itself. In yet other aspects; the high voltage source is a separate source that is not in electrical communication with the analyzer. In some exemplary aspects, the different voltage can be simultaneously applied to the one or more ESI electrodes and to the corona electrode. In still other aspects, if more than one ESI electrode is present, the different voltage can be applied to each of the ESI electrodes if desired. In yet other aspects, the voltage applied to all electrodes can be the same.

In still further aspects, the one or more ESI electrodes are configured to generate a plurality of charged droplets when the positive or negative voltage is applied. In certain aspects, the plurality of charged droplets can pass through the outlet and are then to be exposed to a corona discharge, while in other aspects, the analyte composition is directly contacted with the corona discharge.

In still further aspects, the positive and/or negative voltage that can be applied to the one or more ESI electrodes and/or corona electrodes can be in a range from about ±0.5 kV to about ±10 kV, including exemplary values of about ±. 1 kV, about ±1.5 kV, about ±2.0 kV, about 2.5 kV, about ±3.0 KV, about ±3.5 kV, about ±4.0 KV, about 5.5 kV, about ±6.0 kV, ±6.5 kV, about ±7.0 kV, about 7.5 kV, about ±8.0 kV, about ±8.5 kV, about ±9.0 kV, and about 9:5 kV.

It is understood that the precise range and the polarity of the voltages can be chosen based on the desired application, the composition of the analyte, the number of the sampling vessels, and the like.

In still further aspects, the one or more ESI electrodes and the corona electrode are disposed substantially in parallel to each other. It is also understood that the position of the ESI electrode relative to the corona electrode can be decided based on the desired application. For example, and without limitations, in some aspects, the one or more ESI electrodes is spatially disposed above the corona electrode. Yet in other exemplary aspects, the one or more ESI electrodes is spatially disposed below the corona electrode.

In aspects where two or more sampling vessels and two or more ESI electrodes are present, the positioning of each electrode and vessel can be determined by the skilled practitioner.

For example, and without limitations, the first ESI electrode, the second ESI electrode and the corona electrode can be spatially disposed in parallel to each other. In some aspects, the first ESI electrode is spatially disposed above the corona electrode and the second ESI electrode is spatially disposed above the first ESI electrode. Yet, in other aspects, the second ESI electrode can be spatially disposed above the corona electrode, and the first ESI electrode is spatially disposed above the second ESI electrode. In still further aspects, the corona electrode is spatially disposed above the first ESI electrode and the second ESI electrode is spatially disposed above the corona electrode. In still further aspects, the corona electrode is spatially disposed above the second ESI electrode, and the first ESI electrode is spatially disposed above the corona electrode.

Also disclosed are aspects where the first ESI electrode is spatially disposed above the second ESI electrode, and the corona electrode is spatially disposed above the first ESI electrode. Yet, in other aspects, the second ESI electrode is spatially disposed above the first ESI electrode, and the corona electrode is spatially disposed above the second ESI electrode.

As disclosed above and reiterated herein, the reactivity of two or more different samples can be evaluated using any of the disclosed apparatuses and methods. For example, and without limitation, the sampling vessel can be in fluid communication with a first container containing a first reagent and with a second container containing a second reagent. Exposing the headspace vapors of the first and second reagents to corona discharge induces gas-phase chemical reactions, the products of which can be evaluated using analyzers such as chromatography and mass spectrometry (e.g., tandem mass spectrometry and/or exact mass spectrometry). The skilled person understands that such systems may be easily expanded to include additional reagents in a third container, fourth container, etc. The disclosed systems are especially well suited for high throughput screening of many different reagent combinations. For instance, the first container containing the first reagent can be continuously in fluid communication with the enclosed vessel, while a plurality of different second containers containing different second reagents are sequentially brought into fluid communication with the enclosed vessel. The second containers may be switched manually or robotically, for instance, with the aid of an autosampler. As disclosed above, some aspects can include additional reagents and containers, the third, fourth, fifth, etc. containers that can also be in continuous fluid communication with the sampling vessel or can be sequentially brought into fluid communication with the sampling vessel, as needed by the end-user.

The gas-phase reactions can be conducted under air atmosphere, or under $N_2$, Ar, or in the presence of excess $H_2$ or excess $O_2$, as needed by the user. After ionization and analysis, as described above, also disclosed herein are methods of analyzing a plurality of samples by sequentially bringing a plurality of analyte containers into fluid communication with the sampling vessel. In some instances, the sampling vessel is in fluid communication with a reagent, and a plurality of analyte containers are sequentially communicated with the sampling vessel. In such aspects, it can be done either manually or robotically. It is understood that such exemplary aspects can greatly facilitate high-throughput screening assays.

In some instances, a solvent can be placed in the sampling vessel between the analyte sample and the outlet. The analyte sample and/or charged droplets contact the solvent, thereby increasing the sensitivity of the analytical method. In certain aspects, the solvents can include organic solvents, including polar aprotic solvents like ethyl acetate and acetone, or polar protic solvents like methanol and acetic acid. In some instances, the organic solvent can further include from 0.1-5% (v/v) water. In yet other aspects, these solvents can be used to conduct a microextraction of the desired components from the analyte sample into the solvent.

The ionized compounds are detectable and quantifiable, and so the outlet can be in fluid communication with an analyzer. It is understood that any known in the art analyzer can be used with the disclosed herein apparatus. In some aspects, the analyzer comprises a mass spectrometer. Yet in other aspects, the analyzer comprises an ion trap mass spectrometer, Orbitrap mass spectrometer, time of flight mass spectrometer, ion cyclotron resonance mass spectrometer, triple quadrupole mass spectrometer, or hybrids thereof. In some aspects, the ionized compounds can also be combined with a gas, for instance, an inert carrier gas, prior to transfer to the ionizer. The ionized compounds may be combined with the gas either by ionizing the compounds in the presence of a gas or by introducing a gas into a chamber containing the ionized compounds. In certain aspects, the ionized compounds may be combined with a reagent, for instance, an acid, a base, an oxidant, a solvent, or a combination thereof. The ionized compounds can be combined with the aforementioned gases and reagents prior to exposure to the corona discharge.

Additional aspects of the apparatuses are also enclosed. In certain aspects, the ESI electrode does not contact the walls of the sampling vessel. However, in certain aspects, the ESI electrode can be integrated with at least one wall of the sampling vessel that defines the headspace. For instance, the electrode can be integrated with the bottom wall of the chamber, thereby ensuring the analyte composition contacts the insulated electrode.

Figure 2:
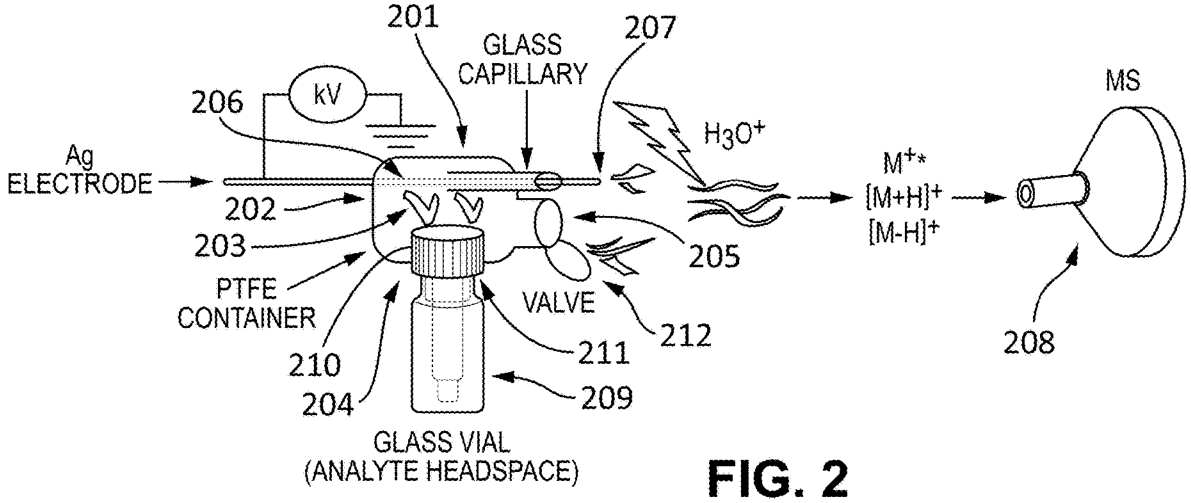
FIG. 2 depicts an ionization chamber with an integrated ESI and a corona electrode in one aspect.
Figure 3:
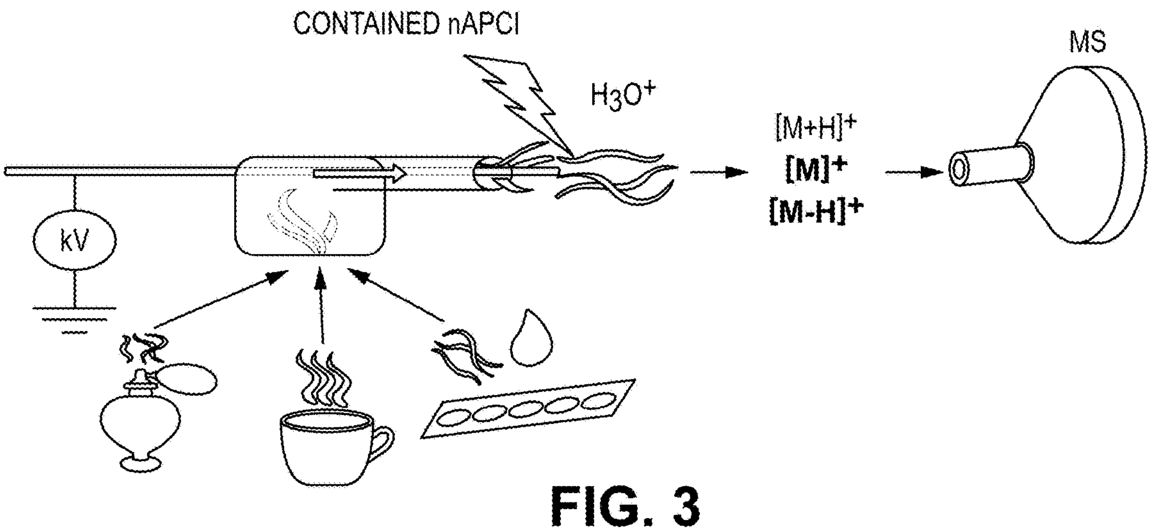
FIG. 3 depicts types of analyzes that can be ionized with the disclosed systems and methods.

Some additional aspects are also disclosed. For example, disclosed herein is an additional apparatus as depicted in FIG. 2, wherein the ESI electrode and corona electrode are physically integrated. An ionization chamber (201) is provided that includes an enclosed vessel (202) defining a headspace (203), an inlet (204) and an outlet (205), the inlet and outlet each in fluid communication with the headspace, the inlet for receiving an analyte; ESI electrode portion (206) in electrical communication with the headspace; a corona electrode portion (207) that is electrically integrated with the ESI electrode, disposed outside the chamber and adjacent to the outlet; and the outlet is configured to permit fluid communication between the headspace and an analyzer (208). Outlet (205) includes a recloseable valve (212), thereby permitting fluid communication with the analyzer, and may be closed, thereby restricting the ionized compounds to the chamber.

In FIG. 2, the inlet is removably couplable to an analyte container (209). The inlet can include a threaded surface (210) for coupling to a mating threaded surface (211) of an analyte container, a snap on attachment for coupling with a mating containing, or other couplable combinations known to those of skill in the art.

Figure 4A:
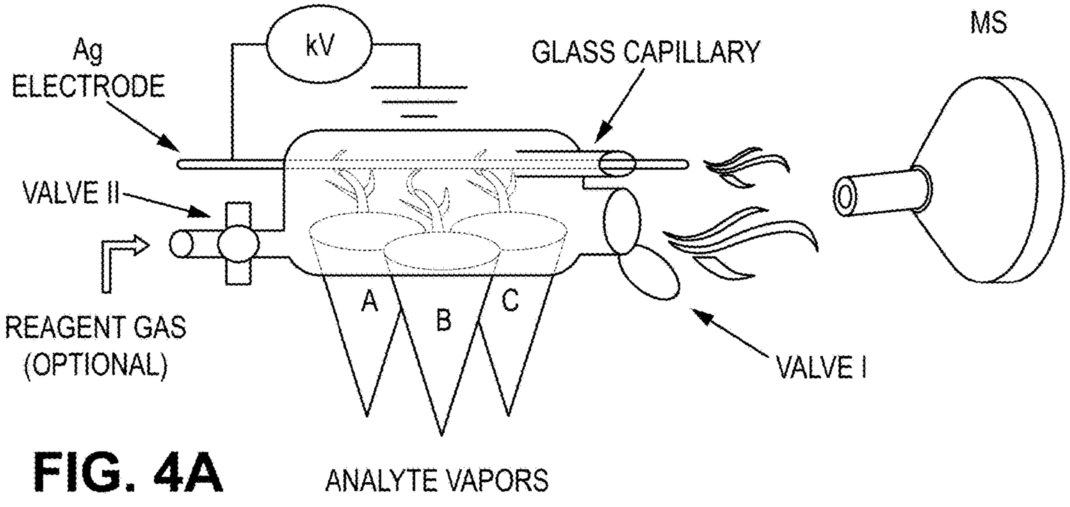
FIG. 4A depicts an ionization chamber with an integrated ESI electrode and corona electrode, a reagent gas valve, and a plurality of sample containers in one aspect.

For some aspects, such as shown in FIG. 4A, the sampling vessel can include a plurality of inlets for attaching a plurality of analyte containers. The sampling vessel can also include a gas valve configured to permit fluid communication between the headspace region and a gas supply. In certain embodiments, the sampling vessel can include a plurality of closeable inlets, such that the user can select how many analyte containers supply the headspace region. For instance, the sampling vessel can include a single inlet, or the sampling vessel can include a plurality (e.g., 2, 3, 4, 5, or more) of closeable inlets.

In some additional and unlimiting aspects, the corona discharge can be produced by the same ESI electrode or can be produced by a different corona electrode. In some aspects, in which the corona discharge is produced by the same ESI electrode, the ESI electrode is supplied with a voltage that is sufficient to also produce a corona discharge. Any of the disclosed above voltages can be applied in these aspects.

Figure 4B:
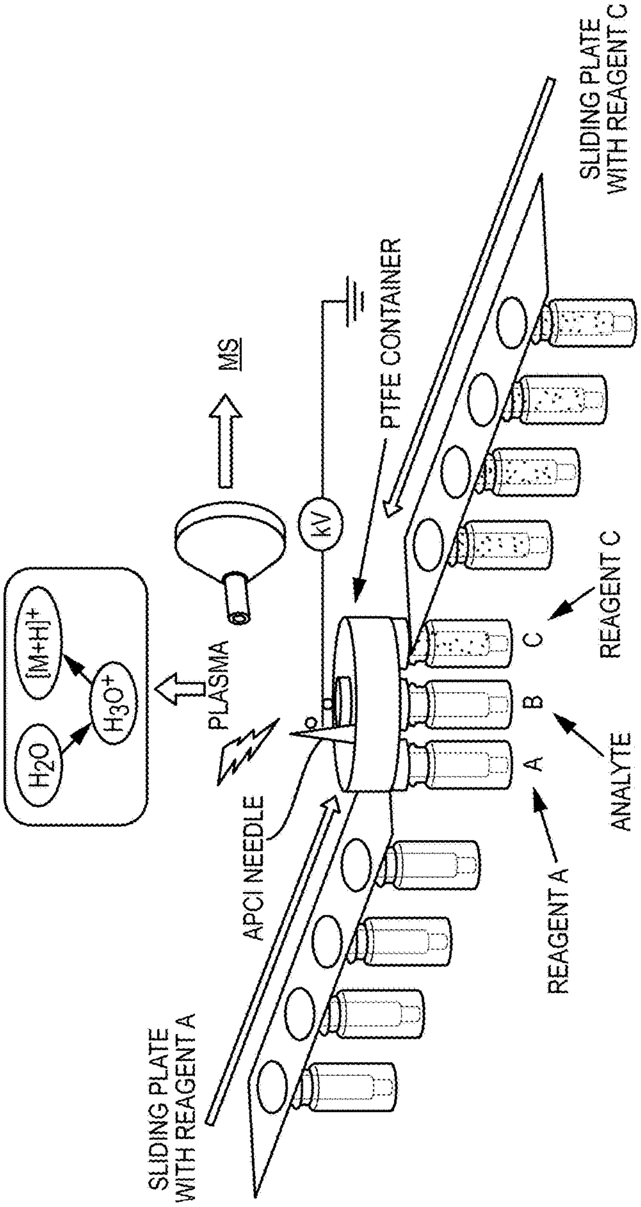
FIG. 4B depicts a schematic of the contained-APCI MS screening platform. Containers (A, B, C) can be filled (<100 μL) with different reagent combinations (A, C) and analyte (B), and robotically or manually exposed to corona discharge (thunder icon) by sliding plates. Headspace vapor or electrostatically attracted particles of reagents react with each other in the gas-phase upon plasma initiation through the application of high direct current (DC) voltage (4-6 kV) to the stainless-steel needle. Detection of reaction products is conducted by mass spectrometry in real-time.

FIG. 4B depicts an exemplary aspect where a three-inlet vessel having fixed analyte in chamber B is sequentially combined with a plurality of different reagents A and C. Ionization and analysis can be conducted as described above. The length of ionization can be from 1-5 seconds, from 1-10 seconds, from 2-10 seconds, from 5-10 seconds, from 5-15 seconds, from 5-20 seconds, or from 10-20 seconds. In some embodiments, after each ionization period, there is an equivalent amount of time where no voltage is applied. This period of time is sufficient to switch containers and remove all previously ionized species.

In certain aspects, any of the disclosed herein can be configured for use with an automated sampler for high-throughput applications. For instance, a robotic arm can sequentially deliver a plurality of sample containers to the sampling vessels, wherein each sample is individually ionized and analyzed.

In still further aspects, the apparatuses disclosed herein can be used in the analysis of complex mixtures, for instance, biofluids. As described in the Examples, reactive olfaction mass spectrometry can be used to detect caffeine in urine at concentrations as low at 200 picograms/ml and cocaine in plasma at concentrations as low as 100 ng/ml.

It is further understood that the apparatuses disclosed herein are configured to form ions of the analyte sample. They are also configured to form ions of the one or more supplementary analyte samples.

The disclosed herein apparatuses can also be used for microextraction or for electrophoretic analysis.

In some aspects, the apparatus is configured to form positive and negative ions when the positive voltage is supplied. Yet, in other aspects, the apparatus is configured to form positive and negative ions when the negative voltage is supplied. It is understood that such features allow to the wide use of the disclosed herein apparatuses with various analyzers.

In still further embodiments, the system disclosed herein is configured to ionize the analyte with help of electrons formed in the plasma. In yet other embodiments, the system disclosed herein is configured to ionize the analyte with help of protons. In yet further embodiments, the system disclosed herein is configured to ionize the analyte with help of electrons and protons created within the system.

Also disclosed herein is a mass-spectrometer that can comprise any of the disclosed herein apparatuses. In certain embodiments, the apparatus present in the disclosed herein mass-spectrometer at least one high voltage source that is not in electrical communication with the mass-spectrometer. Such disclosed mass-spectrometers are configured to detect both positive and negative ions in a positive mode or a negative mode of operation, respectively. It is understood that the term negative mode operation, as used herein, refers to the separation and counting of negatively charged ions to determine their mass-to-charge ratio and abundance. Yet, the term positive mode operation as used herein refers to the separation and counting of positively charged ions to determine their mass-to-charge ratio and abundance.

Traditionally, mass spectrometers operate in two modes: positive mode and negative mode. This is predicated on the assumption that an ion source operating in positive mode can generate only positive ions and vice versa. This idea mandates the mode of ion source operation (±) to be intimately linked to the corresponding operation mode of the mass spectrometer (i.e., positive ion source→positive mode mass analysis and negative ion source→negative mode mass analysis). However, this traditional method can discard up to 50% of the available information if an ion source operating in positive mode is able to generate both positive and negative ions.

Figure 23A:
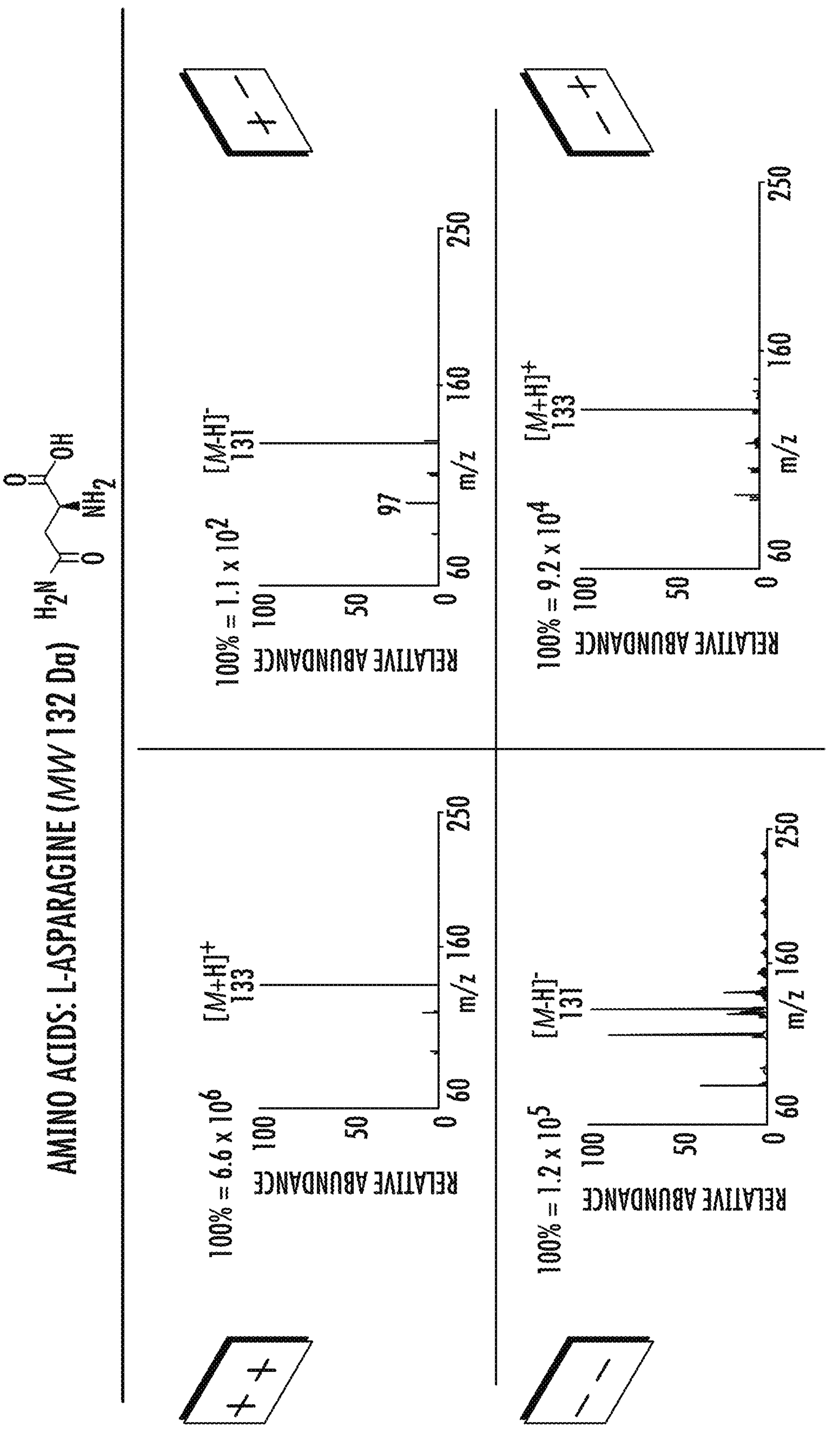
FIG. 23A-23B depict a four-quadrant analysis of amino acid asparagine (FIG. 23A) and a four-quadrant analysis of fatty acid lauric acid (1, MW 200 Da). The corresponding ester (2, MW 214 Da) is detected only in the positive mode mass spectrometry operation (FIG. 23B).
Figure 23B:
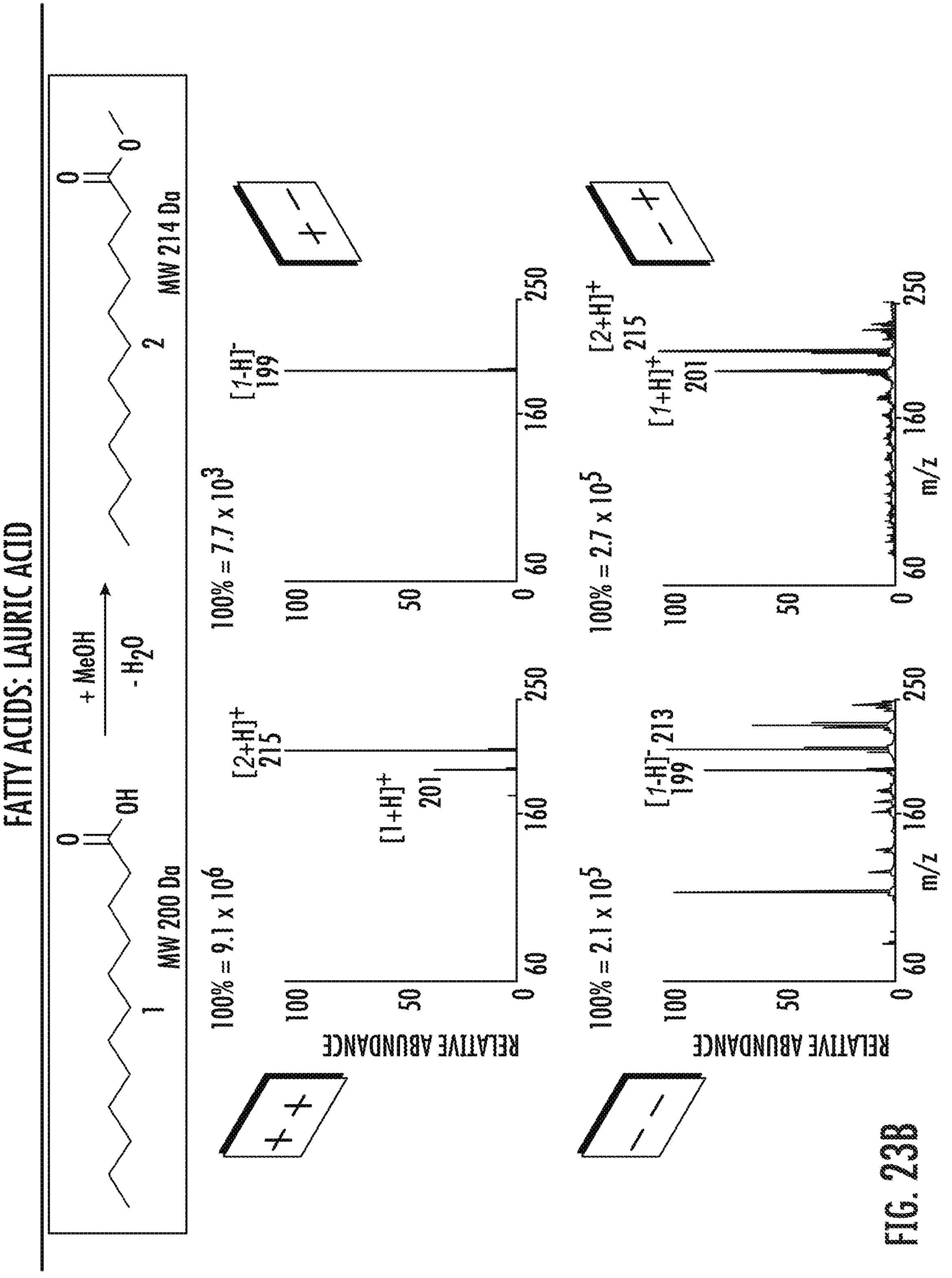

The disclosed herein panoptic apparatus can generate both positive and negative ions when biased with positive voltage and vice versa. Therefore, the disclosed herein apparatus can allow chemical detection in four conceivable operational modes: (+source, +MS mode), (+source, −MS mode); (−source, −MS mode), and (−source, −MS mode). An exemplary analysis of amino acid is shown in (FIG. 23A) and fatty acid (FIG. 23B) as examples. This capability could be useful for metabolite analysis, for example.

In still further aspects, the disclosed herein mass-spectrometer can comprise the disclosed herein apparatus, a sample, a camera, and attachment mechanisms allowing to connect the apparatus to the instrument.

METHODS

Disclosed herein are methods for detecting organic compounds in an analyte composition. In certain aspects, the methods disclosed herein comprise: a) providing an apparatus comprising: i) one or more sampling vessels having an inlet and an outlet, wherein the one or more sampling vessels comprises a predetermined volume of an analyte sample and a headspace; wherein the inlet and the outlet are in fluid communication with the headspace; and wherein the outlet is configured to allow fluid communication between the one or more sampling vessels and an analyzer; ii) one or more electrospray ionization (ESI) electrodes disposed within the one or more sampling vessels such that each of the one or more sampling vessels comprises one of the one or more ESI electrodes, and wherein the one or more ESI electrodes are in electrical communication with at least the headspace; iii) a corona electrode disposed outside of the one or more sampling vessels; b) supplying a direct current (DC) voltage to i) the one or more ESI electrodes to generate a plurality of charged droplets; or to the one or more ESI electrode to generate the plurality of charged droplets and to the corona electrode to the corona discharge; and c) passing the plurality of charged droplets through the outlet of the one or more sampling vessels to an analyzer.

It is understood that any of the disclosed herein apparatuses can be used. In still further, any of the disclosed herein sampling vessels can be utilized. Similarly, any of the disclosed herein ESI electrodes and/or corona electrodes can also be used in the disclosed methods.

In some aspects, the plurality of charged droplets can pass through the outlet and be exposed to a corona discharge, while in other aspects, the analyte composition is directly contacted with the corona discharge.

The direct voltage used in the disclosed herein methods can be provided by any high voltage source as disclosed above. In some aspects, the high voltage source is in electrical communication with the analyzer. Yet, in other aspects, the high voltage source is an independent voltage source that is not in electrical communication with the analyzer. Any of the disclosed above voltages can be applied.

In some aspects, a voltage sequence can be employed to ionize the organic compounds. For instance, a first voltage can be applied for a first period of time, followed by applying a second voltage for a second period of time, in which the first and second voltages differ either in magnitude or polarity. In some instances, the first and second voltages are of opposite polarity, i.e., the first voltage is of negative polarity, and the second voltage is of positive polarity; or the first voltage is of positive polarity, and the second voltage is of negative polarity.

The first period of time can be from 1-60 seconds, including exemplary values of about 5 seconds, about 10 seconds, about 15 seconds, about 20 seconds, about 25 seconds, about 30 seconds, about 35 seconds, about 40 seconds, about 45 seconds, about 50 seconds, and about 55 seconds. The second period of time can be at least 5 seconds, at least 30 seconds, at least 60 seconds, at least 90 seconds, at least 120 seconds, or at least 150 seconds.

In some aspects and as disclosed above, the ESI electrode does not directly contact the analyte composition. Yet, in other aspects, the ESI electrode is in direct contact with the analyte sample. As disclosed above, the ESI electrodes can comprise inert and non-inert materials. In certain aspects, the ESI electrodes can comprise Ag, Au, or Pt, or alloys thereof and be inert. In such aspects, the ESI electrode does not necessarily directly contact the analyte composition. In yet other aspects, the one or more ESI electrodes comprises Ir, Ti, Rh, Ru, or alloys thereof. In such aspects, the one or more ESI electrodes is configured to catalyze one or more reactions within the analyte sample.

For small-molecule organic compounds, it is preferred that the ESI electrode does not contact the analyte composition. For biopolymer organic compounds, it can be preferred that the ESI electrode does contact the analyte composition. Small molecules include non-polymeric compounds having a molecular weight less than or equal to about 1,500 Da. Biopolymers include peptides, proteins, nucleic acids, and polysaccharides, may be ionized by contacting the sample with the outer surface of the insulator. For example, as shown in FIG. 17A-17D, the protein mixture having large proteins and small molecules can be analyzed. For example, ubiquitin and cytochrome c can be measured at an exemplary and unlimiting voltage of 2 kV, while smaller molecules can also be measured at an exemplary and unlimiting voltage of 6 kV.

In certain aspects, where the ESI electrode is positioned within the analyte sample and comprises a non-inert electrode, a step of differentiating an isomer mixture if present in the analyte sample can be performed. As disclosed herein, the systems and methods of the current disclosure can be used for solution-phase reactions to allow isomer differentiation. Isomers are transparent to the mass spectrometer, so by inducing reactions in the ion source that yield different products for different isomers, this new ion source can expand the range of application of mass spectrometers.

The disclosed herein methods also can comprise steps of electrophoretic separation for desalting of the analyte sample. In such exemplary and unlimiting aspects, the electrophoretic separation of the analyte sample can be performed by supplying a step potential from about −6 kV to about 3 kV, including exemplary values of about −5.5 kV, about −5 kV, about −4.5 kV, about −4 kV, about −3.5 kV, about −3 kV, about −2.5 kV, about −2 kV, about −1.5 kV, about −1 kV, about −0.5 kV, about 0.5 kV, about 1 kV, about 1.5 kV, about 2 kV, and about 2.5 kV for a predetermined period of time.

In still further aspects, both solution-phase and gas-phase reactions can be induced during the analysis process.

A variety of different analyte compositions may be used in the disclosed methods and systems. For instance, biofluids such as urine, blood serum, plasma, saliva, sweat, tears, and combinations thereof may be analyzed for the presence of small molecules and/or biomarkers.

In still further aspects, the methods as disclosed herein utilizing the disclosed apparatuses allow high throughput experimentation for gas-phase chemical reaction screening to enable the differentiation of closely related compounds, such as, for example, amines and hydrazines, both of which contain the primary amino functionality. It was found that at least five different chemical reactions can be screened in parallel using this same apparatus in less than 60 seconds without carryover effects.

In yet further aspects, methods disclosed herein can allow the detection of solid compounds (e.g., carminic acid) with extremely low vapor pressure. Yet in other aspects, the disclosed herein methods and apparatuses can allow an analysis of vapor phase samples, including differentiation of perfumes, for example. In still further aspects, the disclosed herein methods and apparatuses can allow an analysis of various compounds such as steroids and vitamins (non-polar), cocaine and caffeine (polar), and proteins (large biomolecules) even if they are present in the same mixture. In still further aspects, disclosed herein methods and apparatuses can allow fatty acid isomer differentiation using a solution-phase electrocatalytic reaction. In still further aspects, the real-time screening of gas-phase chemical reactions, including the discovery of novel coupled reactions, can be done by the methods and apparatuses disclosed herein.

In yet further aspects, and as described above, the disclosed herein methods and apparatuses are capable of in-capillary micro-extraction to enable an ultrasensitive analysis of complex mixture without prior sample pre-treatment. This means biofluids such as blood, urine, serum, and plasma can all be analyzed without chromatographic separation. In particular, the elimination of sample preparation allows the use of only microliter volumes of biofluids.

Also disclosed herein are methods of measuring positive and negative ions in an analyte solution comprising: a) providing any of the disclosed herein apparatuses; b) generating positive and negative ions comprising at least one compound of an analyte sample provided within the one or more sampling vessels and/or comprising at least one compound of a supplementary analyte sample if it is optionally provided adjacent to the corona electrode; c) detecting positive and negative ions in a positive mode of a mass-spectrometer; and/or d) detecting positive and negative ions in a negative mode of a mass-spectrometer.

EXAMPLES

The following examples are for the purpose of illustration of the invention only and are not intended to limit the scope of the present invention in any manner whatsoever.

Development of contained nAPCI source. In its fully operational form, the contained nAPCI apparatus consists of an Ag electrode inserted into a disposable glass capillary (ID 1.2 mm). This assembly is in turn inserted into a PTFE container (2 mL), which has a stationary screw cap (9 mm) with a through a hole to introduce a disposable glass vial (with an integrated 0.5 mL insert) that contains the sample (0.5 mL) and from which the headspace vapor of the analyte is supplied via the glass capillary (FIG. 2). A DC voltage (4-6 kV) applied to the Ag electrode enables the production of a corona discharge for direct interaction and ionization of analyte vapor under ambient conditions. The PTFE container itself embodies a valve on the side; the analysis of samples with negligible vapor pressures (VP) was achieved simply by opening this valve, which increases the flow rate of the analyte's headspace vapor. Note: the condensed-phase sample (solid or liquid) is placed in the glass vial.

Optimization and Ion Type Characterization. The contained nAPCI source was first optimized using volatile toluene analyte (VP=3.8 kPa). This spectrum was recorded after applying optimized 6 kV of DC voltage to the Ag electrode, which registered three ionic species: hydride elimination to yield $[M-H]^+$ ions at m/z 91, molecular ion ($M^{+*}$) at m/z 92, and protonated $[M+H]^+$ species at m/z 93. Similar ion types were also derived from the headspace vapor analysis of anthracene (VP=$8.7\times10^{-7}$ kPa) and other hydrocarbons such as cyclohexane, benzene and naphthalene. These results are comparable to desorption atmospheric pressure chemical ionization experiments, except that no pneumatic assistance was employed in the current vapor-phase ionization process. Under this condition, Girard reagent T (VP=$4.6\times10^{-10}$ kPa), a non-volatile organic salt having quaternary ammonium species, was sensitively detected at m/z 132 (the valve open) with no heat supplied to the sample container. The elimination of heat and reagent gases provide simplicity in experimental setup and speed in the chemical analysis compared with the corresponding desorption-based ionization methods.

The limit of the contained nAPCI ion source was further tested through the analysis of carminic acid (MW 492 Da), which has a negligible vapor pressure of $5.1\times10^{-25}$ kPa. In this case, a unique ionic species $[M+(3H)]^+$ was abundantly detected at m/z 495 from the solid untreated sample. The production of this ion type in the contained nAPCI source was also observed for anthracene, p-cymene, and adipic acid. Similar species were observed when using Pt and Fe (instead of Ag) electrodes, suggesting the process, which appears to be the addition of two hydrogen atoms across C═C and C═O bonds, is field-induced. That is, the nature of the electrode is less important except its possible role in the adsorption of analyte/electrons/protons. The presence of this $[M+(3H)]^+$ ion clearly reveals that the mechanism of ion production in the contained nAPCI ion source is not only due to gas-phase chemical ionization, but reactions occurring at electrode surface may also contribute substantially. Interestingly, the resultant gas-phase ions are generated from proximal condensed-phase samples with no physical contact through electrostatic induction (discussed in detail later). The reactive nature of the contained nAPCI ion source was also registered in the formation of dehydrated species $[M+H—H_2O]+$ from ketones, aldehydes and alcohols as well as via the generation of hydroxyl (OH) adducts, iodobenzene and aniline). The identity of analytes was confirmed through MS/MS experiments using collision-induced dissociation.

| # | Compound | Structure | MW (Da) | VP (kPa, 25° C.) | Observed Ion(s) | $MS^2$ Transition(s) (CID) |
|---|---|---|---|---|---|---|
| 1 | Vitamin D2†* | 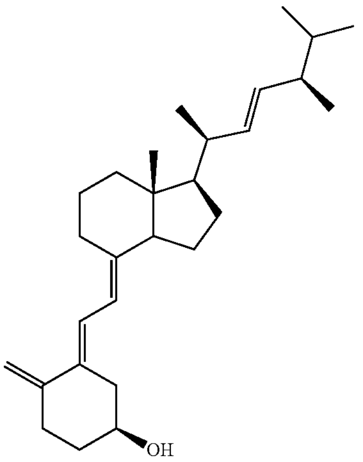 | 397 | $8.5\times10^{-11}$ | $M^{+\bullet}$<br>$[M + H]^+$<br>$[M - H_2O]^+$ | 397 → 379, 369, 351, 327, 271<br>398 → 380, 370, 352, 328, 272<br>379 → 323, 309, 295, 283, 253, 199 |
| 2 | Hydrocortisone†* | 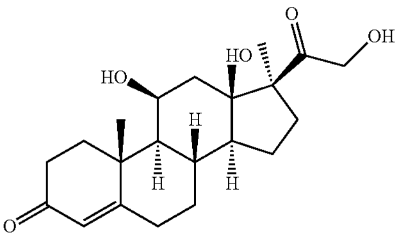 | 362 | $1.6\times10^{-14}$ | $[M + H]^+$<br>$[M - H]^+$ | 363 → 345, 327, 309, 297, 267, 121<br>361 → 343, 325, 297, 279, 121 |
| 3 | Ethyl myristate | 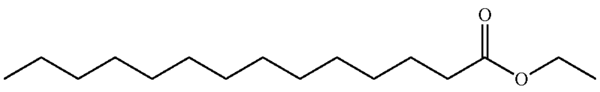 [SMILES: CCCCCCCCCCCCCC(=O)OCC] | 256 | $2.7\times10^{-4}$ | $[M + H]^+$<br>$[M + H - CO]^+$ | 257 → 229, 191<br>229 → 201, 159, 131, 117, 103, 89 |

-continued

| # | Compound | Structure | MW (Da) | VP (kPa, 25° C.) | Observed Ion(s) | $MS^2$ Transition(s) (CID) |
|---|---|---|---|---|---|---|
| 4 | L-Ascorbic acid†* | 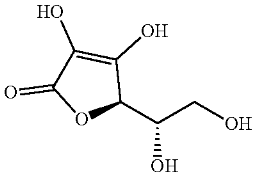 [SMILES: O=C1O[C@H]([C@@H](O)CO)C(O)=C1O] | 176 | 2.4 × $10^{-11}$ | $[M + H]^+$<br>$[M - H]^+$ | 177 → 159, 149, 135, 121, 107, 95<br>175 → 157, 147, 133, 119, 105 |
| 5 | Citral* | 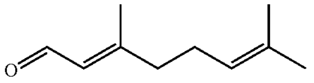 | 152 | 1.2 × $10^{-2}$ | $[M + H - H_2O]^+$<br>$[M + H - H_2O - C_3H_4]^+$<br>$[M + H]^+$ | 135 → 119, 107, 93, 79<br>95 → 67, 55, 41 (HCD)<br>153 → 135, 109, 95, 81 |
| 6 | Piperonal | 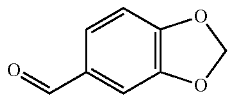 [SMILES: O=Cc1ccc2c(c1)OCO2] | 150 | 1.3 × $10^{-3}$ | $[M + H]^+$ | 151 → 123, 93 |
| 7 | L-Methionine†* | 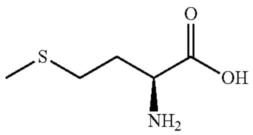 | 149 | 7.8 × $10^{-8}$ | $[M + H]^+$<br>$[M + H - OH]^+$ | 150 → 133, 104, 87, 74 (HCD)<br>133 → 105, 87, 75 |
| 8 | Pyrogallic acid | 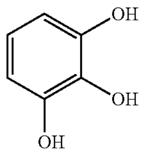 | 126 | 6.4 × $10^{-5}$ | $[M + H]^+$<br>$[M - H]^+$ | 127 → 109, 99, 85<br>125 → 107, 97 |
| 9 | L-Cysteine†* | 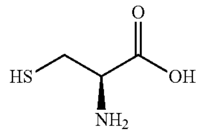 | 121 | 9.0 × $10^{-8}$ | $[M + H]^+$ | 122 → 105, 94, 76 |

Another interesting feature of the contained nAPCI ion source is that it predominantly produces positive ions. FIG. 4 illustrates this phenomenon in which protonation occurred for organic acids like acetic acid (VP=2.07 kPa; proton affinity (PA)=784 kJ/mol; ionization energy (IE)=10.65 eV). This suggests that the chemical ionization process might not involve large protonated water clusters, as is typically the case in conventional APCI, where high flow rates of solvents are used. Note: PA of $H^+(H_2O)$ n cluster is 878.6 and 900.0 kJ/mol for n=2 and 3, respectively, both of which cannot protonate acetic acid. This leaves us to conclude that the protonated ions observed in contained nAPCI MS are formed either by field-induced proton transfer reaction ($M^{*+}_{(surf)}$+$H_2O$→$[M+H]^+$+$HO^*$) or by chemical ionization via reaction with hydronium ions ($H_3O^+$). Takayama and coworkers have studied positive ion evolution in corona discharge at atmospheric pressure (in the absence of external solvents) and found that the terminal ions are $H_3O^+$ and $H^+(H_2O)_2$, which is consistent with the current results. We further investigated the influence of other factors (PA, IE, and VP) on the production and absolute intensity of the positive ions ($[M-H]^+$, $M^{+*}$, $[M+H]^+$) observed in the contained nAPCI source. No particular trend was observed except that the analyte with the highest proton affinity dominated the spectrum for mixture samples. For hydrocarbon analytes, both $M^{+*}$ and $[M-H]^+$ were often observed together.

Quantification and Direct Biofluid Analysis. As already shown, vapor pressure is of little importance in contained nAPCI MS. However, this does not mean an ion signal is concentration independent. Based on gas law, the number of moles in headspace vapor is directly proportional to vapor pressure if volume and temperature are held constant. It was determined this to be true in the contained nAPCI experiment using $HNO_3$ vapor. Here, different $HNO_3$ solutions were prepared at a varying concentration (40, 45, 50, 60, 65%), each with known vapor pressure. Headspace vapor from each of the prepared $HNO_3$ solutions was seeded into 10 μL of water plug contained in a removable pulled glass capillary. After 1 h of vapor seeding, the resultant solution in which the $HNO_3$ vapor has been collected was diluted into 2 mL of water, and the pH was measured. Obtained pH values were converted into hydrogen ion concentrations, yielding flowrates in the nmol/min range. Most importantly, the determined headspace vapor flowrates varied linearly with a known partial pressure of $HNO_3$ solutions. Likewise, a calibration curve was successfully constructed for acetone, an important metabolism marker, when spiked in raw urine;

contained nAPCI ion signal increased linearly ($R^2$=0.97) with acetone concentration and a good limit of quantification (200 μg/mL) was observed. Similar concentration-dependent analysis was achieved for pyridine in roasted coffee, which was consistent with reported trends. Here, cocaine dissociated to give the characteristic fragment ion at m/z 182 upon collisional activation. Limit of detection for cocaine spiked in serum was found to be 1 ng/ml, which corresponds to only 0.18 attogram per mL of cocaine vapor inside of the contained nAPCI source. Therefore, the contained nAPCI MS platform is a powerful sensor that can detect odor concentrations 5 million times lower than most sensitive dogs. Carryover issues are observed to be minimal in the contained nAPCI experiment as illustrated for real-time analysis of methyl anthranilate (1), benzene (2), furfural (3), toluene (4) and benzaldehyde (5).

Electrostatic Induction and Reactive Olfaction. The ultrasensitivity observed in the contained nAPCI experiment is due to the fact that the total analyte vapor concentration results from the combined effects of (natural) analyte vapor pressure and electrostatic charging of the proximal condensed-phase sample leading to the liberation of particles from the sample. That is, the applied DC voltage is expected to induce the separation of partial positive (δ+) and negative (δ−) charges. Charges of the same polarities accumulate in close proximity in response to the applied voltage, which leads to the instantaneous liberation/desorption of particles as a result of Coulombic repulsion. (The effects will be similar to electroscope experiments in which the two leaves separate as a result of charge induction). We have observed the number of electrostatically desorbed vapor-phase particles to be directly proportional to applied voltage and distance between the Ag electrode and the sample, an effect that is consistent with Coulomb's law ($F_e$~$(q_1q_2)/r^2$), where q represents charges on the electrode and a surface particle, and r is the distance between the electrode and the particle. Thus, a temporal increase (1-2 s) in Ag electrode voltage (8 kV) was used to achieve ionization of analytes with negligible vapor pressures (e.g., carminic acid, hydrocortisone, and vitamin D2). In this case, analyte desorption is temperature independent, although the subsequent ionization and signal-to-noise ratio of the electrostatically liberated particles can be influenced by MS inlet capillary temperature.

Direct Analysis of Perfumes and Beverages. The structures and identities of the 25 most abundant compounds in several colognes (Lacoste®, Dolce & Gabbana®, and Old Spice®) were confirmed using MS/MS experiments and via accurate mass measurements. The three colognes can be differentiated based on the chemical composition of their headspace vapors, without prior extraction or pre-concentration. Each major compound can be related to a distinctively known aroma or other function (e.g., UV absorption properties in Lacoste® cologne), confirming their structural identification by contained nAPCI MS. For example, acetal (m/z 135; refreshing, pleasant odor) and α-isomethylionone (m/z 107; floral, woody scent) were detected as one of the most abundant compounds in Lacoste® Touch of Spring, which is well known for its fresh, floral and sandalwood notes. The orange blossom and jasmine middle notes of Dolce & Gabbana® Femme perfume were also confirmed using nAPCI MS by detecting methyl anthranilate (m/z 152; orange-flower odor) and methyl N-methylanthranilate (m/z 166; fruity, floral scent).

The same olfaction approach was applied for the analyses of coffee and carbonated drinks. Here too, the top 26 most abundant compounds were characterized for two types of ground coffee, two types of instant coffee, and three types of brewed coffee with different roast levels. While solid coffee showed distinct composition for volatile and nonvolatile components, brewed coffee was found to be very similar by headspace vapor chemistry. However, the abundance of pyridine was dramatically increased from light roast to dark roast coffee, a result that is in good agreement with coffee chemistry in which the alkaloid trigonelline partially degrades during roasting to produce pyridine and nicotinic acid.

Finally, five Coca-Cola carbonated drinks (Cherry Coca-Cola®, Mello Yello®, Fanta®, Coca-Cola®, and Sprite®) were analyzed without sample preparation and no physical contact or heating. We detected different caffeine content and unique compounds that can be related to known flavors. For example, a large amount of benzaldehyde (m/z 107; cherry flavor) was detected in Cherry Cola, which is absent in all other carbonated drinks tested. The reactive olfaction sampling confirmed Mello Yello to be a highly-caffeinated, citrus-flavored soft drink. No caffeine, m/z 195, was detected in Fanta and Sprite as prescribed by Coca-Cola Company. Maltol (m/z 127; caramellic flavor) was detected more abundantly in the Cola drinks (e.g., Coca-Cola® and Cherry Cola) compared with the citrus-flavored beverages (e.g., Fanta® and Mello Yello®). Preservatives such as benzoic acid (m/z 123) were also detected in all the tested carbonated drinks. These consistent results demonstrate that due to its high sensitivity, the new contained nAPCI MS platform can provide a unique opportunity to rapidly study not only odor but also flavor chemistry using headspace vapors.

Example 1: Ionization Chamber with Separate ESI and Corona Electrode.

This embodiment is depicted in FIG. 1 and is capable of three spray modes: a) Non-contact nESI in which the analyte solution present in a disposable glass capillary (ID 1.2 mm; ~5 μm pulled tip) is electrically charged through electrostatic induction. That is, the Ag electrode on which the DC high voltage (HV) is applied is not in physical contact with the analyte solution. Instead, a ~1 cm air gap is created, and as little as 1 kV applied voltage is able to induce electrostatic charging, which causes the release of charged droplets from the capillary tip that are sampled by the mass spectrometer. b) Non-contact nESI/nAPCI mode, where both charged droplets and plasma are simultaneously produced when potentials above the breakdown voltage (4 kV) of air are applied. Here, the presence of an auxiliary Ag electrode placed in a collimating glass capillary (ID 1.2 mm) allows the exposure of the resultant solvated/gas-phase ions to corona discharge. Note: a single HV power supply (available from the MS instrument) is used, plus no further modification of the conventional nESI source is required except for the attachment of the auxiliary Ag electrode, which does not obstruct nESI performance at low spray voltages. c) Electrophoretic separation spray mode in which polarity reversing (from negative to positive voltage) enables detection of highly re-solved multiply-charged protein ions under high voltage conditions in the presence of concentrated inorganic salts.

Figure 5:
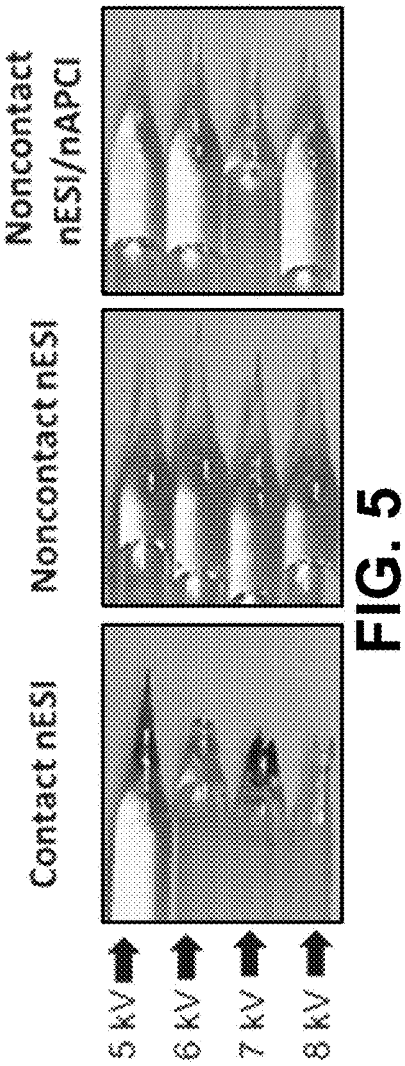
FIG. 5 depicts photographs showing the effect of Joule heating on the stability of the emitter tip (filled with water) for contact nESI, noncontact nESI, and noncontact nESI/nAPCI sources.
Figure 6:
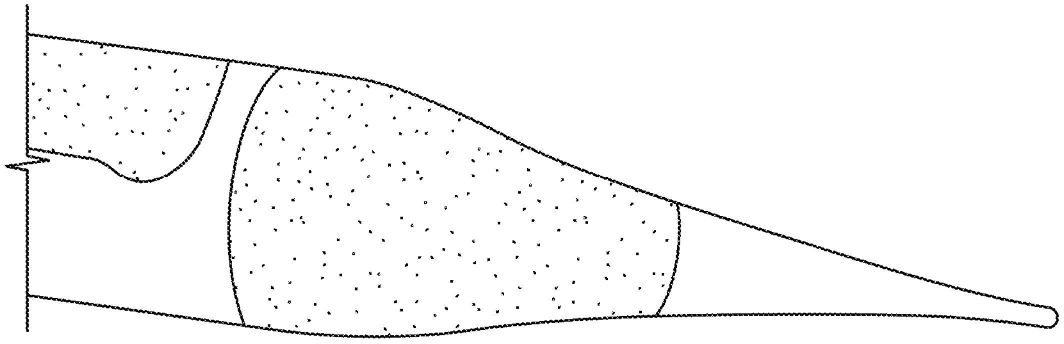
FIG. 6 depicts a photograph showing in-capillary liquid/liquid extraction of cocaine from whole human blood (5 μL) by ethyl acetate.
Figure 7:
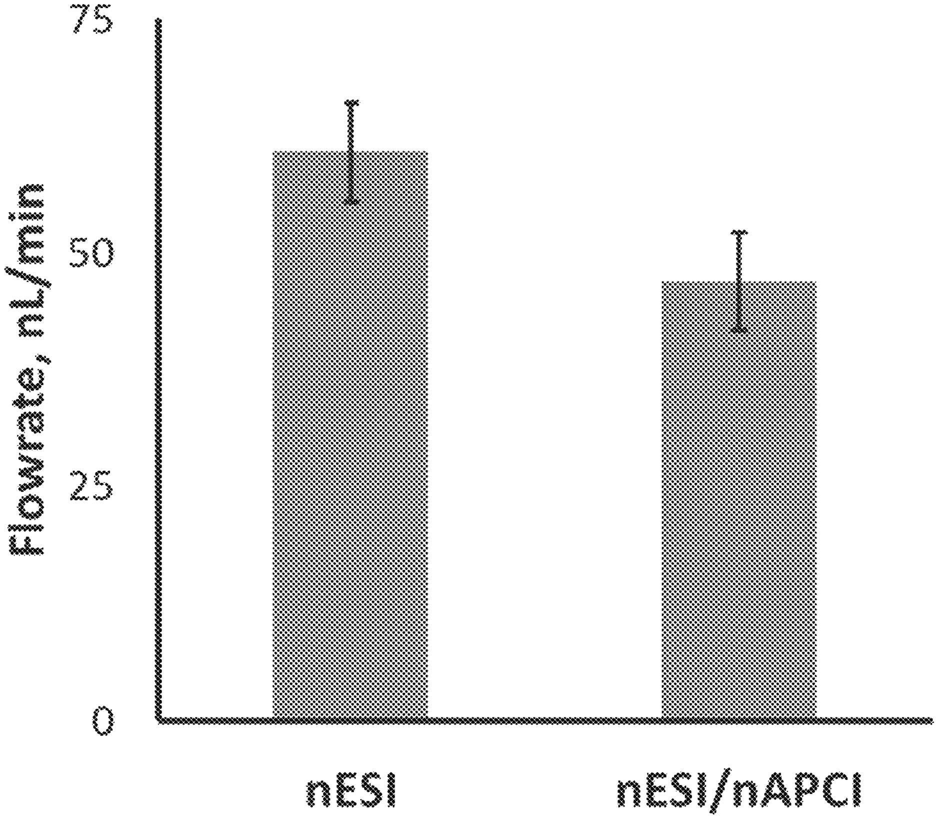
FIG. 7 depicts flowrate measurements for nESI MS and nESI/nAPCI MS. MeOH/$H_2O$ was sprayed at 1 kV and 200 °C for 30 min for each electrospray tip (3 tips were employed for each method). Solvent mass difference before and after spraying along with solvent density (0.9119 g/mL) was used to calculate flowrates. Measured flow rates were 61 nL/min and 47 nL/min for nESI and nESI/nAPCI, respectively.

FIG. 5 compares tip stability under different spray conditions. Not surprisingly, Joule heating generated after applying 5-8 kV to an electrode in contact with analyte solution (conventional nESI) is sufficient to break the tip of the glass capillary. Joule heating is significantly reduced in the non-contact spray mode due to the presence of the air gap (resistivity of air is >1.3×1016Ω at 200 °C), which leads to a much more stable tips at the same applied voltages. Interestingly, the glass tips became remarkably stable in the presence of the proximal auxiliary Ag electrode. In this case, the well-known cooling effects of corona discharge further reduce Joule heating by inducing rapid movement of air/droplets around the tip area.

A methanol solution containing equimolar (200 μM) mixture of 5-fluorouracil (1), caffeine (2), β-estradiol (3), cocaine (4), and vitamin D2 (5) was ionized using the conventional contact mode nESI source at an applied voltage of 2 kV. As can be observed, only the polar cocaine analyte with high proton affinity (930 kJ/mol) was detected at m/z 304. Caffeine (MW 194), another polar analyte, was significantly suppressed despite having a relatively high proton affinity (914 kJ/mol). Not surprisingly, detectable ion signal was not observed for 1, 3 and 5, even from individual solutions (i.e., in the absence of other analytes) at 10 ppm concentration levels. Similarly, protonated cocaine ions were predominantly detected when the mixture was analyzed by non-contact nESI operated using 2 kV spray voltage in the absence of corona discharge. Upon increasing the voltage from 2 to 6 kV, corona discharge was induced on the auxiliary Ag electrode, expecting the ionization of both polar and non-polar compounds delivered by the spray plume. The corresponding non-contact nESI/nPACI positive-ion mass spectrum is shown at 2b below, which confirms the presence of all five analytes. Compounds 1, 2, and 4 were observed as protonated $(M+H)^+$ ions at m/z 131, 195, and 304, respectively. Like conventional APCI experiment, dehydration reactions involving (pseudo) molecular ions were also observed with β-estradiol (MW 272) registering as $[M+H—H_2O]^+$ species at m/z 255. Radical species $M^{*+}$ and $(M–H_2O)^{*+}$ were also detected for vitamin D2 (MW 397) at m/z 397 and 379, respectively. Other nonpolar compounds (thymol, surfynol, phenol), which could not be detected by conventional nESI at 1 ppm level, were also successfully characterized. These results establish the inventive MS platform as an efficient method to simultaneously ionize both polar and nonpolar compounds simply by increasing voltage from 2 to 6 kV.

Figure 8:
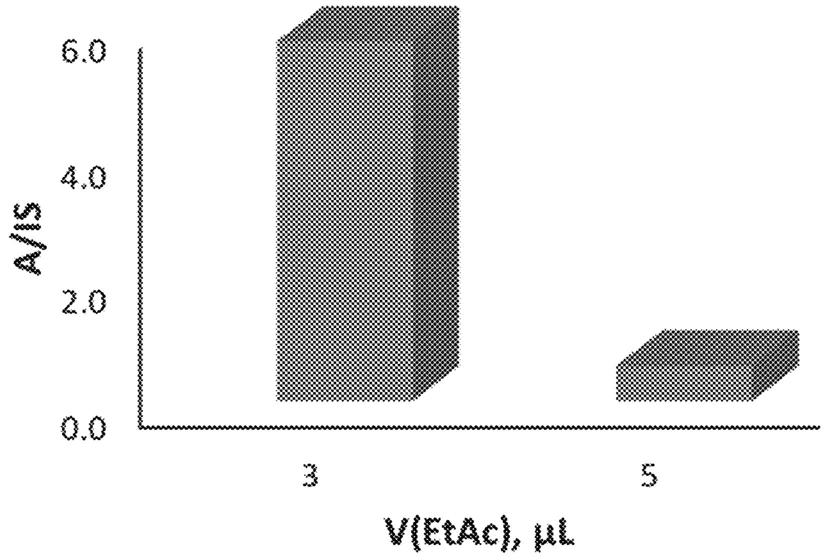
FIG. 8 depicts the measurement of analyte-to-internal standard (A/IS) signal ratio when using 3 μL and 5 μL ethyl acetate solvent (containing 500 ppb of cocaine-D3) to extract 300 ppb of cocaine from human serum. A/IS recorded for using 3 μL ethyl acetate was 10 times higher than when 5 μL because of concentration effects.
Figure 9:
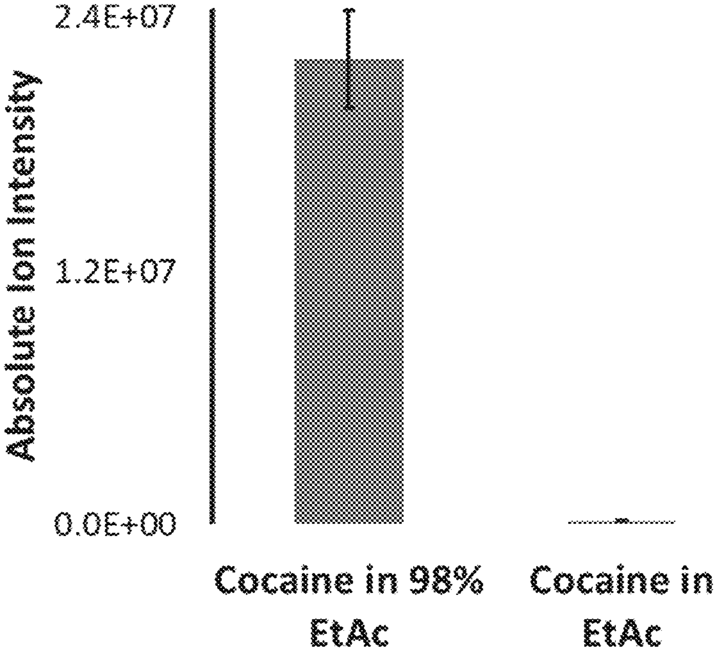
FIG. 9 depicts a comparison of cocaine ionization efficiency in ethyl acetate versus ethyl acetate solvent that is saturated with 2% water. Cocaine concentration of both solvents was 100 ppb. Three samples were tested for each solution.

3 μL of ethyl acetate was first placed in the sharp tip of the disposable glass capillary. A small volume (5 μL) of the biofluid sample spiked with a selected analyte was then introduced on the top of the ethyl acetate solvent followed by a short shake to initiate liquid-liquid extraction in the capillary as well as to remove air bubbles that may be present at the capillary tip. Note that the three strokes of shaking employed here form part of the regular nESI MS analysis and do not add extra steps to the analytical process. Often, the shaking process resulted in the disintegration of the biofluid into smaller compartments, which facilitated efficient extraction via increased interfacial contact with the extracting organic solvent. The high buoyancy of the less viscous ethyl acetate solvent (density 0.902 g/mL) draws the clean extract to the sharp tip of the glass capillary for easy analysis by non-contact nESI/nAPCI MS. Moreover, since the Ag electrode is not in direct contact with the sample/solvent, extraction equilibrium is not disturbed; a contact mode experiment where the electrode is pushed through the biofluid will reintroduce contaminants into the extract, which may cause matrix effects during analysis. The pure extract typically offered a stable 1 min spray time, which is sufficient for complete MS analysis, including tandem MS (MS/MS). The optimal amount of extraction solvent (3 μL) was used to compromise between spray time and signal intensity. For instance, applying 3 μL versus 5 μL of ethyl acetate in-creased analyte to internal standard (A/IS) signal ratio for cocaine extracted from serum by a factor of 10 (FIG. 8). Volumes lower than 3 μL result in decreased spray times (<1 min).

Figure 14:
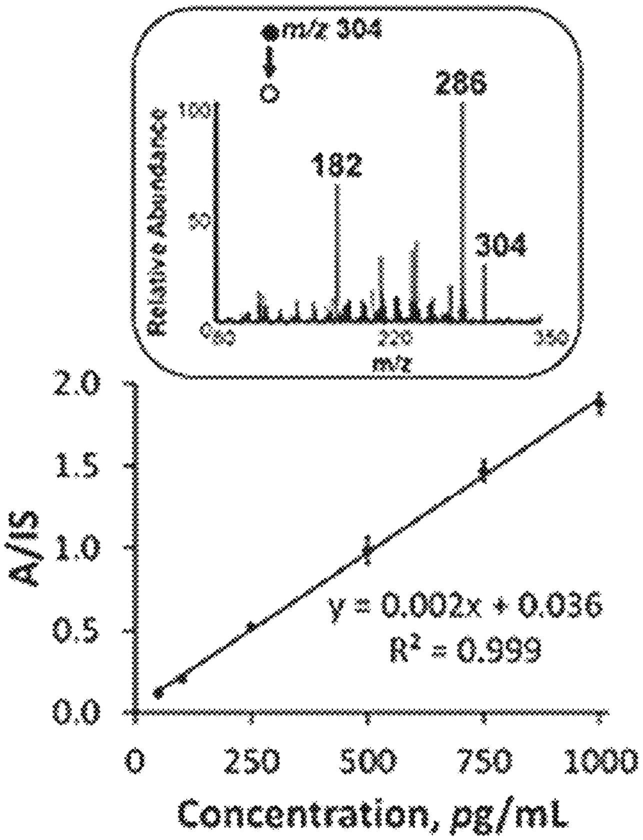
FIG. 14 depicts quantification of blood samples spiked with cocaine (50-1000 pg/mL) and 500 pg/mL cocaine-D3 as IS using nESI/nAPCI MS2 with MRM (transitions m/z 304→182 and m/z 307→185 for the analyte and IS, respectively). Insert shows MS2 of cocaine at 50 pg/mL level.

Representative product ion spectrum for 50 μg/mL cocaine spiked in undiluted blood (5 μL) registered the diagnostic fragment ion at m/z 182 in high abundance (FIG. 14). FIG. 14 shows a calibration curve derived from comparing the product ion (m/z 182) intensity at different concentrations of cocaine analyte (50-1000 μg/mL) to that of internal standard (IS, cocaine-d3, 500 pg/mL) spiked into the blood sample. Excellent linearity (R2=0.999) and limit of detection (LOD) of 12 pg/mL were achieved. LODs for other analytes are shown below:

| Analyte | Sample | Voltage (kV) | LOD (ng/mL) |
|---|---|---|---|
| Cocaine | Serum | 2 | $0.5 \times 10^{-3}$ |
| | Blood | | $1.2 \times 10^{-2}$ |
| | Urine | 6 | 0.01 |
| β-Estradiol | Blood | 6 | 10 |
| Caffeine | Blood | 6 | 15 |

Aside from high extraction efficiency and minimal matrix effects, high ionization efficiency from the ethyl acetate extract, saturated with water from the biofluid, is thought to contribute to the observed high sensitivity.

Figure 10A:
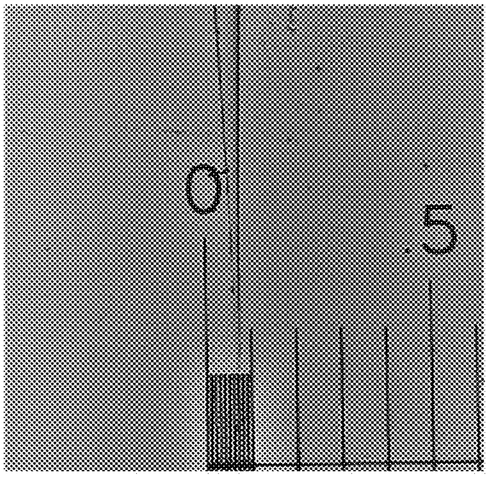
FIGS. 10A-10B depict.
Figure 10B:
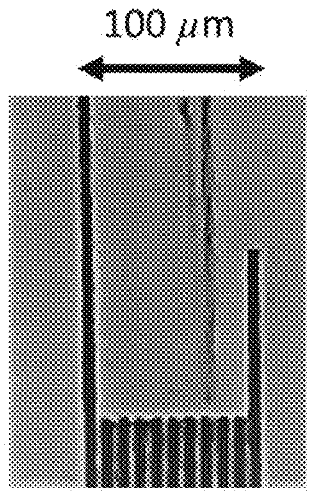

Additional enhancing effect may arise from the smaller initial droplets expected from the low flow-rate (50 nL/min) non-contact mode nESI experiment (comparable tip size of 5 μm (FIG. 10) yielded 60 nL/min in traditional nESI). Another factor influencing ionization efficiency, and hence sensitivity, is ability to generate different ion types simply by using higher spray voltages. For example, the weakly polar and high eluent strength (0.58) properties of ethyl acetate is expected to result in high extraction efficiency for steroid analytes such as β-estradiol. However, analysis by contact mode nESI MS often yields low sensitivity due to low proton affinity. Derivatization reactions are typically used to overcome this limitation. A 10 ng/ml LOD was observed for β-estradiol in whole human blood by utilizing an optimized spray voltage of 6 kV, which enables the detection of $(M–H_2O)\cdot+$ ion in tandem MS (m/z 225→159) mode without derivatization reactions.

Figure 11:
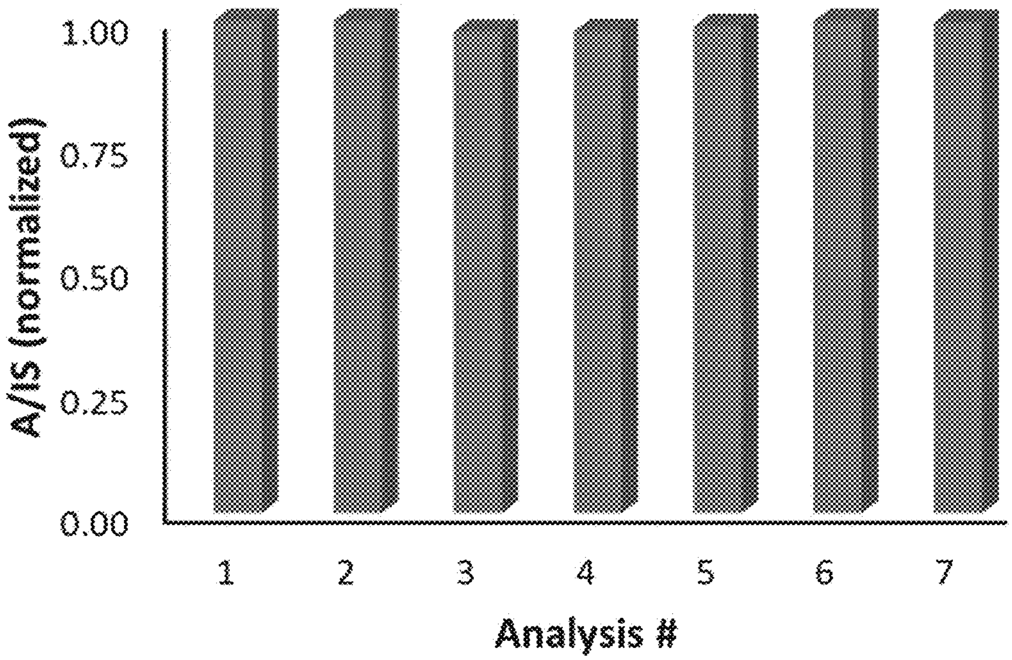
FIG. 11 depicts the MS/MS analysis of 300 ppb cocaine following seven cycles of in-capillary extractions from the same human serum sample (5 μL with spiked 500 ppb of cocaine-D3). Each extraction cycle was performed using a fresh ethyl acetate solvent (3 μL). For each extraction, a new nESI tip was used to reanalyze serum that contained ethyl acetate leftover. Analyte to internal standard (A/IS) signal ratio was normalized to the A/IS of the $1^{st}$ extraction and was stable for 7 consequent extractions with variation within 98-100%.
Figure 12A:
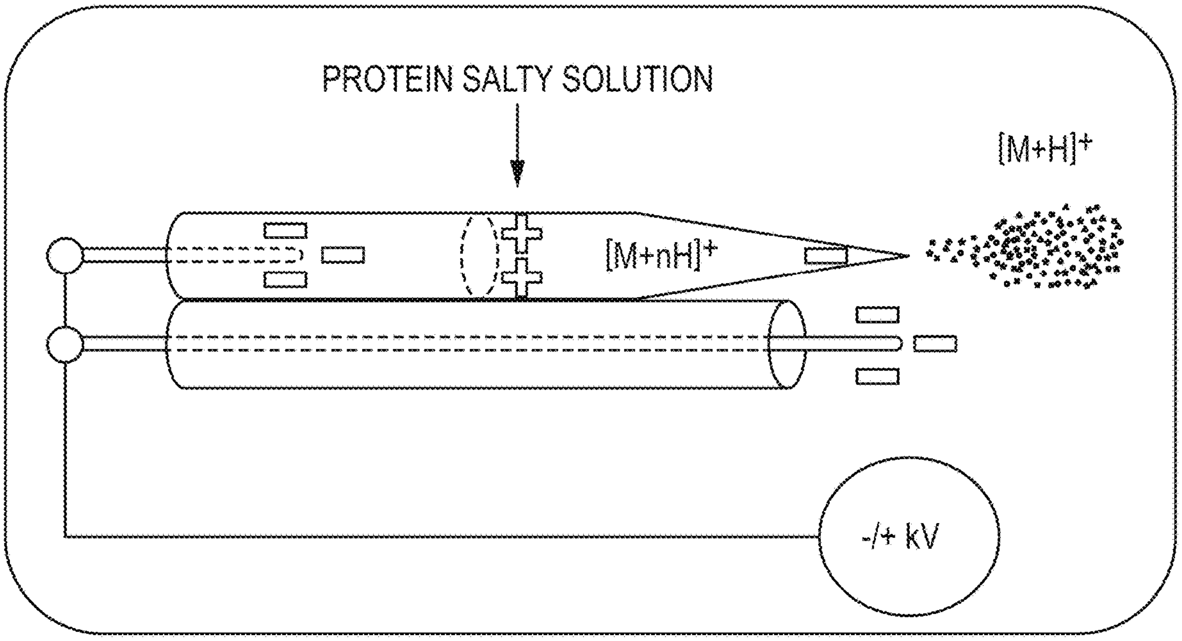
FIGS. 12A-12D depict electrophoretic desalting of 45 μM ubiquitin in PBS (1×) solution by electrophoretic separation mode of noncontact nESI/nAPCI (step voltage: −5 kV to +2 kV, see the insert).
Figure 12B:
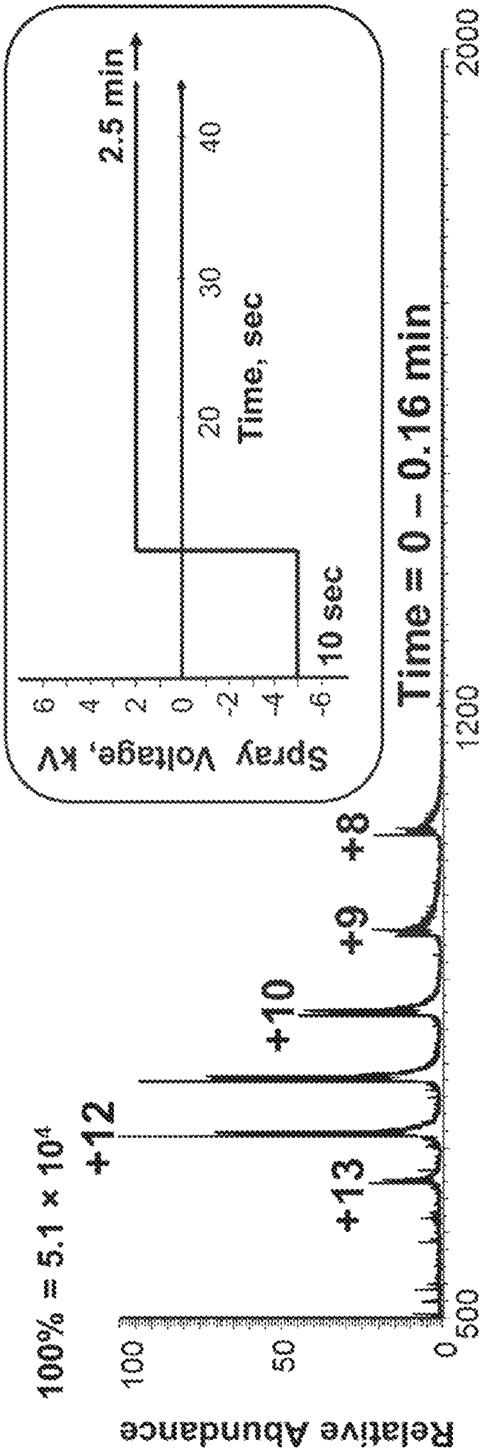
Figure 12C:
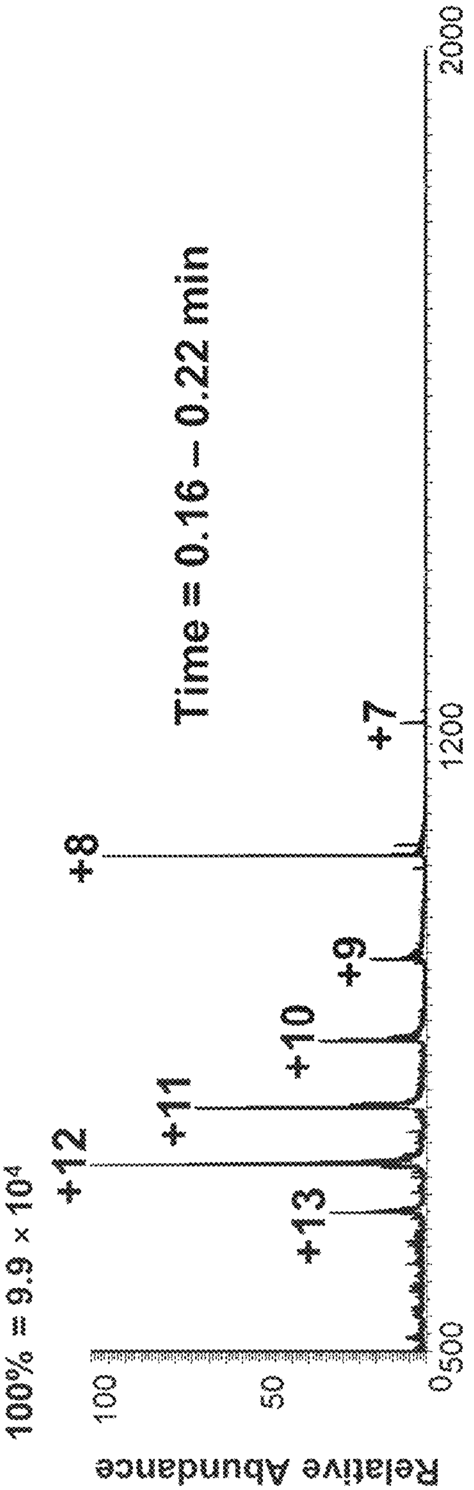
Figure 12D:
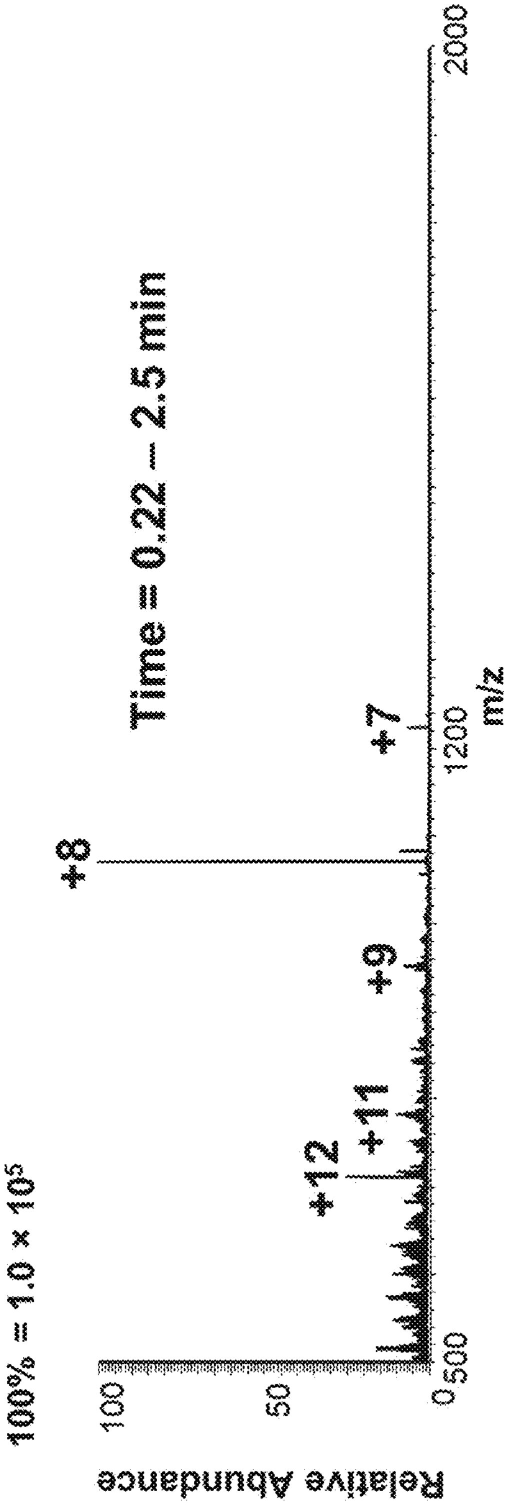

The fact that the non-contact nESI/nAPCI source is operated without the assistance of nebulizing gases and in the presence of limited solvent molecules under the nL/mL flow-rate conditions suggests highly reactive ionic species [e.g., $H+(H_2O)n$; where n=1 or 2] might be involved in the ionization process compared with the conventional APCI experiment, which employs N2 gas and high solvent flow rates (μL/mL). Importantly, bio-samples can be reanalyzed by repeated cycles of in-capillary ex-traction and ionization. Comparable MS signal was detected for cocaine in serum after seven cycles of analysis (FIG. 11).

Electrophoretic Separation

Figure 13A:
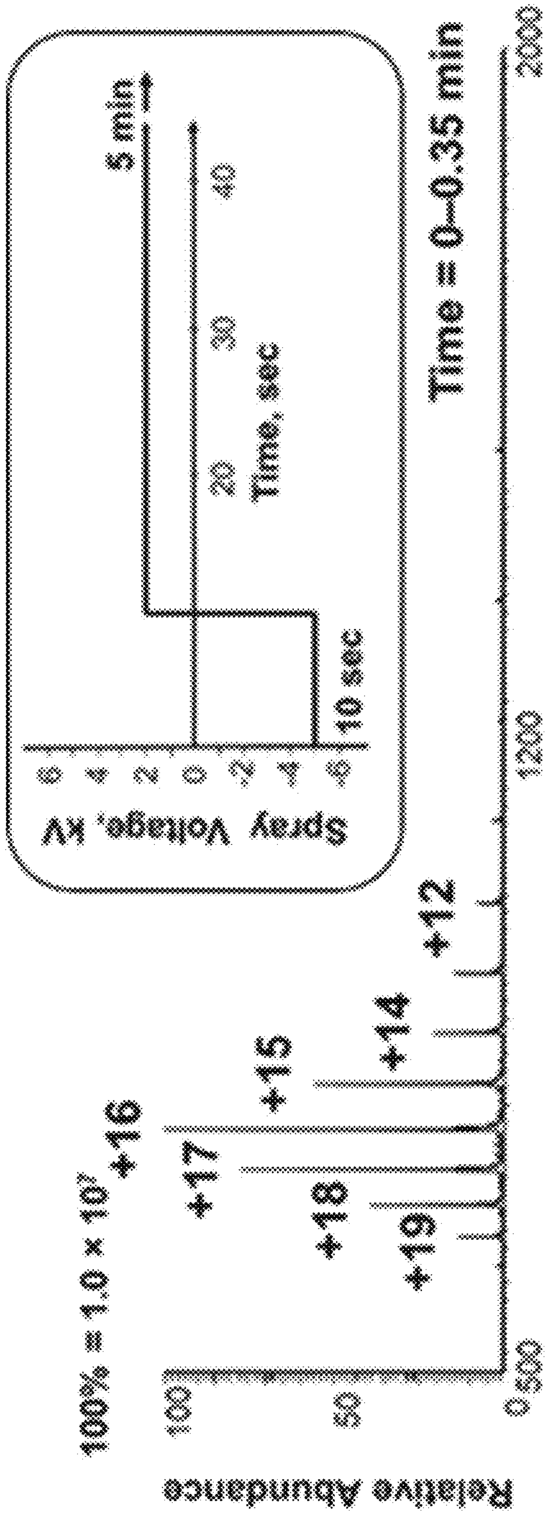
FIGS. 13A-13C depict data obtained from electrophoretic desalting of 45 μM of cytochrome c in PBS (1×) solution (137 mM NaCl, 2.7 mM KCl, 10 mM Na2HPO4 and 1.8 mM KH2PO4) in the presence of 0.1% of formic acid using the noncontact nESI-nAPCI setup, with a step voltage function starting with −5 kV for 10 s before switching to +2 kV for 5 extra minutes (see the insert in FIG. 13A) where mass spectra were recorded.
Figure 13B:
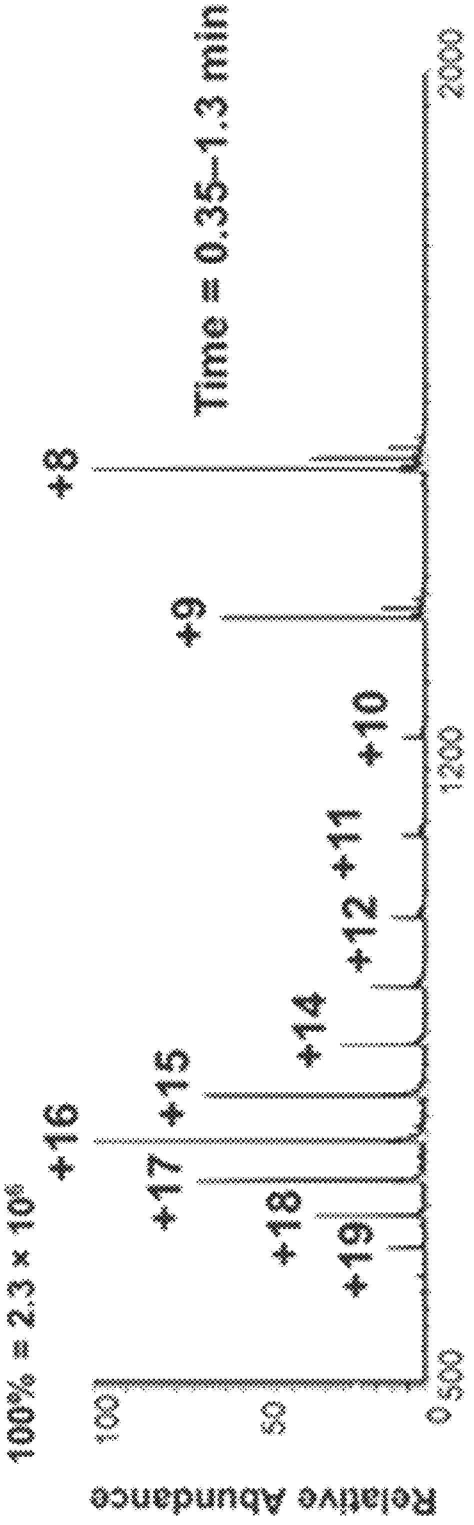
Figure 13C:
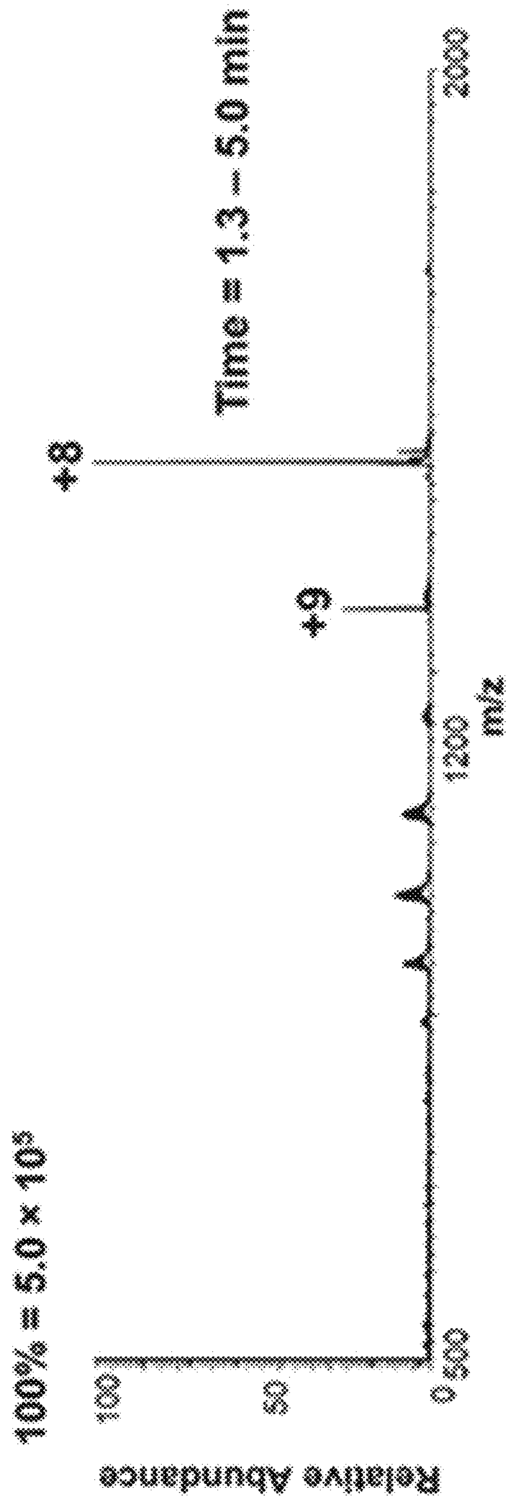

The last application examined for the new ion source was electrophoretic desalting and detection of proteins in concentrated salt solutions. The polarity-reversing was employed on the non-contact nESI/nAPCI platform, where a step potential was used starting from negative to positive high voltage polarities. A unique capability provided by the disclosed experimental setup is the fact that large step voltage differences (e.g., from −5 kV to +2 kV) can be used without damaging the disposable glass tip due to reduced Joule heating. FIG. 13 shows the real-time separation of cytochrome c in 1×phosphate-buffered saline solution (PBS, 137 mM NaCl, 2.7 mM KCl, 10 mM $Na_2HPO_4$ and 1.8 mM $KH_2PO_4$) obtained after applying −5 kV for 10 s followed by the application of +2 kV (see insert of FIG. 4*a;* 0.1% of formic acid was added to the buffered protein solution). There are three distinct time domains during the mass analysis at +2 kV: highly charged protein species are detected first (between 0-0.35 min), suggesting that highly unfolded proteins did not respond much to the polarity switching effect, concentrating them to the tip of the capillary. The application of the initial −5 kV draws the small positively charged cations from the inorganic salt away from the tip of the glass capillary. The proteins being bulky in size do not move as fast as the small inorganic cations, and as a consequence, electrophoretic separation occurs that results in the concentration of desalted protein at the front. No mass analysis is performed during the separation when −5 kV is applied. After 10 s of desalting, the applied voltage is a change from −5 to +2 kV, at which point mass analysis is performed, where the clean protein solution in the front is spray first. This spray process for mass analysis can last up to 300 s before the separated solution mixes again.

A broad range of protein charge states emerged within 0.35-1.3 min of spray time, indicating slow mixing of separated protein conformations. All the slow moving denatured bulky proteins were exhausted after 1.3 min of continuous spray, at which point only low charge state proteins were detected for the remaining 3.7 min spray time. Overall, the solution with depleted salt lasted for about 5 min, which is sufficient for complete MS analysis. Similar desalting effect was observed for ubiquitin using −5 kV to +2 kV step voltage conditions with 2.5 min of total spray time (FIG. 12). Note: without polarity reversing, proteins could not be detected in 1×PBS buffer employing either the disclosed herein setup or the regular contact mode nESI source. With polarity reversing, the disclosed herein setup offered acceptable separate in real-time not only for the temporal desalting of biomolecules but also the spatial separation of different conformations of a single protein. The later effect has not been reported before in all other polarity-reversing experiments. The separation is achieved based on the difference in electrophoretic mobilities, and in some cases, can be achieved without adding acid.

Example 2: High Throughput Screening

Figure 15:
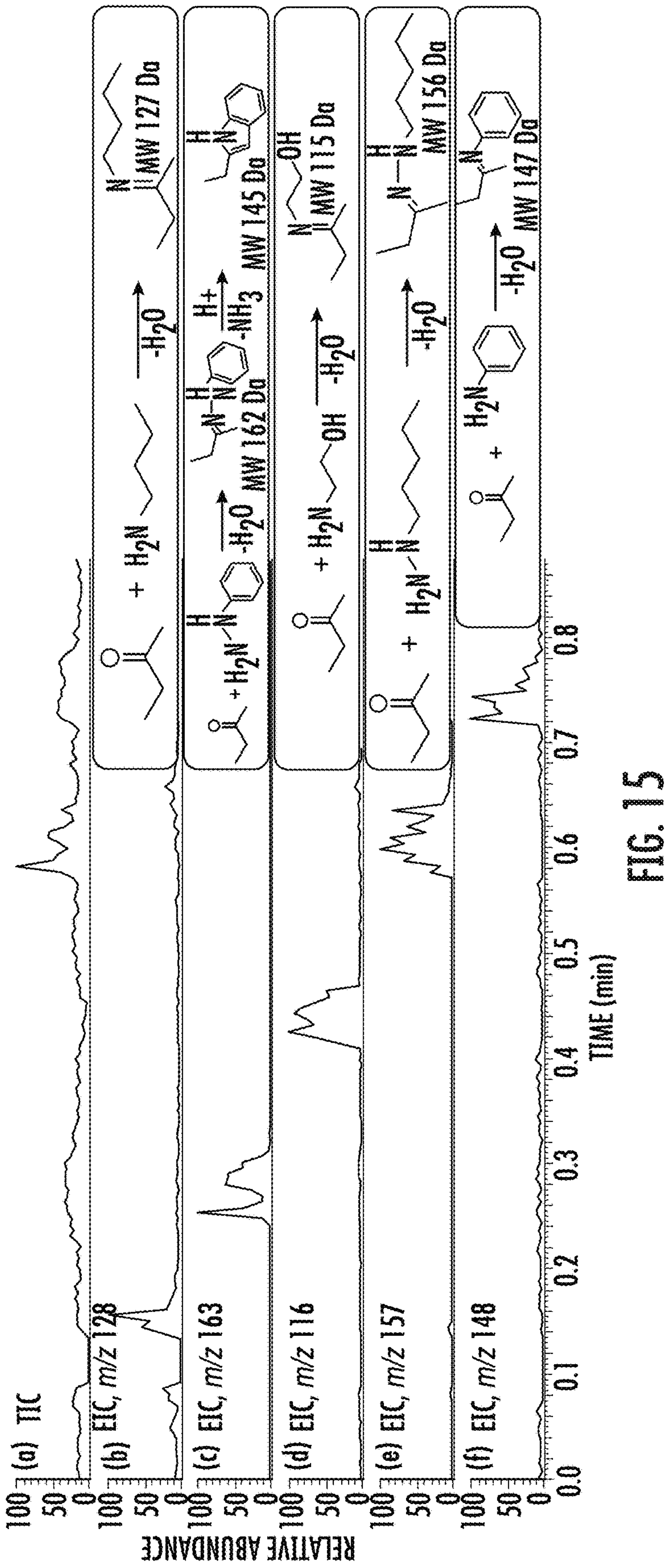
FIG. 15 depicts (a) total ion chromatogram, TIC, and 15*b-f*: extracted ion chromatograms (EIC) of high-throughput screening involving reaction of 2-butanone with (b) butylamine (product m/z 128), (c) phenylhydrazine (product m/z 163), (d) ethanolamine (product m/z 116), (e) pentylhydrazine (product m/z 157), and (f) aniline (product m/z 148). Reaction time was kept at 5 s per sample, followed by another 5 s wait time to limit carryover issues.
Figure 16A:
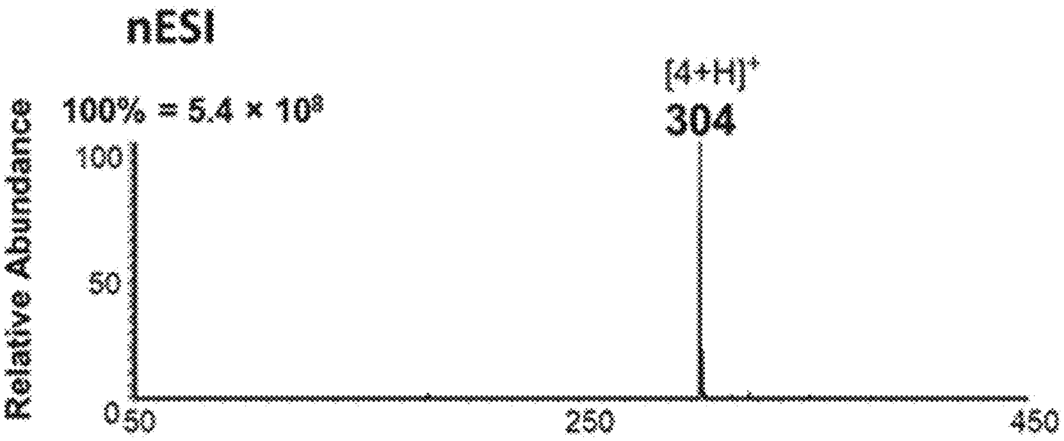
FIGS. 16A-16C depicts data obtained from an analysis of 200 μM equimolar mixture of 5-fluorouracil (1), caffeine (2), β-estradiol (3), cocaine (4), and vitamin D2 (5) in methanol by conventional nESI (FIG. 16A) and noncontact nESI/nAPCI (FIG. 16B) methods operated at 2 and 6 kV spray voltages, respectively.
Figure 16B:
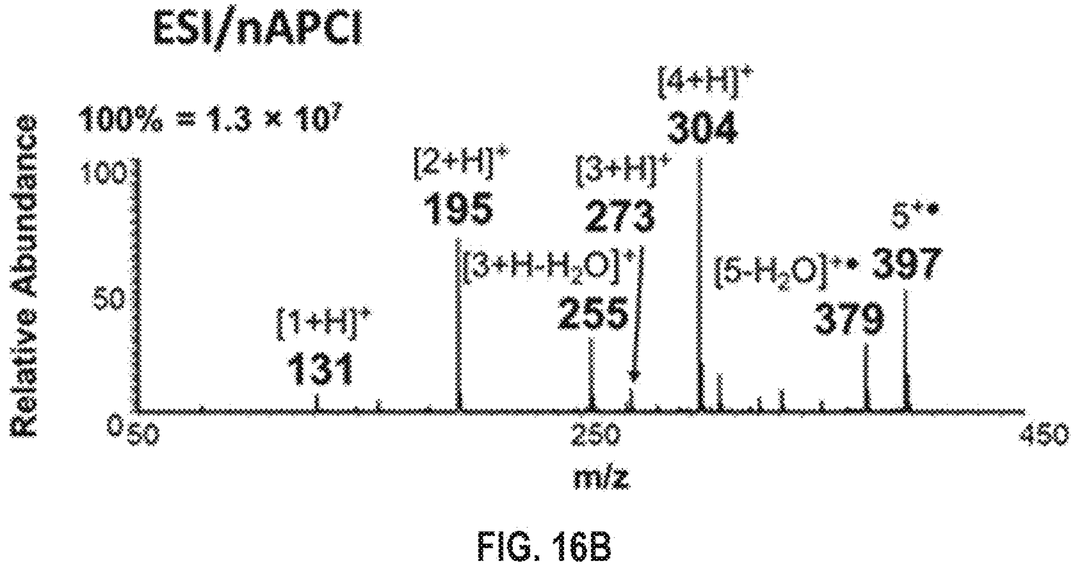
Figure 16C:
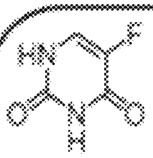
Figure 16C:
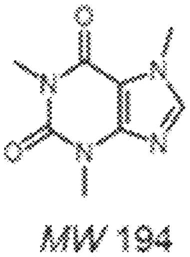
Figure 16C:
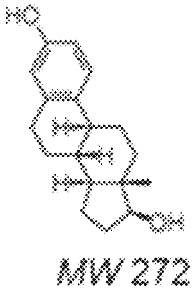
Figure 16C:
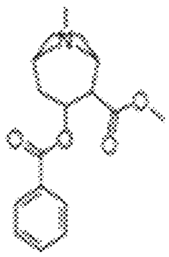
Figure 16C:
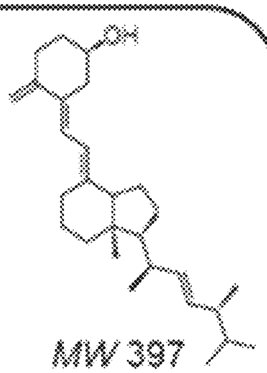
Figure 17A:
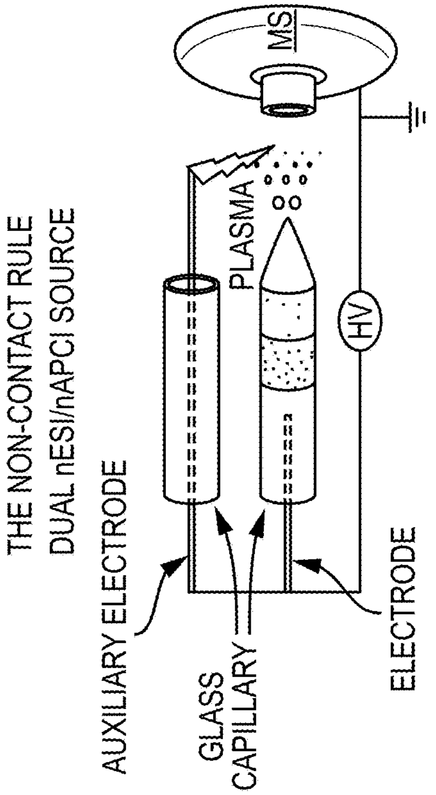
FIG. 17A-FIG. 17D depicts a schematic of an exemplary ion source in one aspect (FIG. 17A) and data obtained in a mixture of proteins and small molecules (e.g., Protein analysis from 1×PBS buffer).
Figure 17B:
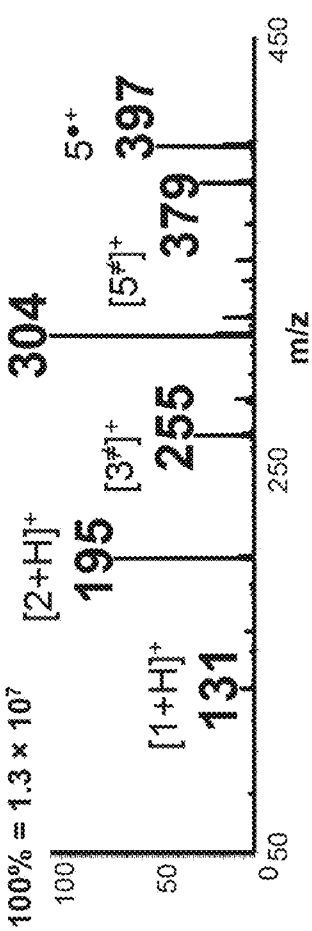
Figure 17C:
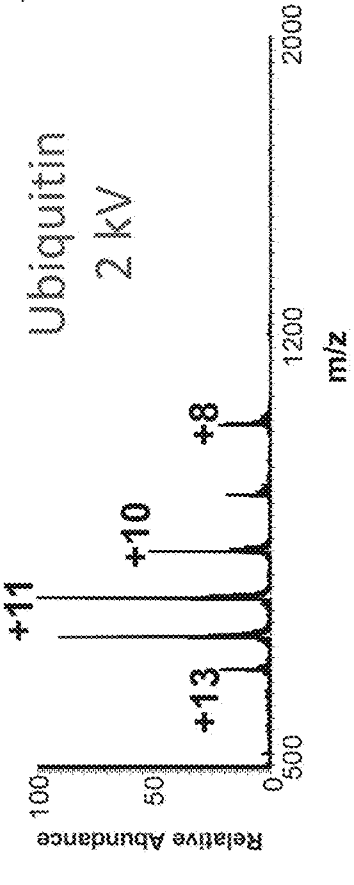
Figure 17D:
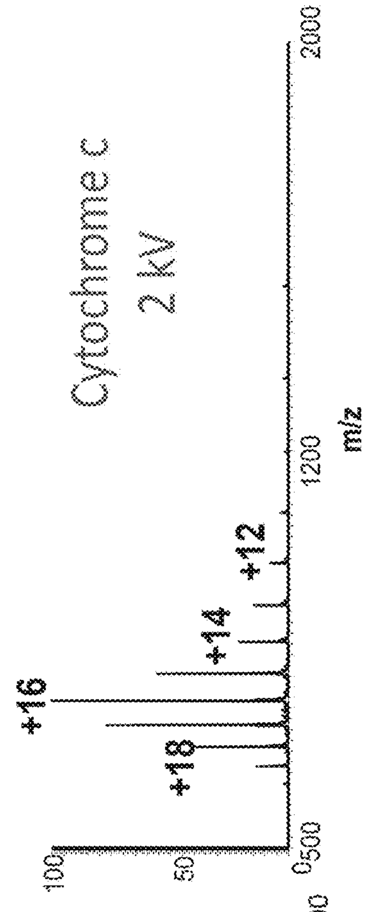

To demonstrate the high-throughput capabilities of this new contained-APCI MS screening platform, five different compounds (n-butylamine, phenylhydrazine, ethanolamine, pentylhydrazine, and aniline) were separately combined with 2-butanone vapor in real-time. Exposure time for each reagent was kept at 5 s, followed by another 5 s delay time yielding a total of 10 s interval between reactants, which was found optimal to limit carryover effect. The non-contact nature of the contained-APCI platform also aids in limiting contamination. Therefore, the reactivity of all five reagents could be screened in under 60 s. The results of this experiment are summarized in FIG. 15, which show clean product formation for each reactant without interference from previously analyzed reagents. While this experiment attempts to differentiate amines from hydrazine using their reaction with 2-butanone, it can be observed that the majority of the reactants form similar products making functional group identification challenging. This issue can be addressed through the implementation of other reactions in parallel. Here is where the high-throughput experimentation capabilities of the contained-APCI MS platform can be realized. In this respect, the experimental setup described in FIG. 4B having three inputs is not intended for three-component reaction screening. Instead, the three inputs are proposed to allow a given analyte (reagent B, FIG. 1) to be interrogated by two different reagents (A and C) in parallel. For example, both n-butylamine and butylhydrazine react with 2-butanone to give the corresponding Schiff's base via the loss of water molecule. By replacing the 2-butanone reagent with pyrylium cation, only the amine is expected to react to product the corresponding pyridinium cation. By combining this high-throughput experimentation procedure with tandem MS, it should be possible to obtain complete structural information in a matter of seconds. The process can be accomplished manually or via a robotic arm. Analytically, the ability to perform this experiment manually will be advantageous in field applications (i.e., on-site analysis) for complex mixture analysis, where the front-end reactions can produce a shift in mass for the analyte, thereby providing more confidence for MS/MS experiments conducted without prior separation.

Example 3: Micro-Extraction Performed Inside the Glass Capillary

Established protocol exists to extract organic compounds from biofluid before MS analysis, but we sought to develop a two-tiered integrated system where we not only perform in-situ catalytic epoxidation (or unsaturated fatty acids), but one in which we also enable in-capillary liquid/liquid extraction prior to MS analysis. Therefore, we proposed the integrated experimental process illustrated in FIG. 21A-21B, where the organic compound (e.g., free fatty acids) present in the complex biofluid sample, is first enriched into ethyl acetate extraction solvent. Being immiscible with the biofluids, this organic solvent selectively extracts organic compounds from the biofluid while leaving behind the aqueous and hydrophilic cellular components and thus minimizing matrix effects during MS analysis.

Figure 21A:
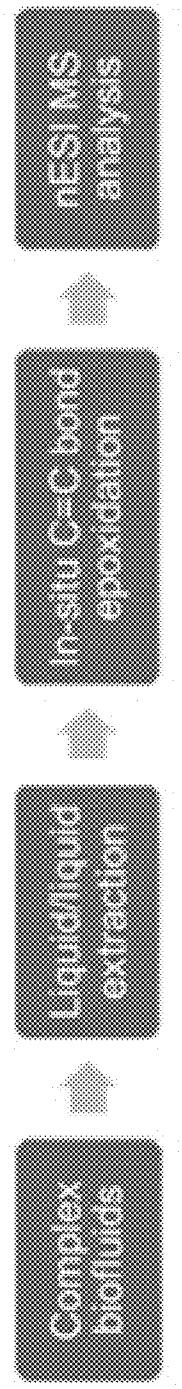
FIGS. 21A-21C depict a sequence of experimental approach for complex biofluid analysis involving in-capillary extraction, in-situ oxide creation and epoxidation, and real-time analysis by nESI MS (FIG. 21A); a schematic illustration of the platform for in-capillary liquid/liquid extraction of FAs from serum by ethyl acetate and subsequent MS analysis with nESI using Ir where in-situ fatty acid epoxidation occurs (FIG. 21B) and negative-ion mode contact-nESI MS analysis of serum after in-capillary liquid/liquid microextraction of fatty acids, showing the presence of unsaturated fatty acids at m/z 253, 277, 279, 281 with concomitant appearance of epoxide reaction products at m/z 269, 293, 295, and 297, respectively, as indicated by the 16 Da shift. Saturated fatty acids lacking the epoxide peaks were observed at m/z 255, 283 (FIG. 21C).
Figure 21B:
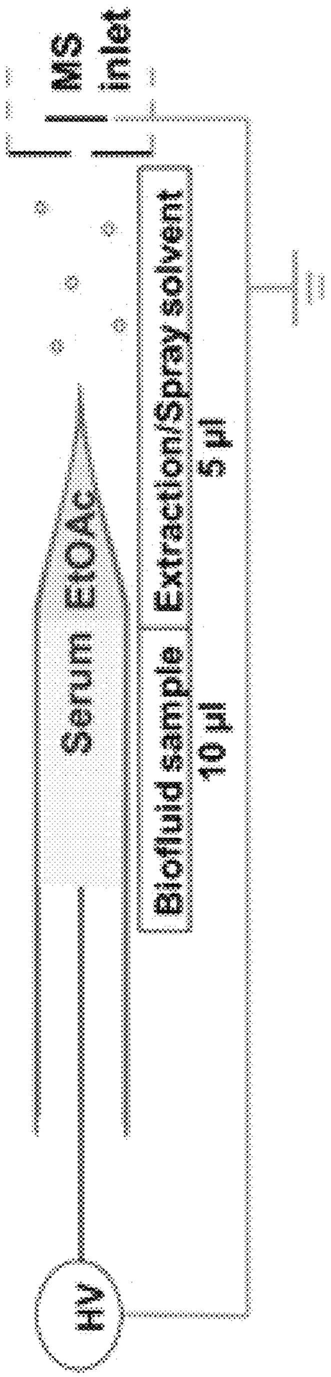
Figure 21C:
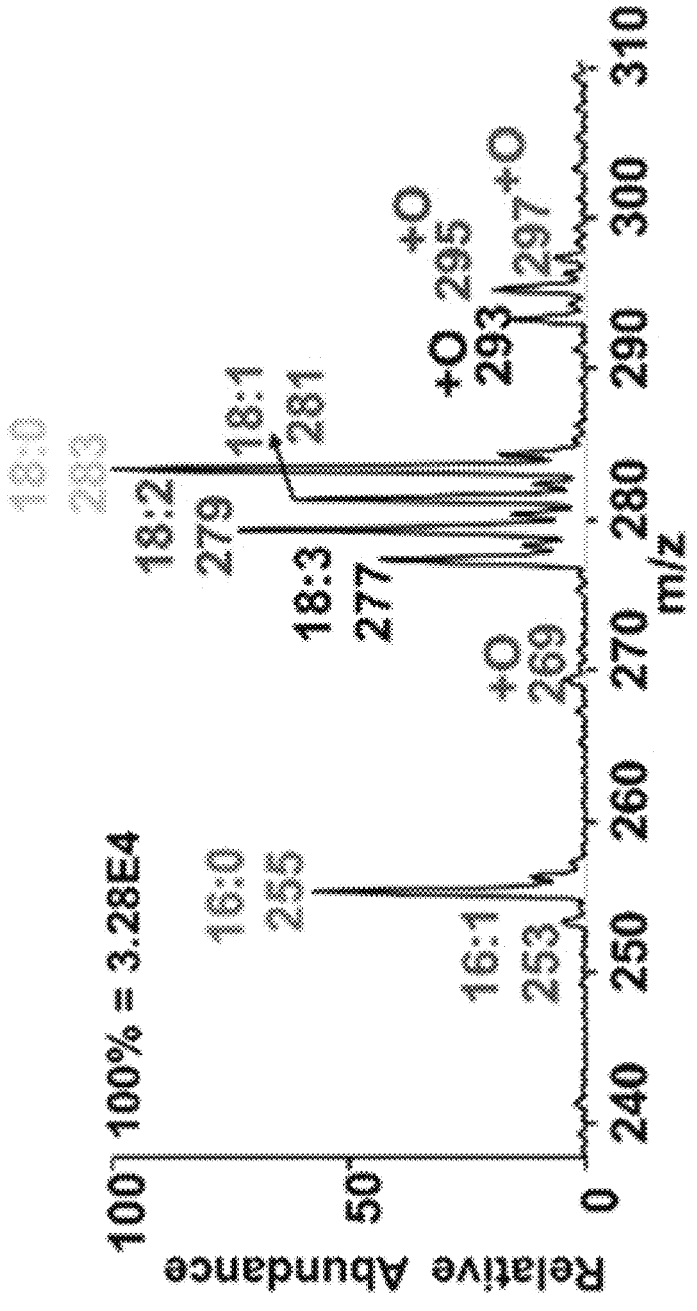

The shaking process (3-5 strokes) utilized in the liquid/liquid microextraction step results in the disintegration of the biofluid into smaller compartments facilitating highly efficient extraction via increased interfacial contact with the extracting organic solvent. The clean organic extract present at the tip of the glass capillary was then contacted with the Ir electrode (FIG. 21A). With the application of electrical potential, extra peaks that are shifted by 16 Da are expected to signify the presence of unsaturated fatty acids due to the occurrence of epoxidation reaction in the disclosed herein nESI-MS platform. An example is shown for serum in FIG. 21C where the most prevalent fatty acids (FA) such as oleic acid (FA 18:1 m/z 281), linoleic acid (FA 18:2, m/z 279), linolenic acid (FA 18:3, m/z 277), palmitoleic acid (FA 16:1, m/z 253), were all observed accompanied by the expected epoxide products at m/z 297, 295, 293, and 269, respectively. As anticipated, stearic acid (FA 18:0) and palmitic acid (FA 16:0) having no C═C bond did not show the corresponding epoxide peaks. These fatty acids were characterized directly from a complex (blank) serum sample without any dilution or pretreatment processes, except for the in-capillary liquid/liquid microextraction.

Example 4: Protein Analysis in Complex Mixtures

It is straightforward to analyze proteins in pure solutions (i.e., in the absence of inorganic salt). This is simply achieved by using low spray voltages (1-2 kV) on the contact nano-electrospray set up, when small the protein solution (<10 μL) is located at the tip of the glass capillary. The small molecules if present in the mixture are then ionized at higher voltages with the corona discharge. (FIGS. 17A-D)

Example 5: Differentiation of Closely Related Functional Groups

Figure 22A:
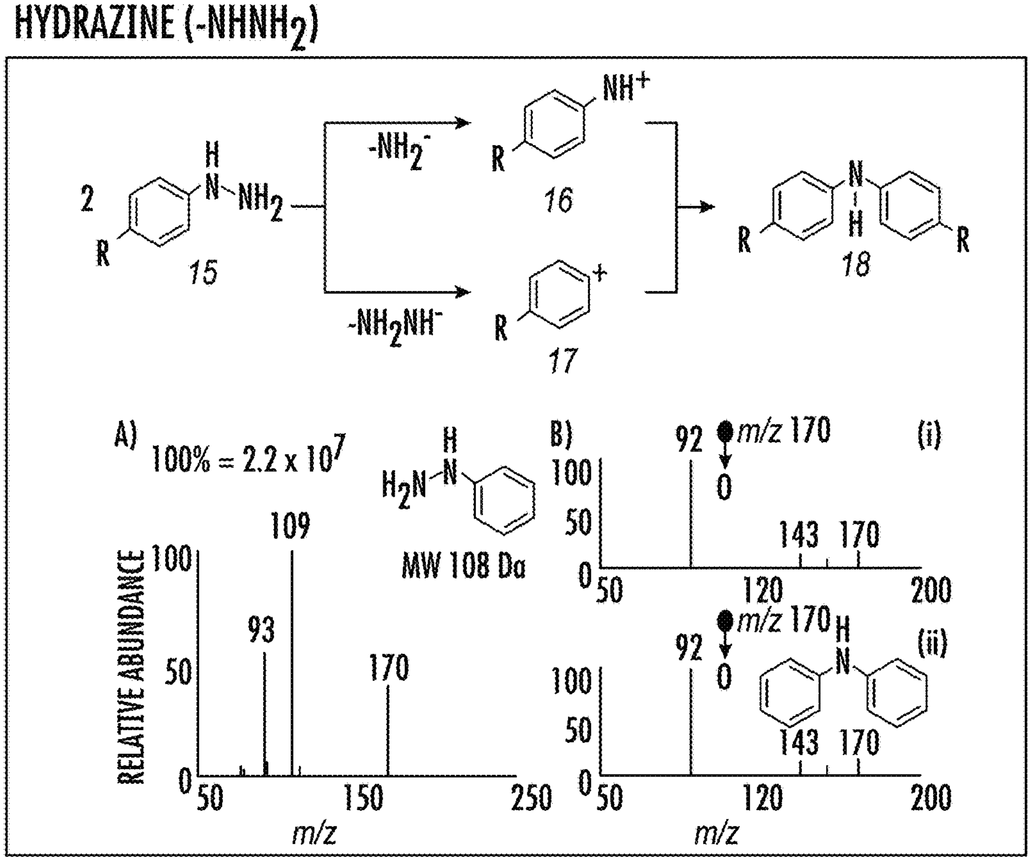
FIG. 22A-22B depict exposure of hydrazine vapor to corona discharge produces secondary amine (FIG. 22A), and exposure of primary amines to corona discharge yields N-alkylated tertiary amines (FIG. 22B).
Figure 22B:
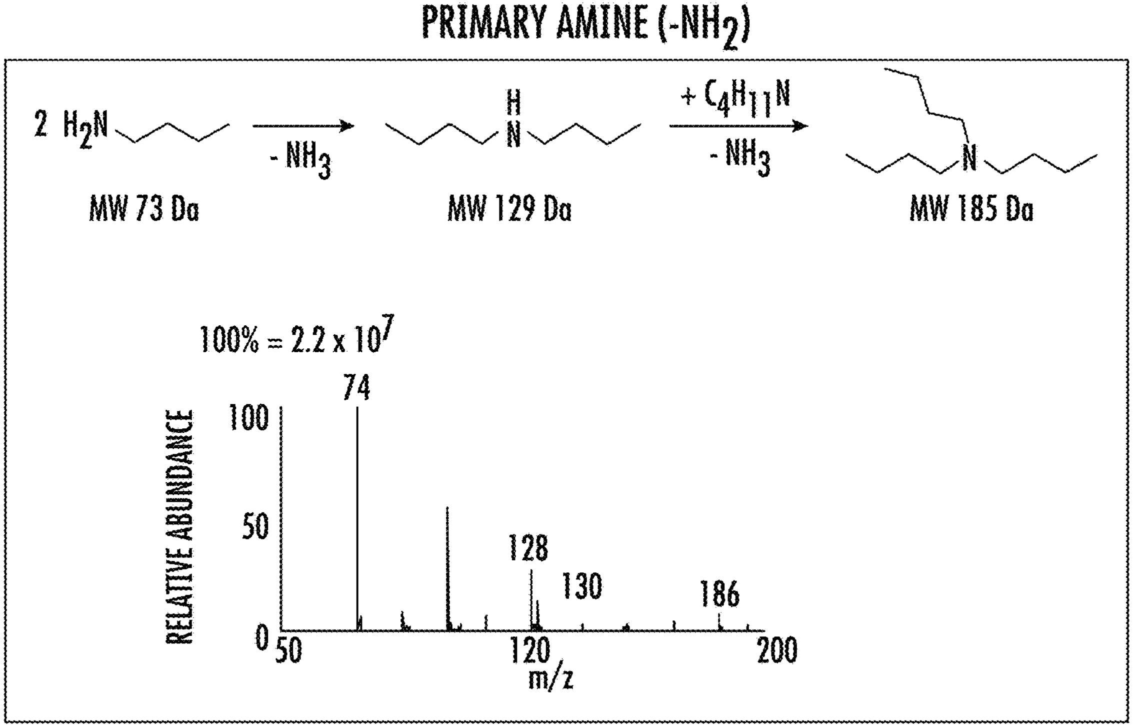

Based on its ability to ability to facilitate gas-phase reaction screening, the panoptic ion source is able to differentiate closely related functional groups such as primary amines and hydrazines using gas-phase reactions. For example, primary amines and hydrazine, though similar, easily distinguished simply by exposing the headspace vapors to corona discharge on the platform. Hydrazines undergo coupling reactions via a radical-mediated mechanism and culminate in the formation of a secondary amine, while primary amines form N-alkylation tertiary amine product (FIG. 22A-22B).

When reacted with mono-ketones (cyclohexanone and acetone), primary amines form only the corresponding Schiff's base, but hydrazines afford both the condensation and cyclization products, always spaced by 17 Da mass difference indicating the loss of ammonia from the Schiff's base to give the final cyclized product. On the other hand, when exposed to headspace vapors of di-ketone functionality (e.g., acetonylacetone), primary amines cyclized through two sequential losses of water molecules, whereas hydrazines do not. Therefore, the gas-phase reactions also enable aliphatic mono-ketones and di-ketones to be distinguished through reaction with primary amines and hydrazines. Aromatic and aliphatic hydrazines can be distinguished via gas-phase B-D cyclization; aromatic hydrazines cyclized when exposed to vapors of mono-ketones, but aliphatic hydrazines do not. Hydrazines do not react with pyrylium cation in gas-phase Katritzky chemistry, providing a means to differentiate aliphatic amines from aliphatic hydrazines, although the two compounds react with the carbonyl functional group to form the corresponding imine.

Example 6: Analysis of Sugars

Figure 24A:
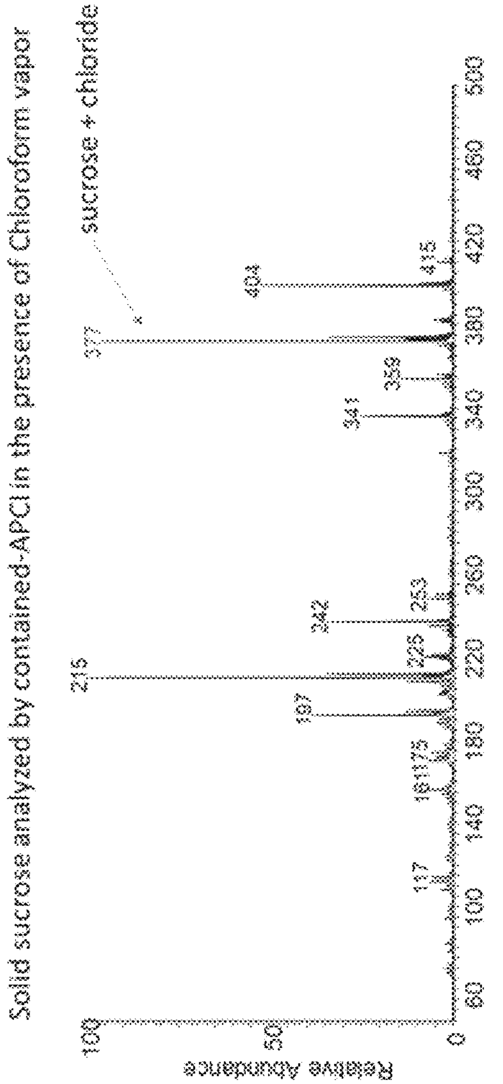
FIGS. 24A-24B show an exemplary spectra of sucrose in one aspect.
Figure 24B:
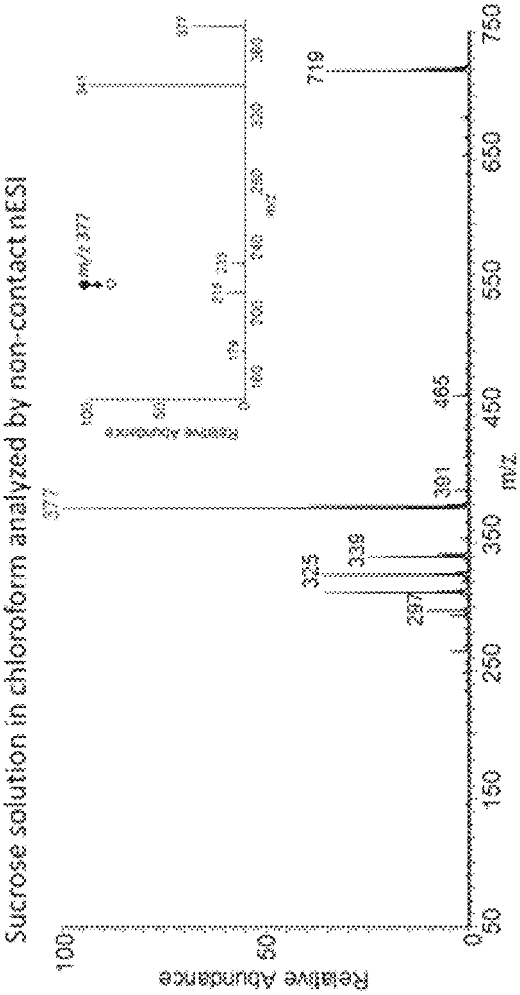

FIGS. 24A-24B show an exemplary spectra of sugar analysis. Negative-ion mode mass spectra for sucrose: (A) analysis of solid sucrose by contained-atmospheric pressure chemical ionization (APCI) in the presence of chloroform/methanol vapor, (B) analysis of sucrose solution (50 μM) using non-contact nano-electrospray ionization (nESI).

Aspects

The disclosed apparatuses and methods of using the same include at least the following aspects:

Aspect 1: An apparatus comprising: a) one or more sampling vessels having an inlet and an outlet, wherein the one or more sampling vessels is configured to receive a predetermined volume of an analyte sample and to form a headspace within the one or more sampling vessels; wherein the inlet and the outlet are in fluid communication with the headspace; and wherein the outlet is configured to allow fluid communication between the one or more sampling vessels and an analyzer; b) one or more electrospray ionization (ESI) electrodes disposed within the one or more sampling vessels such that it is in electrical communication with at least the headspace of the one or more sampling vessel; c) a corona electrode disposed outside of the one or more sampling vessels and configured under effective conditions to form a corona discharge, wherein the corona discharge is formed adjacent to the outlet of the one or more sampling vessels; wherein each of the one or more sampling vessels comprises one of the one or more ESI electrodes; wherein the one or more ESI electrodes and the corona electrode are in electrical communication with at least one high voltage source; and wherein the device is an ion source adapted for mass spectrometry.

Aspect 2: The apparatus of Aspect 1, wherein the inlet of the one or more sampling vessels has a diameter larger than a diameter of the outlet.

Aspect 3: The apparatus of Aspect 1 or 2, wherein at least a portion of the one or more sampling vessels is tapered to a tip to form the outlet.

Aspect 4: The apparatus of any one of Aspects 1-3, wherein the inlet of the one or more sampling vessels is configured to be in fluid communication with at least one composition comprising one or more of a reagent, an analyte, a modifier, or a combination thereof.

Aspect 5: The apparatus of Aspect 4, wherein the at least one composition is volatile.

Aspect 6: The apparatus of Aspects 4 or 5, wherein the analyte sample and the analyte are the same or different.

Aspect 7: The apparatus of any one of Aspects 4-6, wherein the at least one composition is in fluid communication with at least the headspace of the one or more sampling vessels.

Aspect 8: The apparatus of any one of Aspects 4-7, wherein the at least one composition is in electrical communication with the one or more ESI electrodes.

Aspect 9: The apparatus of any one of Aspects 4-8, wherein the at least one composition is disposed in a container that is configured to be removably coupled with the inlet of the one or more sampling vessels.

Aspect 10: The apparatus of Aspect 9 further comprising at least one valve configured to control a flow of the at least one composition through the inlet of the one or more sampling vessels.

Aspect 11: The apparatus of any one of Aspects 1-10, wherein the corona electrode is in electrical communication with one or more supplementary analyte samples that are the same or different from the analyte sample and are configured to be at least partially vaporized and ionized by the corona discharge.

Aspect 12: The apparatus of Aspect 11, wherein at least one of one or more supplementary analyte samples comprise at least one volatile compound.

Aspect 13: The apparatus of Aspect 12, wherein at least one of one or more supplementary analyte samples comprise at least one solid compound.

Aspect 14: The apparatus of Aspect 13, wherein the least one of one or more supplementary analyte samples comprising at least one solid compound positioned from the corona electrode at an effective distance that allows to at least partially vaporize and ionize the at least one solid compound with the corona discharge.

Aspect 15: The apparatus of Aspect 14, wherein the effective distance is from about 3 mm to about 6 mm from the corona electrode.

Aspect 16: The apparatus of any one of Aspects 1-15, wherein the corona electrode is positioned within a vessel having an inlet and an outlet.

Aspect 17: The apparatus of Aspect 16, wherein the inlet of the vessel is configured to be in fluid communication with at least one of the one or more supplementary analyte samples.

Aspect 18: The apparatus of Aspect 17, wherein the at least one of the one or more supplementary analyte samples is disposed in a container that is configured to be removably coupled with the inlet of the vessel.

Aspect 19: The apparatus of Aspect 18 further comprising a valve configured to control a flow of the at least one of the one or more supplementary analyte samples to the inlet of the vessel.

Aspect 20: The apparatus of any one of Aspects 17-19, wherein a second of the one or more supplementary analyte samples comprises a solid sample and is disposed adjacent to the outlet of the vessel.

Aspect 21: The apparatus of any one of Aspects 1-20, wherein the one or more ESI electrodes comprises Ag, Au, Pt, Pd, Ir, Rh, Ru, Ti, or any alloys of thereof.

Aspect 22: The apparatus of any one of Aspects 1-21, wherein the one or more ESI electrodes is a wire, a plate, or has an irregular shape.

Aspect 23: The apparatus of any one of Aspects 1-22, wherein the corona electrode comprises Ag, Au, Pt, Pd, Ir, Rh, Ru, Ti, or any alloys thereof.

Aspect 24: The apparatus of any one of Aspects 1-23, wherein the corona electrode comprises a wire, a plate, or has an irregular shape.

Aspect 25: The apparatus of any one of Aspects 1-24, wherein the one or more ESI electrodes is configured to be positioned within the analyte sample when present in the one or more sampling vessels.

Aspect 26: The apparatus of Aspect 25, wherein the one or more ESI electrodes is configured to be in electrical communication with the analyte sample when present in the one or more sampling vessels.

Aspect 27: The apparatus of Aspect 25 or 26, wherein the one or more ESI electrodes comprises Ir, Ti, Ru, Rh, or alloys thereof and is configured to catalyze one or more reactions within the analyte sample.

Aspect 28: The apparatus of any one of Aspects 1-27, wherein the at least one high voltage source is configured to supply a positive and/or negative voltage to the one or more ESI electrodes and/or corona electrode.

Aspect 29: The apparatus of Aspect 28, wherein the positive and/or negative voltage is in a range from about ±0.5 kV to about ±10 kV.

Aspect 30: The apparatus of Aspect 28 or 29, wherein the at least one high voltage source is configured to supply the same or different voltage to the one or more ESI electrodes and corona electrodes.

Aspect 31: The apparatus of any one of Aspects 1-31, wherein the at least one high voltage source is in electrical communication with an analyzer.

Aspect 32: The apparatus of any one of Aspects 1-31, wherein the at least one high voltage source is not in electrical communication with an analyzer.

Aspect 33: The apparatus of any one of Aspects 1-32, wherein the one or more ESI electrodes and the corona electrode are disposed substantially in parallel to each other:

Aspect 34: The apparatus of any one of Aspects 1-33, wherein the one or more ESI electrodes are disposed at about 1 to about 10 mm from the corona electrode.

Aspect 35: The apparatus of any one of Aspects 1-34, wherein the one or more ESI electrodes is spatially disposed above the corona electrode.

Aspect 36: The apparatus of any one of Aspects 1-35, wherein the one or more ESI electrodes is spatially disposed below the corona electrode.

Aspect 37: The apparatus of any one of Aspects 4-36, wherein the at least one composition is positioned at about 5 mm to about 10 mm from the one or more ESI electrodes and/or the corona electrode.

Aspect 38: The apparatus of any one of Aspects 1-37, wherein the one or more ESI electrodes is configured to generate a plurality of charged droplets when the analyte sample is present, and wherein the plurality of charged droplets exit the one or more sampling vessels at the outlet.

Aspect 39: The apparatus of any one of Aspects 1-38, wherein the one or more sampling vessels is configured to behave as a micro-extraction vessel.

Aspect 40: The apparatus of any one of Aspects 1-39, wherein the apparatus comprises at least two sampling vessels and at least two ESI electrodes, wherein a first ESI electrode is disposed within a first sampling vessel and a second ESI electrode is disposed within a second sampling vessel.

Aspect 41: The apparatus of Aspect 40, wherein the first ESI electrode is the same or different from the second ESI electrode.

Aspect 42: The apparatus of Aspect 40 or 41, wherein the first ESI electrode comprises Ag, Au, or Pt.

Aspect 43: The apparatus of any one of Aspects 40-42, wherein the second ESI electrode comprises Ir, Ti, Rh, Ru, or alloys thereof.

Aspect 44: The apparatus of any one of Aspects 40-43, wherein the first ESI electrode is in fluid communication with the headspace of the first sampling vessel.

Aspect 45: The apparatus of any one of Aspects 40-44, wherein the first ESI electrode is in electrical communication with the headspace of the first sampling vessel.

Aspect 46: The apparatus of any one of Aspects 40-45, wherein the second ESI electrode is positioned within the analyte sample when present in the second sampling vessel.

Aspect 47: The apparatus of any one of Aspects 40-46, wherein the second ESI electrode is in electrical communication with the analyte sample when present in the second sampling vessel.

Aspect 48: The apparatus of any one of Aspects 40-47, wherein the inlet of the first sampling vessel is configured to be in fluid communication with the at least one composition comprising one or more of a reagent, an analyte, a modifier, or a combination thereof.

Aspect 49: The apparatus of any one of Aspects 40-48, wherein the first ESI electrode, the second ESI electrode and the corona electrode are spatially disposed in parallel to each other.

Aspect 50: The apparatus of any one of Aspects 40-49, wherein the first ESI electrode is spatially disposed above the corona electrode and the second ESI electrode is spatially disposed above the first ESI electrode.

Aspect 51: The apparatus of any one of Aspects 40-49, wherein the second ESI electrode is spatially disposed above the corona electrode, and the first ESI electrode is spatially disposed above the second ESI electrode.

Aspect 52: The apparatus of any one of Aspects 40-49, wherein the corona electrode is spatially disposed above the first ESI electrode and the second ESI electrode is spatially disposed above the corona electrode.

Aspect 53: The apparatus of any one of Aspects 40-49, wherein the corona electrode is spatially disposed above the second ESI electrode, and the first ESI electrode is spatially disposed above the corona electrode.

Aspect 54: The apparatus of any one of Aspects 40-49, wherein the first ESI electrode is spatially disposed above the second ESI electrode, and the corona electrode is spatially disposed above the first ESI electrode.

Aspect 55: The apparatus of any one of Aspects 40-49, wherein the second ESI electrode is spatially disposed above the first ESI electrode, and the corona electrode is spatially disposed above the second ESI electrode.

Aspect 56: The apparatus of any one of Aspects 1-55, wherein the one or more sampling vessels are configured to permit fluid communication between the headspace and a gas supply.

Aspect 57: The apparatus of any one of Aspects 1-56 configured to form ions of the analyte sample.

Aspect 58: The apparatus of any one of Aspects 11-57 configured to form ions of the one or more supplementary analyte samples.

Aspect 59: The apparatus of any one of Aspects 28-58, wherein the apparatus is configured to form positive and negative ions when the positive voltage is supplied.

Aspect 60: The apparatus of any one of Aspects 28-59, wherein the apparatus is configured to form positive and negative ions when the negative voltage is supplied.

Aspect 61: The apparatus of any one of Aspects 1-60, wherein the analyzer comprises a mass spectrometer.

Aspect 62: The apparatus of any one of Aspects 1-61, the analyzer comprises an ion trap mass spectrometer, Orbitrap mass spectrometer, time of flight mass spectrometer, ion cyclotron resonance mass spectrometer, triple quadrupole mass spectrometer, or hybrids thereof.

Aspect 63: An apparatus comprising: a) one or more sampling vessels having an inlet and an outlet, wherein the one or more sampling vessels is configured to receive a predetermined volume of an analyte sample and to form a headspace within the one or more sampling vessels; wherein the inlet and the outlet are in fluid communication with the headspace; and wherein the outlet is configured to allow fluid communication between the one or more sampling vessels and an analyzer; b) one or more of non-inert electrospray ionization (ESI) electrodes disposed within the one or more sampling vessels such that it is in electrical communication with at least the headspace and with at least a portion of the analyte sample when present; wherein the one or more non-inert ESI electrodes are configured to catalyze a reaction within the analyte sample; c) corona electrode disposed outside of the one or more sampling vessels and configured under effective conditions to form a corona discharge, wherein the corona discharge is formed adjacent to the outlet of the one or more sampling vessels; wherein each of the one or more sampling vessels comprises one of the one or more ESI electrodes, wherein the one or more ESI electrodes and the corona electrode are in electrical communication with at least one high voltage source; and wherein the device is an ion source adapted for mass spectrometry.

Aspect 64: A mass-spectrometer comprising the apparatus of any one of Aspects 1-62, wherein the at least one high voltage source is not in electrical communication with the mass-spectrometer, and wherein the mass-spectrometer is configured to detect both positive and negative ions in a positive mode or a negative mode of operation, respectively.

Aspect 65: The mass spectrometer of Aspect 64 adapted for metabolite analysis.

Aspect 66: The mass spectrometer of Aspect 64 or 65, wherein the mass-spectrometer is portable, bench-top or any type.

Aspect 67: A method for detecting at least one organic compound comprising: a) providing an apparatus comprising: i) one or more sampling vessels having an inlet and an outlet, wherein the one or more sampling vessels comprises a predetermined volume of an analyte sample and a headspace; wherein the inlet and the outlet are in fluid communication with the headspace; and wherein the outlet is configured to allow fluid communication between the one or more sampling vessels and an analyzer; ii) one or more electrospray ionization (ESI) electrodes disposed within the one or more sampling vessels such that each of the one or more sampling vessels comprises one of the one or more ESI electrodes, and wherein the one or more ESI electrodes are in electrical communication with at least the headspace; iii) a corona electrode disposed outside of the one or more sampling vessels; b) supplying a direct current (DC) voltage to: i) the one or more ESI electrodes to generate a plurality of charged droplets; or to the one or more ESI electrode to generate the plurality of charged droplets and to the corona electrode to the corona discharge; c) passing the plurality of charged droplets through the outlet of the one or more sampling vessels to an analyzer.

Aspect 68: The method of Aspect 67, wherein the inlet of the one or more sampling vessels has a diameter larger than a diameter of the outlet.

Aspect 69: The method of Aspect 67 or 68, wherein at least a portion of the one or more sampling vessels is tapered to a tip to form the outlet.

Aspect 70: The method of any one of Aspects 67-69, further comprising providing at least one composition comprising one or more of a reagent, an analyte, a modifier, or a combination thereof, wherein the composition is volatile and is in fluid communication with the inlet of the one or more sampling vessels and wherein a flow of the at least one composition is controlled with a valve.

Aspect 71: The method of Aspect 70, further comprising allowing an amount of the at least one composition effective to react with or modify the analyte sample to flow into the one or more sampling vessels.

Aspect 72: The method of Aspect 71, wherein the at least one composition is in electrical communication with the one or more ESI electrodes.

Aspect 73: The method of any one of Aspects 70-72, wherein the at least one composition is disposed in a container that is configured to be removably coupled with the inlet of the one or more sampling vessels.

Aspect 74: The method of any one of Aspects 67-73, further comprising providing one or more supplementary analyte samples that are the same or different from the analyte sample, wherein the one or more supplementary analyte samples are in fluid communication with the corona electrode and configured to be at least partially vaporized and ionized by the corona discharge.

Aspect 75: The method of Aspect 74, wherein the one or more supplementary analyte samples comprise at least one volatile compound, or at least one solid compound, or a combination thereof.

Aspect 76: The method of Aspect 75, wherein the least one of one or more supplementary analyte samples comprising at least one solid compound positioned from the corona electrode at an effective distance that allows to at least partially vaporize and ionize the at least one solid compound with the corona discharge.

Aspect 77: The method of Aspect 76, wherein the corona electrode is positioned within a vessel having an inlet and an outlet.

Aspect 78: The method of any one of Aspects 67-77, wherein the corona electrode is positioned within a vessel having an inlet and an outlet.

Aspect 79: The method of Aspect 78, wherein the inlet of the vessel is configured to be in fluid communication with at least one of the one or more supplementary analyte samples.

Aspect 80: The method of Aspect 79, wherein the at least one of the one or more supplementary analyte samples is disposed in a container that is configured to be removably coupled with the inlet of the vessel.

Aspect 81: The method of Aspect 80 further comprising a valve configured to control a flow of the at least one of the one or more supplementary analyte samples to the inlet of the vessel.

Aspect 82: The method of any one of Aspects 79-81, wherein a second of the one or more supplementary analyte samples comprises a solid sample and is disposed adjacent to the outlet of the vessel.

Aspect 83: The method of any one of Aspects 67-82, wherein the voltage is supplied to both the one or more ESI electrodes and to the corona electrodes, the plurality of charged droplets are exposed to the corona discharge.

Aspect 84: The method of any one of Aspects 67-83, wherein the one or more ESI electrodes comprises Ag, Au, Pt, Pd, Ir, Rh, Ru, Ti, or any alloys of thereof.

Aspect 85: The method of any one of Aspects 67-84, wherein the one or more ESI electrodes is a wire, a plate, or has an irregular shape.

Aspect 86: The method of any one of Aspects 67-85, wherein the corona electrode comprises Ag, Au, Pt, Pd, Ir, Rh, Ru, Ti or any alloys thereof.

Aspect 87: The method of any one of Aspects 67-86, wherein the corona electrode comprises a wire, a plate, or has an irregular shape.

Aspect 88: The method of any one of Aspects 67-88, wherein the one or more ESI electrodes are inserted within the analyte sample and are in electrical communication with the analyte sample.

Aspect 89: The method of Aspect 88; wherein the one or more ESI electrodes comprises Ir, Ti, Rh, Ru, or alloys thereof and is configured to catalyze one or more reactions within the analyte sample.

Aspect 90: The method of Aspect 89 further comprising a step of differentiating an isomer mixture if present in the analyte sample.

Aspect 91: The method of any one of Aspects 74-90 wherein the plurality of charged droplets are configured to react with at least partially vaporized and ionized supplemental analyte sample to form a new product to be more easily detected by the analyzer.

Aspect 92: The method of any one of Aspects 67-91, wherein the one or more sampling vessels comprising an amount of an organic solvent disposed between the analyte sample and the outlet, wherein the organic solvent is configured to extract at least one component from the complex analyte sample.

Aspect 93: The method of Aspect 92, further comprising a step of microextraction of the at least one component and forming an ionized form of the at least one component.

Aspect 94: The method of any one of Aspects 67-93, wherein the DC voltage is a positive voltage and/or a negative voltage from about ±0.5 kV to about ±10 kV.

Aspect 95: The method of any one of Aspects 67-94, further comprising electrophoretic separation for desalting of the analyte sample.

Aspect 96: The method of Aspect 95, wherein the electrophoretic separation of the analyte sample is performed by supplying a step potential from about −6 kV to about 3 kV for a predetermined period of time.

Aspect 97: The method of any one of Aspects 67-96, wherein a voltage source is in electrical communication with an analyzer.

Aspect 98: The method of any one of Aspects 67-98, wherein a voltage source is not in electrical communication with an analyzer.

Aspect 99: The method of any one of Aspects 67-98, wherein the one or more ESI electrodes are disposed at about 1 to about 10 mm from the corona electrode.

Aspect 100: The method of any one of Aspects 67-99, wherein the apparatus comprises at least two sampling vessels and at least two ESI electrodes, wherein a first ESI electrode is disposed within a first sampling vessel and a second ESI electrode is disposed within a second sampling vessel.

Aspect 101: The method of Aspects 100, wherein the first ESI electrode is the same or different from the second ESI electrode.

Aspect 102: The method of any one of Aspects 67-101, wherein the first ESI electrode is in electrical communication with the headspace of the first sampling vessel and wherein the second ESI electrode is positioned within the analyte sample when present in the second sampling vessel.

Aspect 103: The method of any one of Aspects 67-102, wherein the inlet of the first sampling vessel is in fluid communication with the at least one composition comprising one or more of a reagent, an analyte, a modifier, or a combination thereof.

Aspect 104: The method of any one of Aspects 67-103, wherein the analyte sample comprises urine, blood serum, plasma, saliva, sweat, tears, or a combination thereof.

Aspect 105: The method of any one of Aspects 67-104, wherein the analyzer comprises a mass spectrometer.

Aspect 106: The method of any one of Aspects 67-105, the analyzer comprises an ion trap mass spectrometer, Orbitrap mass spectrometer, or triple quadrupole mass spectrometer, time-of-flight mass spectrometer, and ion cyclotron resonance mass spectrometer.

Aspect 107: A method of measuring positive and negative ions in an analyte solution comprising: a) providing an apparatus of any one of Aspects 1-61, b) generating positive and negative ions comprising at least one compound of an analyte sample provided within the one or more sampling vessels and/or comprising at least one compound of a supplementary analyte sample if it is optionally provided adjacent to the corona electrode; c) detecting positive and negative ions in a positive mode of a mass-spectrometer; and/or d) detecting positive and negative ions in a negative mode of a mass-spectrometer.

The claims are not intended to include, and should not be interpreted to include, means-plus- or step-plus-function limitations, unless such a limitation is explicitly recited in a given claim using the phrase(s) "means for" or "step for," respectively.

In view of the described processes and compositions, hereinbelow are described certain more particularly described aspects of the inventions. These particularly recited aspects should not, however, be interpreted to have any limiting effect on any different claims containing different or more general teachings described herein, or that the "particular" aspects are somehow limited in some way other than the inherent meanings of the language and formulas literally used therein.

What is claimed is:

1. An apparatus comprising:

a) one or more sampling vessels having an inlet and an outlet, wherein the one or more sampling vessels is configured to receive a predetermined volume of an analyte sample and to form a headspace within the one or more sampling vessels;

wherein the inlet and the outlet are in fluid communication with the headspace; and wherein the outlet is configured to allow fluid communication between the one or more sampling vessels and an analyzer;

b) one or more electrospray ionization (ESI) electrodes disposed within the one or more sampling vessels such that it is in electrical communication with at least the headspace of the one or more sampling vessel;

c) a corona electrode disposed outside of the one or more sampling vessels and configured under effective conditions to form a corona discharge, wherein the corona discharge is formed adjacent to the outlet of the one or more sampling vessels;

wherein each of the one or more sampling vessels comprises one of the one or more ESI electrodes, wherein the one or more ESI electrodes and the corona electrode are in electrical communication with at least one high voltage source;

wherein the corona electrode is in electrical communication with one or more supplementary analyte samples that are the same or different from the analyte sample and are configured to be at least partially vaporized and ionized by the corona discharge;

wherein at least one of one or more supplementary analyte samples comprise at least one volatile, solid compound, wherein the least one of one or more supplementary analyte samples comprising at least one solid compound positioned from the corona electrode at an effective distance that allows to at least partially vaporize and ionize the at least one solid compound with the corona discharge; and wherein the device is an ion source adapted for mass spectrometry.

2. The apparatus of claim 1, wherein the inlet of the one or more sampling vessels is configured to be in fluid communication with at least one composition comprising one or more of a reagent, an analyte, a modifier, or a combination thereof.

3. The apparatus of claim 2, wherein the at least one composition is in fluid communication with at least the headspace of the one or more sampling vessels.

4. The apparatus of claim 2, wherein the at least one composition is in electrical communication with the one or more ESI electrodes.

5. The apparatus of claim 1, wherein the corona electrode is positioned within a vessel having an inlet and an outlet.

6. The apparatus of claim 1, wherein the one or more ESI electrodes is configured to be positioned within the analyte sample when present in the one or more sampling vessels.

7. The apparatus of claim 1, wherein the at least one high voltage source is configured to supply a positive and/or negative voltage to the one or more ESI electrodes and/or corona electrode.

8. The apparatus of claim 1, wherein the at least one high voltage source is in electrical communication with an analyzer.

9. The apparatus of claim 1, wherein the one or more ESI electrodes are disposed at about 1 to about 10 mm from the corona electrode.

10. The apparatus of claim 2, wherein the at least one composition is positioned at about 5 mm to about 10 mm from the one or more ESI electrodes and/or the corona electrode.

11. The apparatus of claim 1, wherein the one or more ESI electrodes is configured to generate a plurality of charged droplets when the analyte sample is present, and wherein the plurality of charged droplets exit the one or more sampling vessels at the outlet.

12. The apparatus of claim 1, wherein the apparatus comprises at least two sampling vessels and at least two ESI electrodes, wherein a first ESI electrode is disposed within a first sampling vessel and a second ESI electrode is disposed within a second sampling vessel.

13. The apparatus of claim 12, wherein the first ESI electrode is in fluid communication with the headspace of the first sampling vessel.

14. The apparatus of claim 12, wherein the first ESI electrode is in electrical communication with the headspace of the first sampling vessel.

15. The apparatus of claim 12, wherein the second ESI electrode is positioned within the analyte sample when present in the second sampling vessel.

16. The apparatus of claim 12, wherein the second ESI electrode is in electrical communication with the analyte sample when present in the second sampling vessel.

17. An apparatus comprising:

a) one or more sampling vessels having an inlet and an outlet, wherein the one or more sampling vessels is configured to receive a predetermined volume of an analyte sample and to form a headspace within the one or more sampling vessels;

wherein the inlet and the outlet are in fluid communication with the headspace; and wherein the outlet is configured to allow fluid communication between the one or more sampling vessels and an analyzer;

b) one or more of non-inert electrospray ionization (ESI) electrodes disposed within the one or more sampling vessels such that it is in electrical communication with at least the headspace and with at least a portion of the analyte sample when present; wherein the one or more non-inert ESI electrodes are configured to catalyze a reaction within the analyte sample;

c) corona electrode disposed outside of the one or more sampling vessels and configured under effective conditions to form a corona discharge, wherein the corona discharge is formed adjacent to the outlet of the one or more sampling vessels;

wherein each of the one or more sampling vessels comprises one of the one or more ESI electrodes, wherein the one or more ESI electrodes and the corona electrode are in electrical communication with at least one high voltage source;

wherein the corona electrode is in electrical communication with one or more supplementary analyte samples that are the same or different from the analyte sample and are configured to be at least partially vaporized and ionized by the corona discharge;

wherein at least one of one or more supplementary analyte samples comprise at least one volatile, solid compound, wherein the least one of one or more supplementary analyte samples comprising at least one solid compound positioned from the corona electrode at an effective distance that allows to at least partially vaporize and ionize the at least one solid compound with the corona discharge; and wherein the device is an ion source adapted for mass spectrometry.

18. A mass-spectrometer comprising the apparatus of claim 1, wherein the at least one high voltage source is not in electrical communication with the mass-spectrometer, and wherein the mass-spectrometer is configured to detect both positive and negative ions in a positive mode or a negative mode of operation, respectively.

* * * * *